United States Patent [19]
Takeshima et al.

[11] Patent Number: 5,473,890
[45] Date of Patent: Dec. 12, 1995

[54] EXHAUST PURIFICATION DEVICE OF INTERNAL COMBUSTION ENGINE

[75] Inventors: Shinichi Takeshima, Susono; Satomi Seto, Gotemba; Toshiaki Tanaka, Numazu; Satoshi Iguchi, Mishima; Kiyoshi Nakanishi, Susono; Kenji Katoh, Shizuoka, all of Japan

[73] Assignee: Toyota Jidosha Kabushiki Kaisha, Toyota, Japan

[21] Appl. No.: 256,922

[22] PCT Filed: Dec. 3, 1993

[86] PCT No.: PCT/JP93/01764

§ 371 Date: Jul. 29, 1994

§ 102(e) Date: Jul. 29, 1994

[87] PCT Pub. No.: WO94/12778

PCT Pub. Date: Jun. 9, 1994

[30] Foreign Application Priority Data

Dec. 3, 1992 [JP] Japan ................................. 4-324279
Feb. 2, 1993 [JP] Japan ................................. 5-015602
Jun. 10, 1993 [JP] Japan ................................. 5-138586

[51] Int. Cl.⁶ ................................................ F01N 3/20
[52] U.S. Cl. ................................ 60/285; 60/286; 60/297; 60/301; 60/311
[58] Field of Search ..................... 60/285, 301, 311, 60/297, 286

[56] References Cited

U.S. PATENT DOCUMENTS

| | | |
|---|---|---|
| 3,795,730 | 3/1974 | Kalvinskas . |
| 3,926,590 | 12/1975 | Aibe et al. . |
| 4,645,653 | 2/1987 | Kimura .................................. 60/301 |
| 4,760,044 | 7/1988 | Joy, III et al. . |
| 4,780,447 | 10/1988 | Kim et al. . |
| 4,868,148 | 9/1989 | Henk et al. . |
| 5,041,407 | 8/1991 | Williamson et al. . |
| 5,116,800 | 5/1992 | Williamson et al. . |

FOREIGN PATENT DOCUMENTS

| | | |
|---|---|---|
| 3509035A1 | 9/1986 | Germany . |
| 53-115687 | 10/1978 | Japan . |
| 60-182325 | 9/1985 | Japan . |
| 62-97630 | 5/1987 | Japan . |
| 62-106826 | 5/1987 | Japan . |
| 62-117620 | 5/1987 | Japan . |
| 62-126508 | 8/1987 | Japan . |

(List continued on next page.)

OTHER PUBLICATIONS

"NO Removal by Absorption into BaO–CuO Binary Oxides" by Masato Machida, et al., (J. Chem. Soc., Chem Commun., pp. 1165–1166).

"Formation and Decomposition of $BaCuO_{2.5}$ Prepared from a Mixture of Nitrates" by Masato Machida, et al. (Journal of Solid State Chemistry, pp. 176–179).

"NO Removal by Absorption into Ba–Cu–O Binary Oxides" by Masato Machida, et al. (Catalyst vol. 33 No. 2, pp. 87–90).

Primary Examiner—Douglas Hart
Attorney, Agent, or Firm—Kenyon & Kenyon

[57] ABSTRACT

An $NO_x$ absorbent (19) which absorbs $NO_x$ when an air-fuel ratio of an inflowing exhaust gas is lean, while releases the absorbed $NO_x$ when lowering an oxygen concentration in the inflowing exhaust gas, is arranged in an exhaust passage of an internal combustion engine. An $SO_x$ absorbent (18) which absorbs $SO_x$ when the air-fuel ratio of the inflowing exhaust gas is lean, while releases the absorbed $SO_x$ when the air-fuel ratio of the inflowing exhaust gas is made rich is arranged in the exhaust passage on the upstream side of the $NO_x$ absorbent (19). When the lean air-fuel mixture is burned, the $SO_x$ is absorbed into the $SO_x$ absorbent (18) and, at the same time, the $NO_x$ is absorbed into the $NO_x$ absorbent (19), and when the air-fuel ratio of the air-fuel mixture is switched from lean to rich, $SO_x$ is released from the $SO_x$ absorbent (18), and $NO_x$ is released from the $SO_x$ absorbent (19).

37 Claims, 49 Drawing Sheets

FOREIGN PATENT DOCUMENTS

| | | |
|---|---|---|
| 64-30643 | 2/1989 | Japan . |
| 1-56816 | 12/1989 | Japan . |
| 2-149715 | 6/1990 | Japan . |
| 2-149714 | 6/1990 | Japan . |
| 3-124909 | 5/1991 | Japan . |
| 4-171215 | 6/1992 | Japan . |
| 5-76771 | 3/1993 | Japan . |

RICH ← STOICHIOMETRIC AIR-FUEL RATIO → LEAN

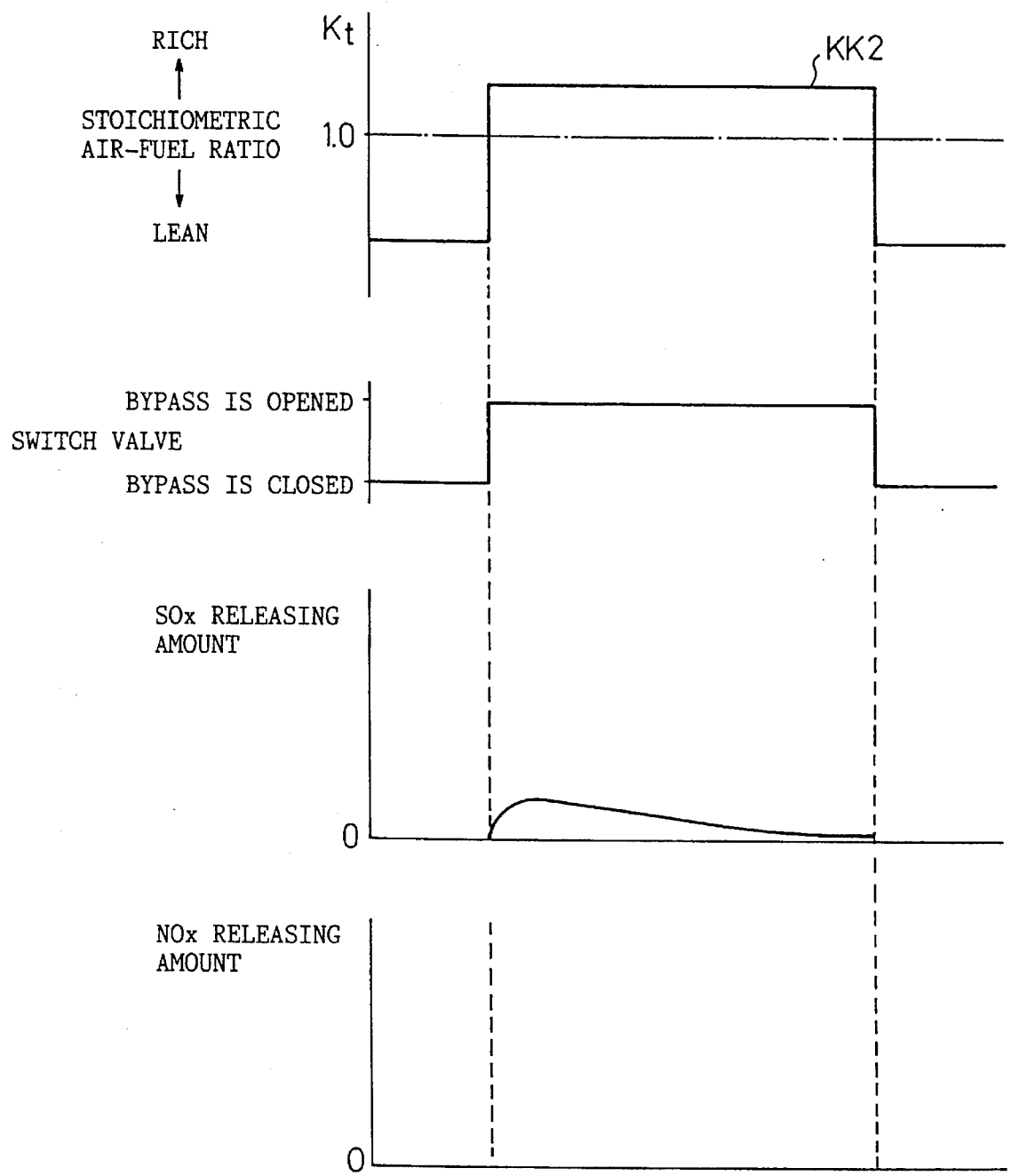

EXHAUST PURIFICATION DEVICE OF INTERNAL COMBUSTION ENGINE

TECHNICAL FIELD

The present invention relates to an exhaust purification device of an internal combustion engine.

BACKGROUND ART

The present applicant has already proposed an internal combustion engine in which a lean air-fuel mixture is burned, in which internal combustion engine an $NO_x$ absorbent which absorbs the $NO_x$ when the air-fuel ratio of an inflowing exhaust gas is lean and releases the absorbed $NO_x$ when the oxygen concentration in the inflowing exhaust gas is lowered is arranged in an engine exhaust passage; the $NO_x$ generated when the lean air-fuel mixture is burned is absorbed by the $NO_x$ absorbent before the $NO_x$ absorption capability of the $NO_x$ absorbent is saturated, the air-fuel ratio of the inflowing exhaust gas to the $NO_x$ absorbent is temporarily made rich so that the $NO_x$ absorbent is made to release the $NO_x$ and, at the same time, the released $NO_x$ is reduced (refer to U.S. patent application Ser. No. 08/066,100 or European Patent Application No. 92920904.7).

However, the fuel and the lubrication oil of the engine contain sulfur, and therefore $SO_x$ is contained in the exhaust gas. Accordingly, in this internal combustion engine, this $SO_x$ is also absorbed into the $NO_x$ absorbent together with the $NO_x$. However, this $SO_x$ is not released from the $NO_x$ absorbent even if the air-fuel ratio of the inflowing exhaust gas to the $NO_x$ absorbent is made rich, and accordingly the amount of $SO_x$ in the $NO_x$ absorbent is gradually increased. However, when the amount of $SO_x$ in the $NO_x$ absorbent is increased, the amount of the $NO_x$ that can be absorbed by the $NO_x$ absorbent is gradually lowered, and finally the $NO_x$ absorbent becomes no longer able to absorb almost any $NO_x$. Therefore, the present applicant has already proposed an internal combustion engine in which a sulfur trap is provided in the engine exhaust passage at the upstream side of the $NO_x$ absorbent, and the $SO_x$ contained in the exhaust gas is caught by this sulfur trap (refer to U.S. patent application Ser. No. 08/096,103 or European Patent Application No. 93112260.6). In this internal combustion engine, the $SO_x$ discharged from the engine is caught by the sulfur trap, and therefore only the $NO_x$ is absorbed into the $NO_x$ absorbent.

However, in this internal combustion engine, the $SO_x$ caught by the sulfur trap is continuously being caught in the sulfur trap without being released from the sulfur trap even if the air-fuel ratio of the exhaust gas flowing into the sulfur trap is made rich. Accordingly, the amount of the $SO_x$ caught by the sulfur trap is gradually increased. When the $SO_x$ catching capability of the sulfur trap is saturated, the $SO_x$ passes through the sulfur trap, and therefore there arises a problem in that the $SO_x$ is absorbed into the $NO_x$ absorbent and gradually accumulates in the $NO_x$ absorbent.

DISCLOSURE OF THE INVENTION

An object of the present invention is to provide an exhaust purification device which can maintain a high $NO_x$ absorption capability by the $NO_x$ absorbent even if the $NO_x$ absorbent is used for a long time.

According to the present invention, there is provided an exhaust purification device of an internal combustion engine provided with an exhaust passage; an $NO_x$ absorbent which is arranged in the exhaust passage, absorbs the $NO_x$ when the air-fuel ratio of the inflowing exhaust gas is lean, and, at the same time, releases the absorbed $NO_x$ when the oxygen concentration in the inflowing exhaust gas is lowered; an $SO_x$ absorbent which is arranged in the exhaust passage on the upstream side of the $NO_x$ absorbent, absorbs the $SO_x$ when the air-fuel ratio of the inflowing exhaust gas is lean and, at the same time, releases the absorbed $SO_x$ when the air-fuel ratio of the inflowing exhaust gas is made rich; and an air-fuel ratio control means which controls the air-fuel ratio of the exhaust gas flowing into the $SO_x$ absorbent to constantly maintain the air-fuel ratio of the exhaust gas flowing into the $SO_x$ absorbent lean and make the air-fuel ratio of the exhaust gas flowing into the $SO_x$ absorbent rich when the $SO_x$ should be released from the $SO_x$ absorbent.

BRIEF DESCRIPTION OF THE DRAWINGS

FIG. 28 is a timing chart of an $SO_x$ releasing control.

BEST MODE FOR WORKING THE INVENTION

Figure 1:
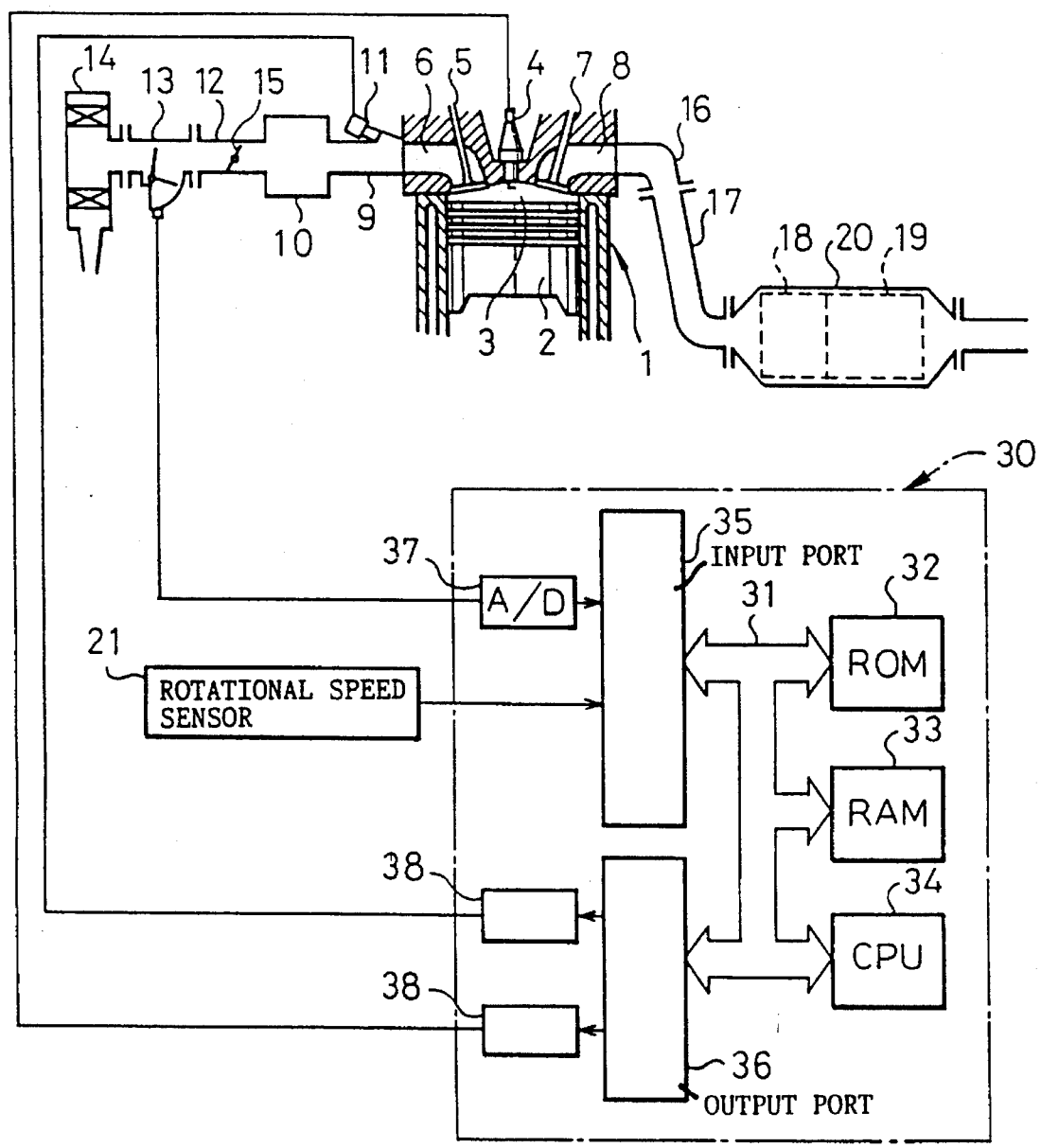
FIG. 1 is an overall view of an internal combustion engine.

FIG. 1 shows a case where the present invention is applied to a gasoline engine.

Referring to FIG. 1, 1 denotes an engine body; 2, a piston; 3, a combustion chamber; 4, a spark plug; 5, an intake valve; 6, an intake port; 7, an exhaust valve; and 8, an exhaust port; respectively. The intake port 6 is connected via a corresponding branch pipe 9 to a surge tank 10, and fuel injectors 11 for injecting the fuel toward inside the intake port 6 are attached to the respective branch pipes 9, respectively. The surge tank 10 is connected via an intake duct 12 and an air flow meter 13 to an air cleaner 14, and a throttle valve 15 is arranged in the intake duct 12. On the other hand, the exhaust port 8 is connected via the exhaust manifold 16 and the exhaust pipe 17 to a casing 20 accommodating an $SO_x$ absorbent 18 and an $NO_x$ absorbent 19. The $SO_x$ absorbent 18 is arranged on the upstream side of the $NO_x$ absorbent 19. In the embodiment shown in FIG. 1, the $SO_x$ absorbent 18 and the $NO_x$ absorbent 19 are integrally formed using one monolithic carrier made of for example alumina.

An electronic control unit 30 comprises a digital computer and is provided with a ROM (read only remory) 32, a RAM (random access memory) 33, a CPU (microprocessor) 34, an input port 35, and an output port 36, which are mutually connected by a bidirectional bus 31. The air flow meter 13 generates an output voltage in proportion to the intake air amount, and this output voltage is input via an AD converter 37 to the input port 35. Also, a rotational speed sensor 21 generating an output pulse expressing the engine rotational speed is connected to the input port 35. On the other hand, the output port 36 is connected via a corresponding drive circuit 38 to the spark plug 4 and, the fuel injector 11, respectively.

In the internal combustion engine shown in FIG. 1, the fuel injection time TAU is calculated based on for example the following equation:

$$TAU=TP \cdot K$$

Figure 2:
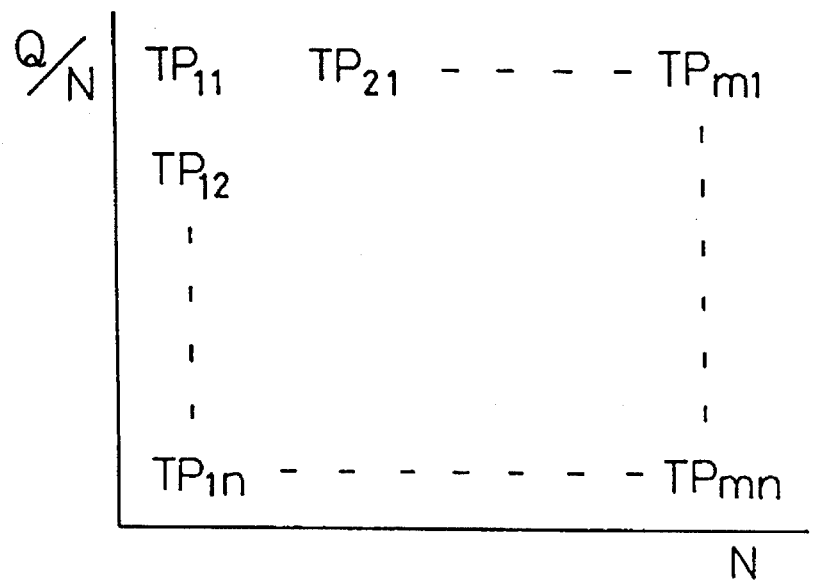
FIG. 2 is a view showing a map of a basic fuel injection time.

Here, TP indicates the basic fuel injection time; and K indicates the correction coefficient. The basic fuel injection time indicates a fuel injection time necessary for making the air-fuel ratio of the air-fuel mixture fed into the engine cylinder the stoichiometric air-fuel ratio. This basic fuel injection time TP is found in advance by experiments and stored in advance in the ROM 32 in the form of a map as shown in FIG. 2 as a function of the engine load Q/N (intake air amount Q/engine rotational speed N) and the engine rotational speed N. The correction coefficient K is a coefficient for controlling the air-fuel ratio of the air-fuel mixture fed into the engine cylinder, and if K=1.0, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, while when K becomes larger than 1.0, the air-fuel ratio of the air-fuel mixture fed into the engine cylinder becomes smaller than the stoichiometric air-fuel ratio, that is, becomes rich.

Figure 3:
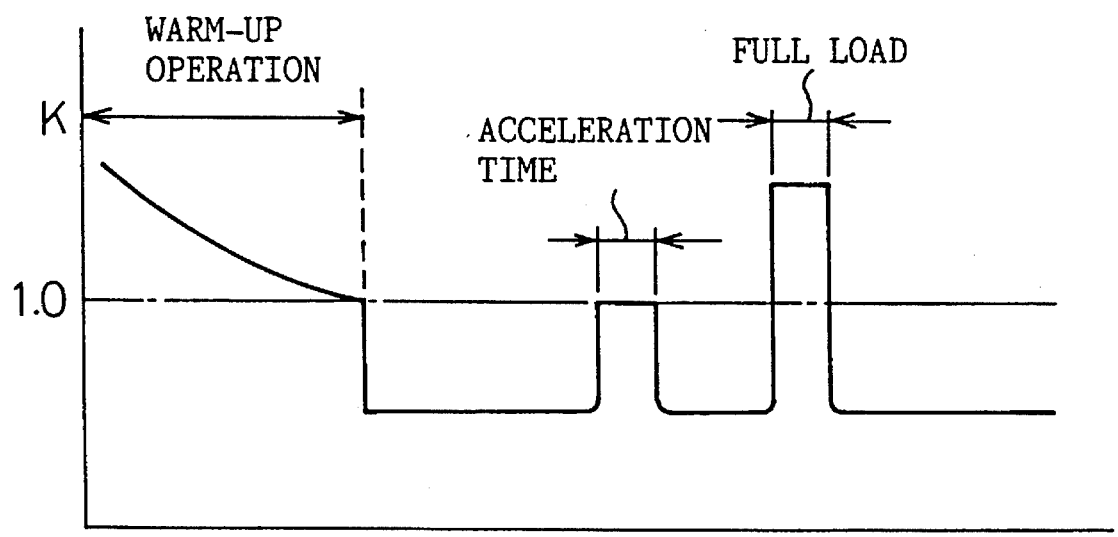
FIG. 3 is a view showing a change of a correction coefficient K.

This correction coefficient K is controlled in accordance with the operating state of the engine. FIG. 3 shows one embodiment of control of the correction coefficient K. In the embodiment shown in FIG. 3, during a warm-up operation, the correction coefficient K is gradually lowered as the engine coolant temperature becomes higher. When the warm up is completed, the correction coefficient K is maintained at a constant value smaller than 1.0, that is, the air-fuel ratio of the air-fuel mixture fed into the engine cylinder is maintained lean. Subsequently, when an acceleration operation is carried out, the correction coefficient K is made for example 1.0, that is, the air-fuel ratio of the air-fuel mixture fed into the engine cylinder is made the stoichiometric air-fuel ratio. When a full load operation is carried out, the correction coefficient K is made larger than 1.0, that is, the air-fuel ratio of the air-fuel mixture fed into the engine cylinder is made rich. As seen from FIG. 3, in an embodiment shown in FIG. 3, the air-fuel ratio of the air-fuel mixture fed into the engine cylinder is maintained at the constant lean air-fuel ratio except at the time of a warm-up operation, the time of an acceleration operation, and at the time of a full load operation, Accordingly in most of the engine operating regions, a lean air-fuel mixture will be burned.

Figure 4:
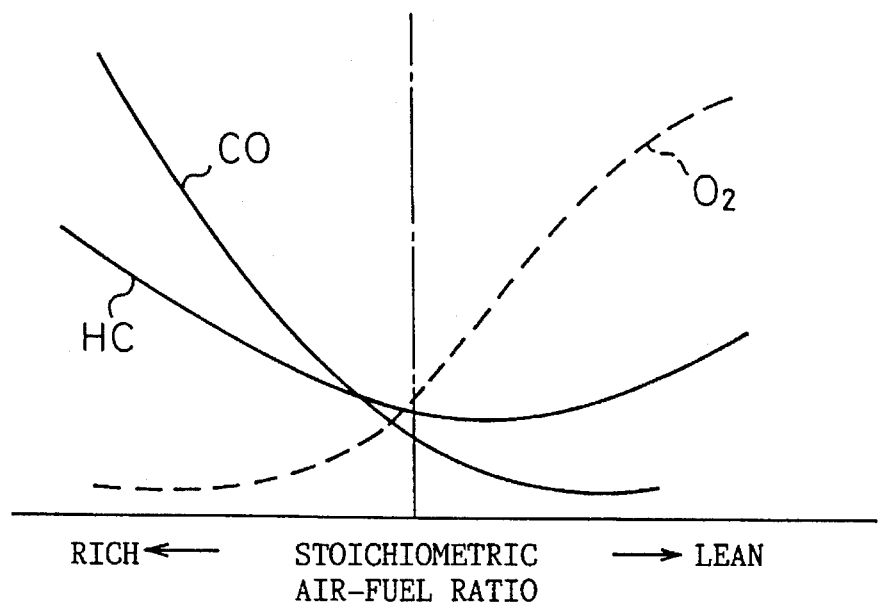
FIG. 4 is a graph schematically showing a concentration of unburnt HC and CO and oxygen in an exhaust gas discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, while the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 19 accommodated in the casing 20 uses for example alumina as the carrier. This carrier carries at least one substance selected from alkali metals such as potassium K, sodium Na, and cesium Cs, alkali earths such as barium Ba and calcium Ca, and rare earths such as lanthanum La and yttrium Y and a precious metal such as platinum Pt. Note that, desirably lithium Li is added to this $NO_x$ absorbent 19. When calling the ratio between the air and fuel (hydrocarbons) fed into the engine intake passage and the exhaust passage on the upstream side of the $NO_x$ absorbent 19 the air-fuel ratio of the inflowing exhaust gas to the $NO_x$ absorbent 19, this $NO_x$ absorbent 19 performs the function of $NO_x$ absorption and releasing of absorbing the $NO_x$ when the air-fuel ratio of the inflowing exhaust gas is lean, while releasing the absorbed $NO_x$ when the oxygen concentration in the inflowing exhaust gas is lowered. Note that, where the fuel (hydrocarbons) or air is not fed into the exhaust passage on the upstream side of the $NO_x$ absorbent 19, the air-fuel ratio of the inflowing exhaust gas coincides with the air-fuel ratio of the air-fuel mixture fed into the combustion chamber 3, and accordingly, in this case, the $NO_x$ absorbent 19 will absorb the $NO_x$ when the air-fuel ratio of the air-fuel mixture fed into the combustion chamber 3 is lean, while releases the absorbed $NO_x$ when the oxygen concentration in the air-fuel mixture fed into the combustion chamber 3 is lowered.

Figure 5A:
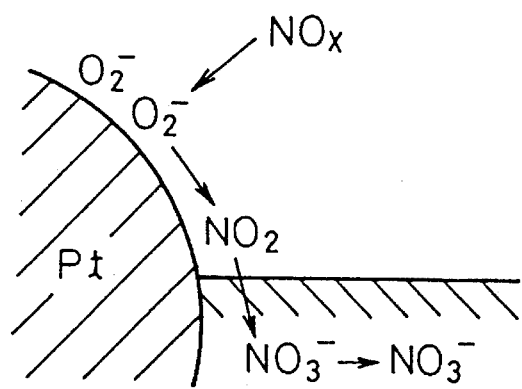
FIGS. 5A and 5B are views for explaining an $NO_x$ absorption and releasing function.
Figure 5B:
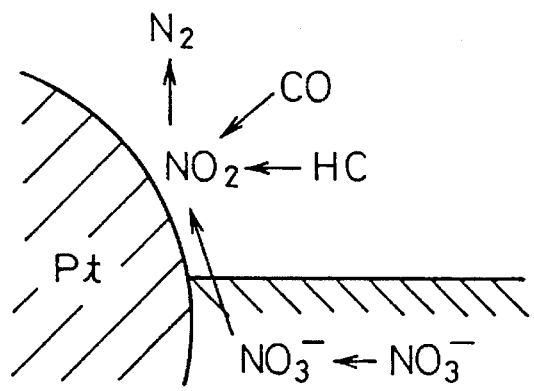

When the above-mentioned $NO_x$ absorbent 19 is arranged in the engine exhaust passage, this $NO_x$ absorbent 19 actually performs the $NO_x$ absorption and releasing action, but there are areas of uncertainty about the detailed mechanism of this absorption and releasing function. However, this absorption and releasing function is considered to be carried out by the mechanism as shown in FIGS. 5A and 5B. Next, this mechanism will be explained taking as an example a case where platinum Pt and barium Ba are carried on the carrier, but the same mechanism is realized even if another precious metal, alkali metal, alkali earths, or rare earths is used.

Namely, when the inflowing exhaust gas becomes considerably lean, the oxygen concentration in the inflowing exhaust gas is greatly increased, and as shown in FIG. 5A, this oxygen $O_2$ is deposited on the surface of the platinum Pt in the form of $O_2^-$ or $O^{2-}$. On the other hand, the NO in the inflowing exhaust gas is reacted with $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt, while absorbed into the absorbent, and bonded with the barium oxide BaO, while diffused in the form of the nitric acid ion $NO_3^-$ into the absorbent as shown in FIG. 5A. In this way, the $NO_x$ is absorbed into the $NO_x$ absorbent 19.

So far as the oxygen concentration in the inflowing exhaust gas is high, the $NO_2$ is produced on the surface of the platinum Pt, and so far as the $NO_x$ absorption capability of the absorbent is not saturated, the $NO_2$ is absorbed into the absorbent and the nitric acid ion $NO_3^-$ is produced. Contrary to this, when the oxygen concentration in the inflowing exhaust gas is lowered and the amount of production of $NO_2$ is lowered, the reaction is advanced in a reverse direction ($NO_3^- \rightarrow NO_2$), thus the nitric acid ion $NO_3^-$ in the absorbent is released in the form of $NO_2$ from the absorbent. Namely, this means that, when the oxygen concentration in the inflowing exhaust gas is lowered, the $NO_x$ will be released from the $NO_x$ absorbent 19. As shown in FIG. 4, when the degree of leanness of the inflowing exhaust gas becomes low, the oxygen concentration in the inflowing exhaust gas is lowered, and accordingly when the degree of leanness of the inflowing exhaust gas is lowered, even if the air-fuel ratio of the inflowing exhaust gas is lean, the $NO_x$ will be released from the $NO_x$ absorbent 19.

On the other hand, when the air-fuel ratio of the air-fuel mixture fed into the combustion chamber 3 is made rich and the air-fuel ratio of the inflowing exhaust gas becomes rich, as shown in FIG. 4, a large amount of unburnt HC and CO are discharged from the engine, and these unburnt HC and CO are reacted with the oxygen $O_2^-$ or $O^{2-}$ on the platinum Pt and oxidized. Also, when the air-fuel ratio of the inflowing exhaust gas becomes rich, the oxygen concentration in the inflowing exhaust gas is extremely lowered, and therefore the $NO_2$ is released from the absorbent, and this $NO_2$ is reacted with the unburnt HC and CO and reduced as shown in FIG. 5B. In this way, when the $NO_2$ no longer exists on the surface of the platinum Pt, the $NO_2$ is successively released from the absorbent. Accordingly, this means that, when the air-fuel ratio of the inflowing exhaust gas is made rich, $NO_x$ is released from the $NO_x$ absorbent 19 in a short time.

Namely, when the air-fuel ratio of the inflowing exhaust gas is made rich, first of all, the unburnt HC and CO are immediately reacted with the $O_2^-$ or $O^{2-}$ on the platinum Pt and oxidized, and subsequently if the unburnt HC and CO still remain even if the $O_2^-$ or $O^{2-}$ on the platinum Pt are consumed, the $NO_x$ released from the absorbent and the $NO_x$ discharged from the engine are reduced by these unburnt HC and CO. Accordingly, when the air-fuel ratio of the inflowing exhaust gas is made rich, the $NO_x$ absorbed in the $NO_x$ absorbent 19 is released in a short time, and in addition, this released $NO_x$ is reduced, and therefore this means that it is possible to prevent the discharge of $NO_x$ into the atmosphere. Also, the $NO_x$ absorbent 19 has a function of a reduction catalyst, and therefore even if the air-fuel ratio of the inflowing exhaust gas is made the stoichiometric air-fuel ratio, the $NO_x$ released from the $NO_x$ absorbent 19 is reduced. However, where the air-fuel ratio of the inflowing exhaust gas is made the stoichiometric air-fuel ratio, the $NO_x$ can be only gradually released from the $NO_x$ absorbent 19, and therefore a slightly long time is required for releasing all $NO_x$ absorbed in the $NO_x$ absorbent 19.

When the degree of leanness of the air-fuel ratio of the inflowing exhaust gas is made low as mentioned before, even if the air-fuel ratio of the inflowing exhaust gas is lean, the $NO_x$ is released from the $NO_x$ absorbent 19. Accordingly, so as to release the $NO_x$ from the $NO_x$ absorbent 19, it is sufficient if the oxygen concentration in the inflowing exhaust gas is lowered. Note, if the air-fuel ratio of the inflowing exhaust gas is lean even though the $NO_x$ is released from the $NO_x$ absorbent 19, the $NO_x$ is not reduced in the $NO_x$ absorbent 19, and accordingly in this case, it is necessary to provide a catalyst which can reduce the $NO_x$ on the downstream side of the $NO_x$ absorbent 19 or feed the reduction agent to the downstream side of the $NO_x$ absorbent 19. Of course, it is possible to reduce the $NO_x$ on the downstream side of the $NO_x$ absorbent 19 in this way, but it is rather preferred that the $NO_x$ be reduced in the $NO_x$ absorbent 19. Accordingly, when the $NO_x$ should be released from the $NO_x$ absorbent 19, it is more preferable that the air-fuel ratio of the inflowing exhaust gas be made the stoichiometric air-fuel ratio or rich.

As shown in FIG. 3, in the embodiment according to the present invention, the air-fuel ratio of the air-fuel mixture fed into the combustion chamber 3 is made rich at the time of the warm-up operation and at the time of full load operation and the air-fuel ratio of the air-fuel mixture is made the stoichiometric air-fuel ratio at the time of the acceleration operation, but in most of the operating region other than these, a lean air-fuel mixture is burned in the combustion chamber 3. In this case, the air-fuel ratio of the air-fuel mixture burned in the combustion chamber 3 is almost 18.0 or more, and in the embodiment shown in FIG. 1, a lean air-fuel mixture having an air-fuel ratio of about 20 to 24 is burned. When the air-fuel ratio becomes 18.0 or more, even if the three-way catalyst has a reduction property under a lean air-fuel ratio, it cannot sufficiently reduce the $NO_x$, and accordingly the three-way catalyst cannot be used for reducing the $NO_x$ under such a lean air-fuel ratio. Also, there is a Cu-zeolite catalyst as a catalyst which can reduce the $NO_x$ even if the air-fuel ratio is 18.0 or more, but this Cu-zeolite catalyst lacks heat resistance, and therefore it is not actually preferred that this Cu-zeolite catalyst be used. Accordingly, in the end, there is no way except that the $NO_x$ absorbent 19 which has been used in the present invention be used for removing the $NO_x$ when the air-fuel ratio is 18.0 or more.

In the embodiment according to the present invention, as mentioned above, at the time of the full load operation, the air-fuel ratio of the air-fuel mixture fed into the combustion chamber 3 is made rich, while at the time of an acceleration operation, the air-fuel ratio of the air-fuel mixture is made the stoichiometric air-fuel ratio, and therefore this means that the $NO_x$ is released from the $NO_x$ absorbent 19 at the time of the full load operation and at the time of the acceleration operation. However, when the frequency of such a full load operation or acceleration operation being carried out is small, even if the $NO_x$ is released from the $NO_x$ absorbent 19 only at the time of the full load operation and the time of the acceleration operation, the absorption capability of $NO_x$ by the $NO_x$ absorbent 19 is saturated during a period when the lean air-fuel mixture is burned, and thus the $NO_x$ can no longer be absorbed by the $NO_x$ absorbent 19. Accordingly, when the lean air-fuel mixture is being continuously burned, it is necessary to periodically make the air-fuel ratio of the inflowing exhaust gas rich or periodically make the air-fuel ratio of the inflowing exhaust gas the stoichiometric air-fuel ratio and periodically release the $NO_x$ from the $NO_x$ absorbent 19.

$SO_x$ is contained in the exhaust gas, and not only $NO_x$, but also $SO_x$ are absorbed into the $NO_x$ absorbent 19. It can be considered that the mechanism of the absorption of $SO_x$ into the $NO_x$ absorbent 19 is the same as the absorption mechanism of the $NO_x$.

Namely, when explaining this by taking as an example a case where platinum Pt and barium Ba are carried on the carrier in the same way as in the explanation of the absorption mechanism of $NO_x$, as mentioned before, when the air-fuel ratio of the inflowing exhaust gas is lean, the oxygen $O_2$ is deposited on the surface of the platinum Pt in the form of $O_2^-$ or $O^{2-}$, and the $SO_x$ in the inflowing exhaust gas reacts with the $O_2^-$ or $O^{2-}$ on the surface of the platinum Pt and becomes $SO_3$. Subsequently, a part of the produced $SO_3$ is further oxidized on the platinum Pt, while absorbed into the absorbent, and bonded with the barium oxide BaO, while diffused in the absorbent in the form of the sulfuric acid ion $SO_4^{2-}$ to produce a stable sulfate $BaSO_4$.

However, this sulfate $BaSO_4$ is stable and difficult to decompose, and even if the air-fuel ratio of the inflowing exhaust gas is made rich, the sulfate $BaSO_4$ remains as it is without decomposition. Accordingly, as the time is elapsed, the sulfate $BaSO_4$ is increased in the $NO_x$ absorbent 19, and thus as time elapses, the amount of $NO_x$ that can be absorbed by the $NO_x$ absorbent 19 will be lowered.

Therefore, in the embodiment according to the present invention, so as to prevent the $SO_x$ from flowing into the $NO_x$ absorbent 19, an $SO_x$ absorbent 18 which absorbs the $SO_x$ when the air-fuel ratio of the inflowing exhaust gas is lean, while releases the absorbed $SO_x$ when the air-fuel ratio of the inflowing exhaust gas becomes rich and, at the same time, has a function of the three-way catalyst, is arranged on the upstream side of the $NO_x$ absorbent 19. This $SO_x$ absorbent 18 absorbs also $NO_x$ together with $SO_x$ when the air-fuel ratio of the exhaust gas flowing into the $SO_x$ absorbent 18 is lean, but releases not only the absorbed $NO_x$, but also the absorbed $SO_x$ when the air-fuel ratio of the exhaust gas flowing into the $SO_x$ absorbent 18 is made rich.

As mentioned above, in the $NO_x$ absorbent 19, when the $SO_x$ is absorbed, a stable sulfate $BaSO_4$ is formed, and as a result, even if the air-fuel ratio of the exhaust gas flowing into the $NO_x$ absorbent 19 is made rich, the $SO_x$ no longer will be released from the $NO_x$ absorbent 19. Accordingly, so as to release the $SO_x$ from the $SO_x$ absorbent 18 when the air-fuel ratio of the exhaust gas flowing into the $SO_x$ absorbent 18 is made rich, it becomes necessary to make the absorbed $SO_x$ exist in the absorbent in the form of the sulfuric acid ion $SO_4^{2-}$, or to make the sulfate $BaSO_4$ exist in the absorbent in an unstable state even if the sulfate $BaSO_4$ is produced. As the $SO_x$ absorbent 18 enabling this, use can be made of an absorbent which carries at least one member selected from a transition metal such as copper Cu, iron Fe, manganese Mn, and nickel Ni, sodium Na, tin Sn, titanium Ti, and lithium Li on a carrier made of alumina. In this case, it is clarified that the absorbent carrying the lithium Li on the carrier made of alumina is the most preferred.

In this $SO_x$ absorbent 18, when the air-fuel ratio of the exhaust gas flowing into the $SO_x$ absorbent 18 is lean, the $SO_x$ contained in the exhaust gas is oxidized on the surface of the absorbent and absorbed into the absorbent in the form of the sulfuric acid ion $SO_4^{2-}$ and then diffused in the absorbent. In this case, when the platinum Pt is caught on the carrier of the $SO_x$ absorbent 18, $SO_x$ becomes easily adhered onto the platinum Pt in the form of $SO_3^{2-}$, and thus the $SO_2$ becomes easily absorbed into the absorbent in the form of the sulfuric acid ion $SO^{2-}$. Accordingly, so as to promote the absorption of the $SO_2$, preferably the platinum Pt is carried on the carrier of the $SO_x$ absorbent 18. As mentioned above, when the air-fuel ratio of the exhaust gas flowing into the $SO_x$ absorbent 18 becomes lean, the $SO_x$ is absorbed into the $SO_x$ absorbent 18, and accordingly only the $NO_x$ is absorbed into the $NO_x$ absorbent 19 provided on the downstream side of the $SO_x$ absorbent 18.

On the other hand, as mentioned before, the $SO_x$ absorbed in the $SO_x$ absorbent 18 has been diffused in the absorbent in the form of the sulfuric acid ion $SO_4^{2-}$, or has become the sulfate $BaSO_4$ in an unstable state. Accordingly, when the air-fuel ratio of the exhaust gas flowing into the $SO_x$ absorbent 18 becomes rich, the $SO_x$ absorbed in the $SO_x$ absorbent 18 will be released from the $SO_x$ absorbent 18. At this time, the $NO_x$ is simultaneously released from the $NO_x$ absorbent 19.

Figure 6:
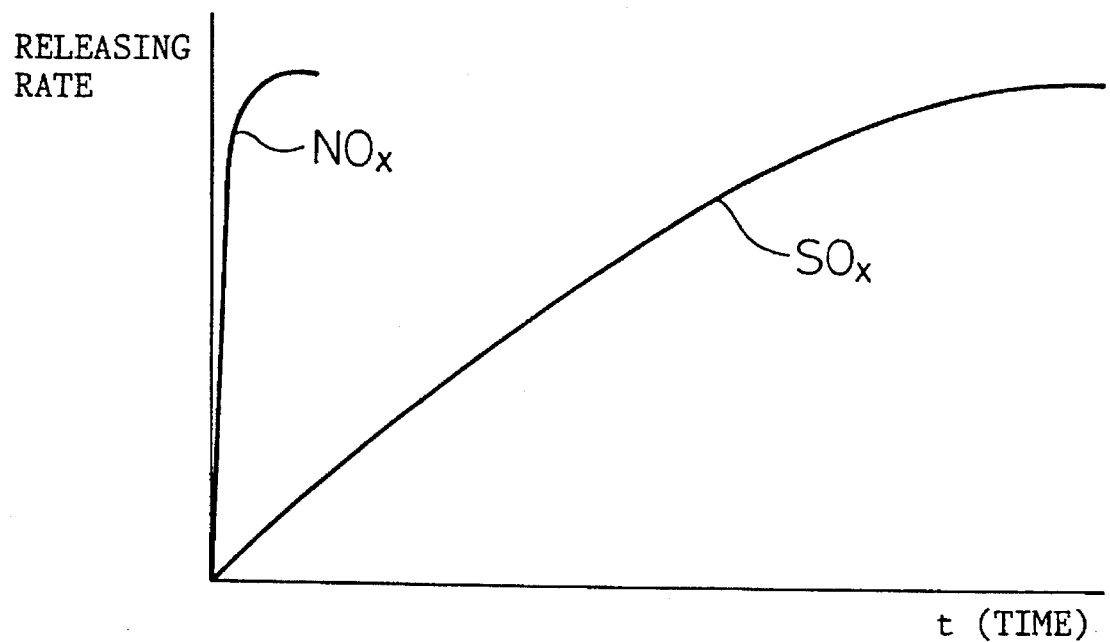
FIG. 6 is a view showing a releasing timing of the $NO_x$ and $SO_x$.

As mentioned before, when the $NO_2$ on the surface of the platinum Pt no longer exists, in the $NO_x$ absorbent 19, the reaction is immediately advanced in the direction of ($NO_3^- \rightarrow NO_2$), and the $NO_x$ is immediately released from the absorbent. When the air-fuel ratio of the exhaust gas flowing into the $NO_x$ absorbent 19 is made rich, the $NO_2$ on the surface of platinum Pt is immediately reduced by the unburnt HC and CO, and therefore the $NO_2$ on the surface of the platinum Pt immediately disappears, and thus, as shown in FIG. 6, the $NO_x$ will be released from the $NO_x$ absorbent in a short time. Namely, this means that the $NO_x$ releasing speed of the $NO_x$ absorbent 19 is considerably high.

Contrary to this, the $SO_x$ absorbed in the $SO_x$ absorbent 18 is difficult to decompose since it is more stable than the $NO_x$ absorbed in the $NO_x$ absorbent 19. The decomposition of this $SO_x$ is not caused unless the air-fuel ratio of the exhaust gas flowing into the $SO_x$ absorbent 18 is made rich. Namely, when the air-fuel ratio of the exhaust gas flowing into the $SO_x$ absorbent 18 is made rich, the $SO_x$ in the $SO_x$ absorbent 18 is decomposed and released from the absorbent. This decomposition speed is considerably slow, and thus, as shown in FIG. 6, even if the air-fuel ratio of the inflowing exhaust gas to the $SO_x$ absorbent 18 is made rich, a long time is required until the releasing of the $SO_x$ is completed in comparison with $NO_x$. Namely, this means that the releasing speed of the $SO_x$ is considerably slow in comparison with the releasing speed of the $NO_x$.

As mentioned before, when the $NO_x$ should be released from the $NO_x$ absorbent 19, preferably the air-fuel ratio of the inflowing exhaust gas is made the stoichiometric air-fuel ratio or rich. However, if the air-fuel ratio of the inflowing exhaust gas is not made rich, the $SO_x$ is not released from the $SO_x$ absorbent 18. Accordingly, in the embodiment according to the present invention, when the $SO_x$ should be released from the $SO_x$ absorbent 18 and the $NO_x$ should be released from the $NO_x$ absorbent 19, the air-fuel ratio of the inflowing exhaust gas is made rich.

When the air-fuel ratio of the inflowing exhaust gas is made rich, the $SO_x$ is released from the $SO_x$ absorbent 18, and the $NO_x$ is released from the $NO_x$ absorbent 19. However, if the $SO_x$ released from the $SO_x$ absorbent 18 flows into the $NO_x$ absorbent 19 when the $NO_2$ is being released from the $NO_x$ absorbent 19, the $SO_2$ and the $NO_2$ are reacted in the $NO_x$ absorbent 19 ($SO_2+NO_2 \rightarrow SO_3+NO$), and thus the produced $SO_3$ is absorbed into the $NO_x$ absorbent 19 in the form of $SO_4^-$. However, as mentioned before, the releasing speed of the $NO_x$ is considerably slower than the releasing speed of the $SO_x$ as shown in FIG. 6, and accordingly the most part of the $SO_2$ released from the $SO_x$ absorbent 18 flows into the $NO_x$ absorbent 19 after the $NO_x$ releasing action from the $NO_x$ absorbent 19 is completed. Accordingly, the amount of $SO_x$ absorbed into the $NO_x$ absorbent 19 becomes small.

On the other hand, in the embodiment shown in FIG. 1, the releasing action of the $SO_x$ from the $SO_x$ absorbent 18 and the releasing action of the $NO_x$ from the $NO_x$ absorbent 19 are carried out when the predetermined amount of $NO_x$ is absorbed into the $NO_x$ absorbent 19, for example, the $NO_x$ absorbent 19 absorbs the $NO_x$ in an amount of 50 percent based on the total absorption capability of the same. The amount of the $NO_x$ absorbed into the $NO_x$ absorbent 19 is in proportion to the amount of the exhaust gas discharged from engine and the $NO_x$ concentration in the exhaust gas. In this case, the exhaust gas amount is in proportion to the intake air amount, and the concentration of $NO_x$ in the exhaust gas is in proportion to the engine load, and therefore the amount of $NO_x$ absorbed into the $NO_x$ absorbent 19 becomes correctly in proportion to the intake air amount and engine load. Accordingly, the amount of the $NO_x$ absorbed in the $NO_x$ absorbent 19 can be estimated from the cumulative value of the product of the intake air amount and the engine load, but in the embodiment shown in FIG. 1, it is simplified and the amount of $NO_x$ absorbed in the $NO_x$ absorbent 19 is estimated from the cumulative value of the engine rotational speed.

Next, an explanation will be made of one embodiment of the absorption and releasing control of the $NO_x$ absorbent 19 referring to FIG. 7 and FIG. 8.

Figure 7:
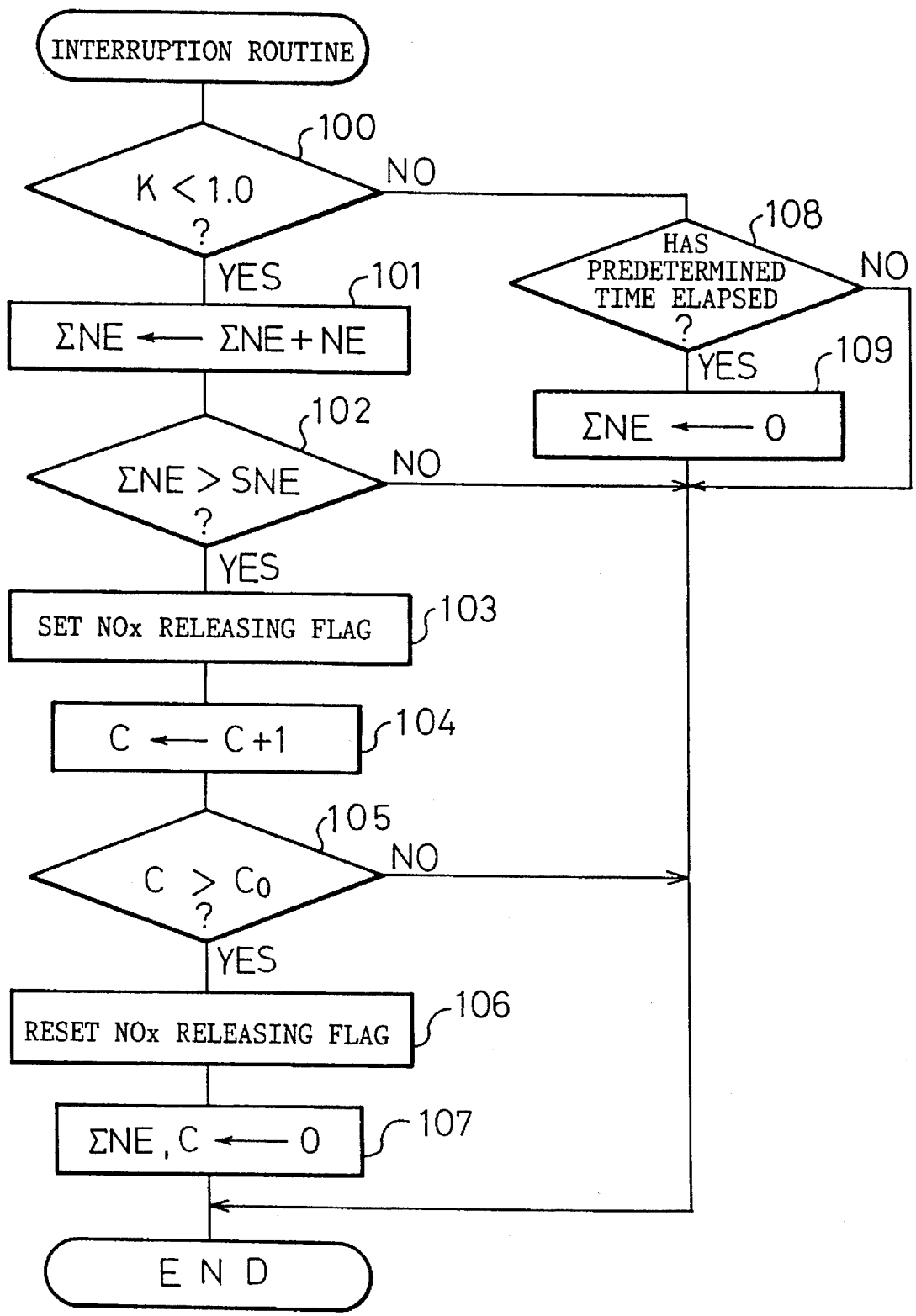
FIG. 7 is a flow chart showing an interruption routine.

FIG. 7 shows an interruption routine executed at every predetermined time interval.

Referring to FIG. 7, first of all, at step 100, it is determined whether or not the correction coefficient K with respect to the basic fuel injection time TP is smaller than 1.0, that is, whether or not a lean air-fuel mixture is being burned. When K<1.0, that is, when a lean air-fuel mixture is being burned, the processing routine goes to step 101, at which the result of addition of ΣNE to the current engine rotational speed NE is made ΣNE. Accordingly, this ΣNE indicates the cumulative value of the engine rotational speed NE. Subsequently, at step 102, it is determined whether or not the cumulative rotational speed ΣNE is larger than the constant value SNE. This constant value SNE indicates the cumulative rotational speed from which it is estimated that the $NO_x$ in an amount of for example 50 percent based on the total $NO_x$ absorption capability of the $NO_x$ absorbent 19 has been absorbed in the $NO_x$ absorbent 19. When ΣNE≦SNE, the processing cycle is completed, while when ΣNE>SNE, that is, when it is estimated that the $NO_x$ in an amount of 50 percent based on the total $NO_x$ absorption capability of the $NO_x$ absorbent 19 has been absorbed in the $NO_x$ absorbent 19, the processing routine goes to step 103, at which the $NO_x$ releasing flag is set. When the $NO_x$ releasing flag is set, as will be mentioned later, the air-fuel ratio of the air-fuel mixture to be fed into the engine cylinder is made rich.

Subsequently, at step 104, the count value C is incremented exactly by one. Subsequently, at step 105, it is determined whether or not the count value C becomes larger than the constant value $C_0$, that is whether or not for example 5 seconds have elapsed. When C≦$C_0$, the processing routine is completed, and when C becomes smaller than $C_0$, the processing routine goes to step 106, at which the $NO_x$ releasing flag is reset. When the $NO_x$ releasing flag is reset, as will be mentioned later, the air-fuel ratio of the air-fuel mixture fed into the engine cylinder is switched from rich to lean, and thus the air-fuel ratio of the air-fuel mixture fed into the engine cylinder is made rich for 5 seconds. Subsequently, at step 107, the cumulative rotational speed ΣNE and the count value C are made zero.

On the other hand, at step 100, when it is decided that K≧1.0, that is, when the air-fuel ratio of the air-fuel mixture being fed into the engine cylinder is the stoichiometric air-fuel ratio or rich, the processing routine goes to step 108, at which it is determined whether or not the state of K≧1.0 is continued for the predetermined time, for example, 10 seconds. When the state of K≧1.0 is not continued for the predetermined time, the processing cycle is completed, and when the state of K≧1.0 is continued for the constant time, the processing routine goes to step 109, at which the cumulative rotational speed ΣNE is made zero.

Namely, when the time during which the air-fuel ratio of the air-fuel mixture fed into the engine cylinder is made the stoichiometric air-fuel ratio or rich continues for about 10 seconds, it is considered that the most part of the $SO_x$ absorbed in the $SO_x$ absorbent 18 was released and, at the same time, the most part of the $NO_x$ absorbed in the $NO_x$ absorbent 19 was released, and accordingly, in this case, the cumulative rotational speed ΣNE is made zero at step 109.

Figure 8:
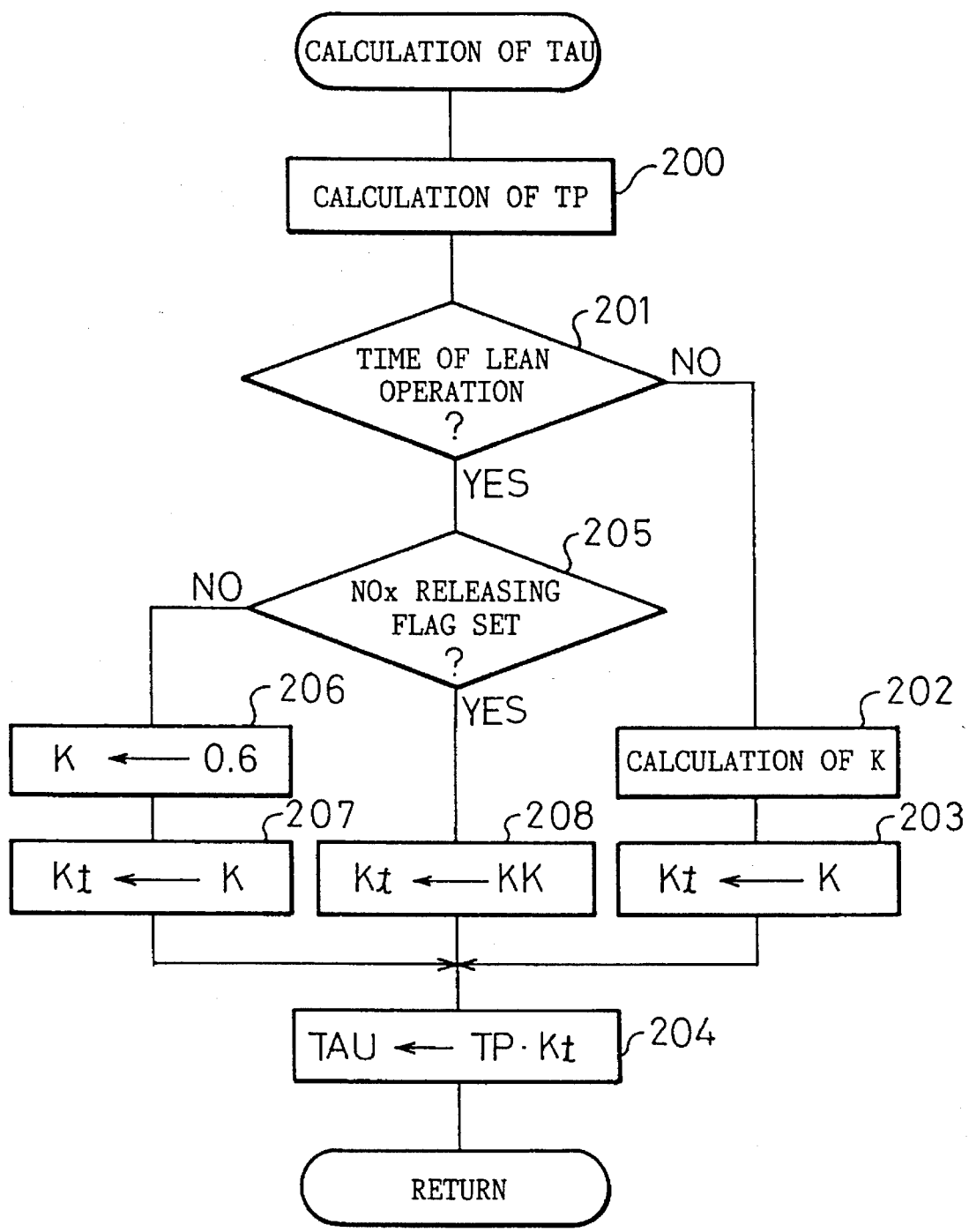
FIG. 8 is a flow chart for calculating a fuel injection time TAU.

FIG. 8 shows a calculation routine of the basic fuel injection time TAU, which routine is repeatedly executed.

Referring to FIG. 8, first, at step 200, the basic fuel injection time TP is calculated from the map shown in FIG. 2. Subsequently, at step 201, it is determined whether or not the operation state is that where the combustion of a lean air-fuel mixture should be carried out. When it is not the operation state where the combustion of a lean air-fuel mixture should be carried out, that is, at the time of the warm-up operation or the time of the acceleration operation or the time of the full load operation, the processing routine goes to step 202, at which the correction coefficient K is calculated, At the time of the engine warm-up operation, this correction coefficient K is a function of the engine coolant temperature and becomes smaller within the range where K≧1.0 as the engine coolant temperature becomes higher. Also, at the time of the acceleration operation, the correction coefficient K is made 1.0, and at the time of the full load operation, the correction coefficient K is made a value larger than 1.0. Subsequently, at step 203, the correction coefficient K is made Kt, and then at step 204, the fuel injection time TAU (=TP·Kt) is calculated. At this time, the air-fuel ratio of the air-fuel mixture fed into the engine cylinder is made the stoichiometric air-fuel ratio or rich.

On the other hand, when it is determined at step 201 that it is the operation state where the combustion of a lean air-fuel mixture should be carried out, the processing routine goes to step 205, at which it is determined whether or not the $NO_x$ releasing flag has been set. When the $NO_x$ releasing flag has not been set, the processing routine goes to step 206, at which the correction coefficient K is made for example 0.6, and then at step 207, after the correction coefficient K is made Kt, the processing routine goes to step 204. Accordingly, at this time, the lean air-fuel mixture is fed into the engine cylinder. On the other hand, when it is decided at step 205 that the $NO_x$ releasing flag is set, the processing routine goes to step 208, at which the predetermined value KK is made Kt, and then the processing routine goes to step 204. This value KK is a value of about 1.1 to 1.2 with which the air-fuel ratio of the air-fuel mixture fed into the engine cylinder becomes about 12.0 to 13.5. Accordingly, at this time, the rich air-fuel mixture is fed into the engine cylinder, whereby the $SO_x$ absorbed in the $SO_x$ absorbent 18 will be released and, at the same time, the $NO_x$ absorbed in the $NO_x$ absorbent 19 will be released.

Figure 9:
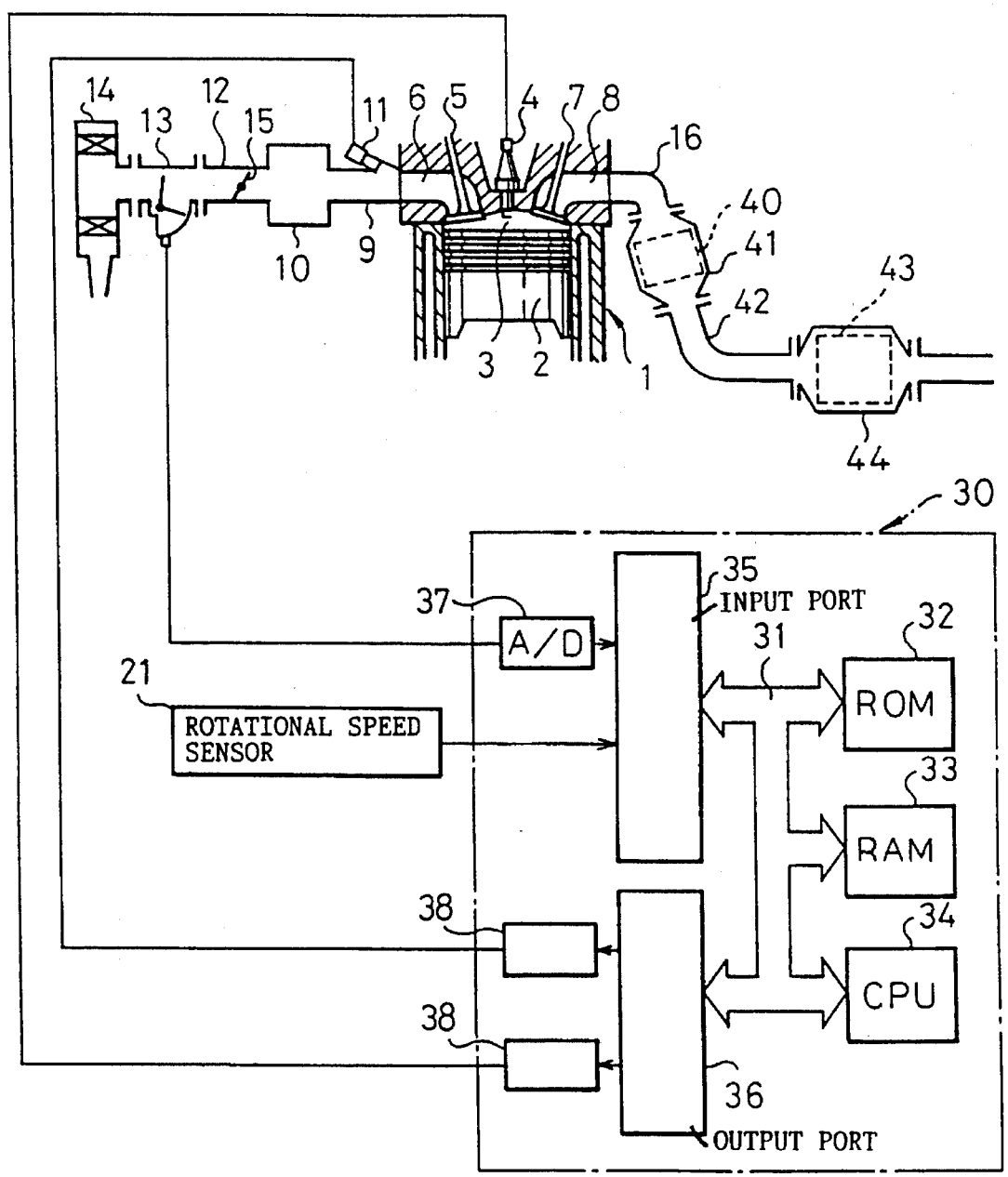
FIG. 9 is an overall view showing another embodiment of the internal combustion engine.

FIG. 9 shows another embodiment. In this embodiment, the same constituent elements as those shown in FIG. 1 are indicated by the same symbols.

As shown in FIG. 9, in this embodiment, an exhaust manifold 16 is connected to the inlet portion of a casing 41 containing an $SO_x$ absorbent 40, and the outlet portion of the casing 40 is connected via the exhaust pipe 42 to the inlet portion of a casing 44 containing an $NO_x$ absorbent 43. Also in this embodiment, when the lean air-fuel mixture is being burned in the combustion chamber 3, the $SO_x$ is absorbed into the $SO_x$ absorbent 40 and, at the same time, the $NO_x$ is absorbed into the $NO_x$ absorbent 43. On the other hand, when the air-fuel ratio of the air-fuel mixture fed into the combustion chamber 3 is made rich, the $SO_x$ is released from the $SO_x$ absorbent 40, and the $NO_x$ is released from the $NO_x$ absorbent 43.

Figure 10:
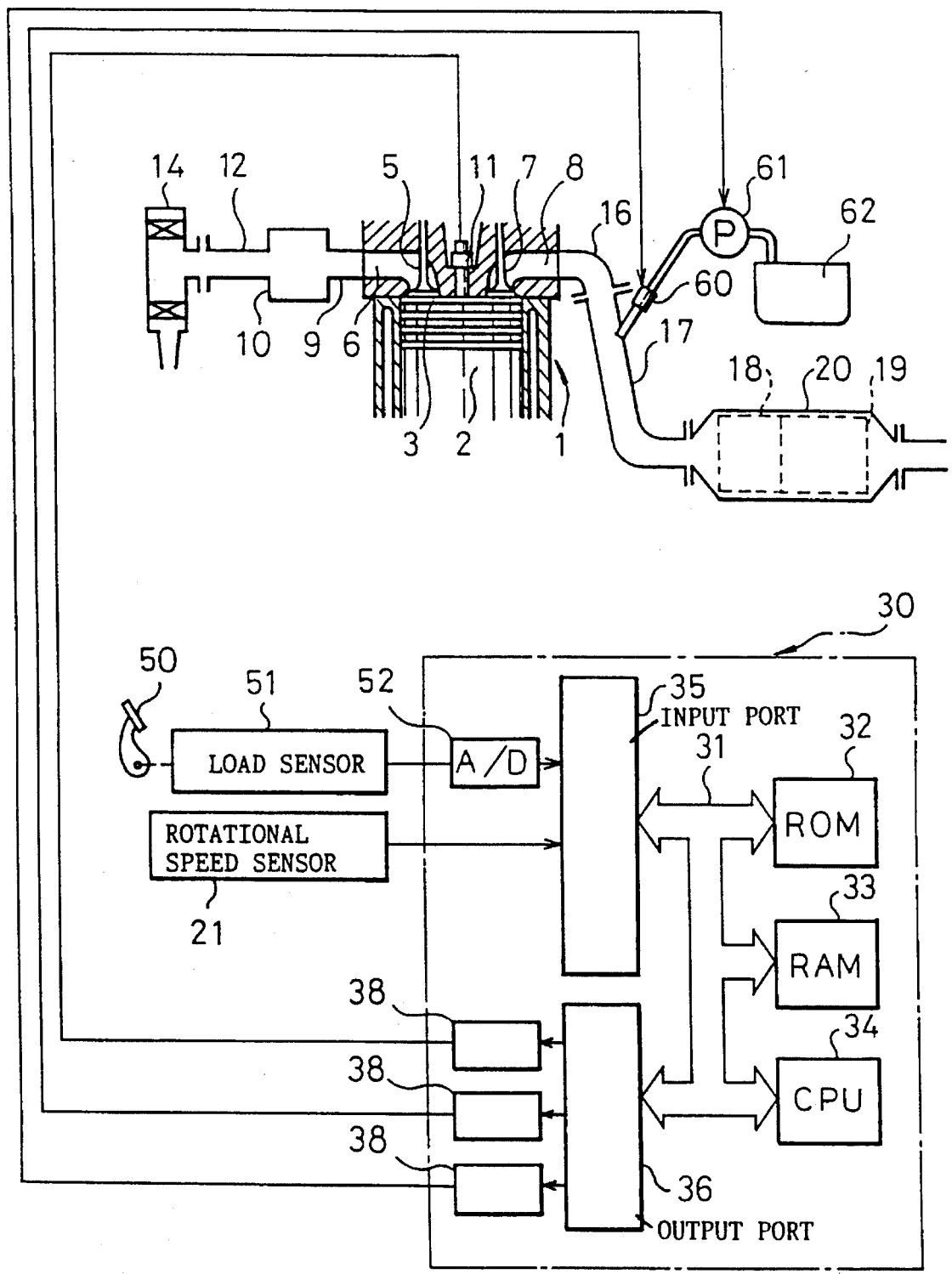
FIG. 10 is an overall view showing still another embodiment of the internal combustion engine.

FIG. 10 shows a case where the present invention is applied to a diesel engine. Note that, in FIG. 10, constituent elements the same as those shown in FIG. 1 are indicated by the same symbols.

In the diesel engine, usually in all operation states, combustion is performed in a state where an air excess rate is 1.0 or more, that is, the average air-fuel ratio of the air-fuel mixture in the combustion chamber 3 is lean. Accordingly, the $SO_x$ discharged at this time is absorbed into the $SO_x$ absorbent 18, and the $NO_x$ discharged at this time is absorbed into the $NO_x$ absorbent 19. On the other hand, when the $SO_x$ should be released from the $SO_x$ absorbent 18 and, at the same time, the $NO_x$ should be released from the $NO_x$ absorbent 19, the air-fuel ratio of the exhaust gas flowing into the $SO_x$ absorbent 18 and the $NO_x$ absorbent 19 is made rich. In this case, in the embodiment shown in FIG. 10, the average air-fuel ratio of the air-fuel mixture in the combustion chamber 3 is made lean and the hydrogen carbide is fed into the engine exhaust passage on the upstream side of the $SO_x$ absorbent 18, whereby the air-fuel ratio of the inflowing exhaust gas to the $SO_x$ absorbent 18 and the $NO_x$ absorbent 19 is made rich.

Referring to FIG. 10, in this embodiment, a load sensor 51 generating an output voltage in proportion to an amount of depression of an accelerator pedal 50 is provided, and the output voltage of this load sensor 51 is input via the AD converter 52 to the input port 35. Also, in this embodiment, a reduction agent feeding valve 60 is arranged in an exhaust pipe 17, which reduction agent feeding valve 60 is connected via a feeding pump 61 to a reduction agent tank 62. The output port 36 of the electronic control unit 30 is connected via drive circuits 38 to the reduction agent feeding valve 60 and the feeding pump 61, respectively. In the reduction agent tank 62, a hydrocarbon such as gasoline, isooctane, hexane, heptane, light oil or a lamp oil, or a hydrocarbon which can be stored in a liquid state, for example, butane or propane is filled.

In this embodiment, the air-fuel mixture in the combustion chamber 3 is usually burned under an excess of air, that is, in a state where the average air-fuel ratio is lean. At this time, the $SO_x$ discharged from the engine is absorbed into the $SO_x$ absorbent 18 and, at the same time, the $NO_x$ discharged from the engine is absorbed into the $NO_x$ absorbent 19. When the $SO_x$ should be released from the $SO_x$ absorbent 18 and, at the same time the $NO_x$ should be released from the $NO_x$ absorbent 19, the feeding pump 61 is driven and, at the same time, the reduction agent feeding valve 60 is opened, whereby the hydrocarbon filled in the reduction agent tank 62 is fed from the reduction agent feeding valve 60 to the exhaust pipe 17 for a constant time, for example, about 5 seconds to 20 seconds. The amount of feeding of the hydrocarbon at this time is determined so that the air-fuel ratio of the inflowing exhaust gas flowing into the $SO_x$ absorbent 18 and the $NO_x$ absorbent 19 becomes rich, and accordingly, at this time, the $SO_x$ will be released from the $SO_x$ absorbent 18, and the $NO_x$ will be released from the $NO_x$ absorbent 19.

Figure 11:
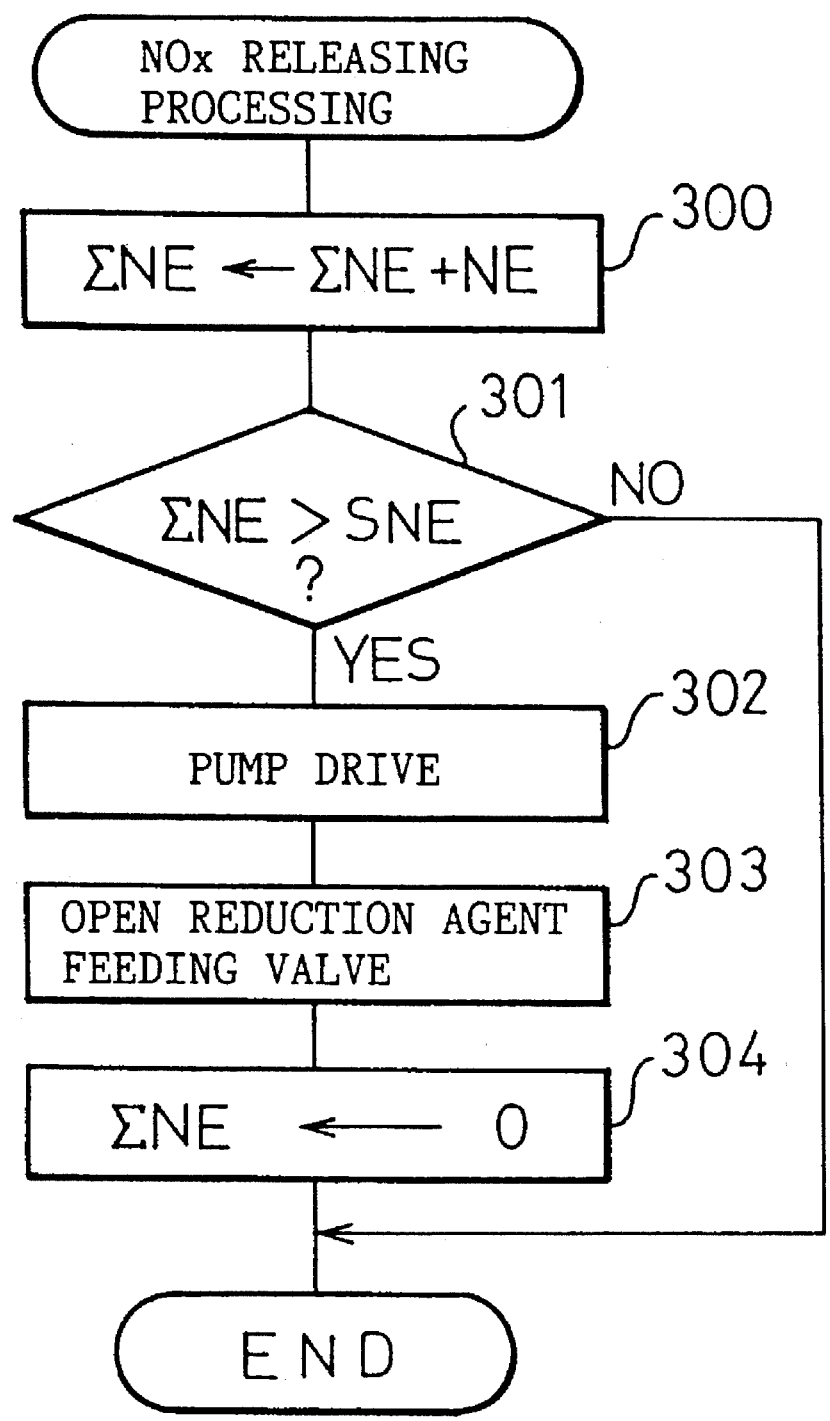
FIG. 11 is a flow chart for performing the $NO_x$ releasing processing.

FIG. 11 shows a routine for executing this $NO_x$ releasing processing, which routine is executed by interruption at every predetermined time interval.

Referring to FIG. 11, first of all, at step 300, the result of addition of $\Sigma NE$ to the current engine rotational speed NE is made $\Sigma NE$. Accordingly, this $\Sigma NE$ indicates the cumulative value of the engine rotational speed NE. Subsequently, at step 301, it is determined whether or not the cumulative rotational speed $\Sigma NE$ is larger than the constant value SNE. This constant value SNE indicates the cumulative rotational speed from which it is estimated that the $NO_x$ in an amount of for example 50 percent based on the total $NO_x$ absorption capability of the $NO_x$ absorbent 19 has been absorbed in the $NO_x$ absorbent 19. When $\Sigma NE \leq SNE$, the processing cycle is completed, while when $\Sigma NE > SNE$, that is, when it is estimated that the $NO_x$ in an amount of 50 percent based on the total $NO_x$ absorption capability of the $NO_x$ absorbent 19 has been absorbed in the $NO_x$ absorbent 19, the processing routine goes to step 302, at which the feeding pump 61 is driven for a constant time, for example, for about 5 seconds to 20 seconds. Subsequently, at step 303, the reduction agent feeding valve 60 is opened for a constant time, for example, for about 5 seconds to 20 seconds, and then, at step 304, the cumulative rotational speed $\Sigma NE$ is made zero.

Figure 12:
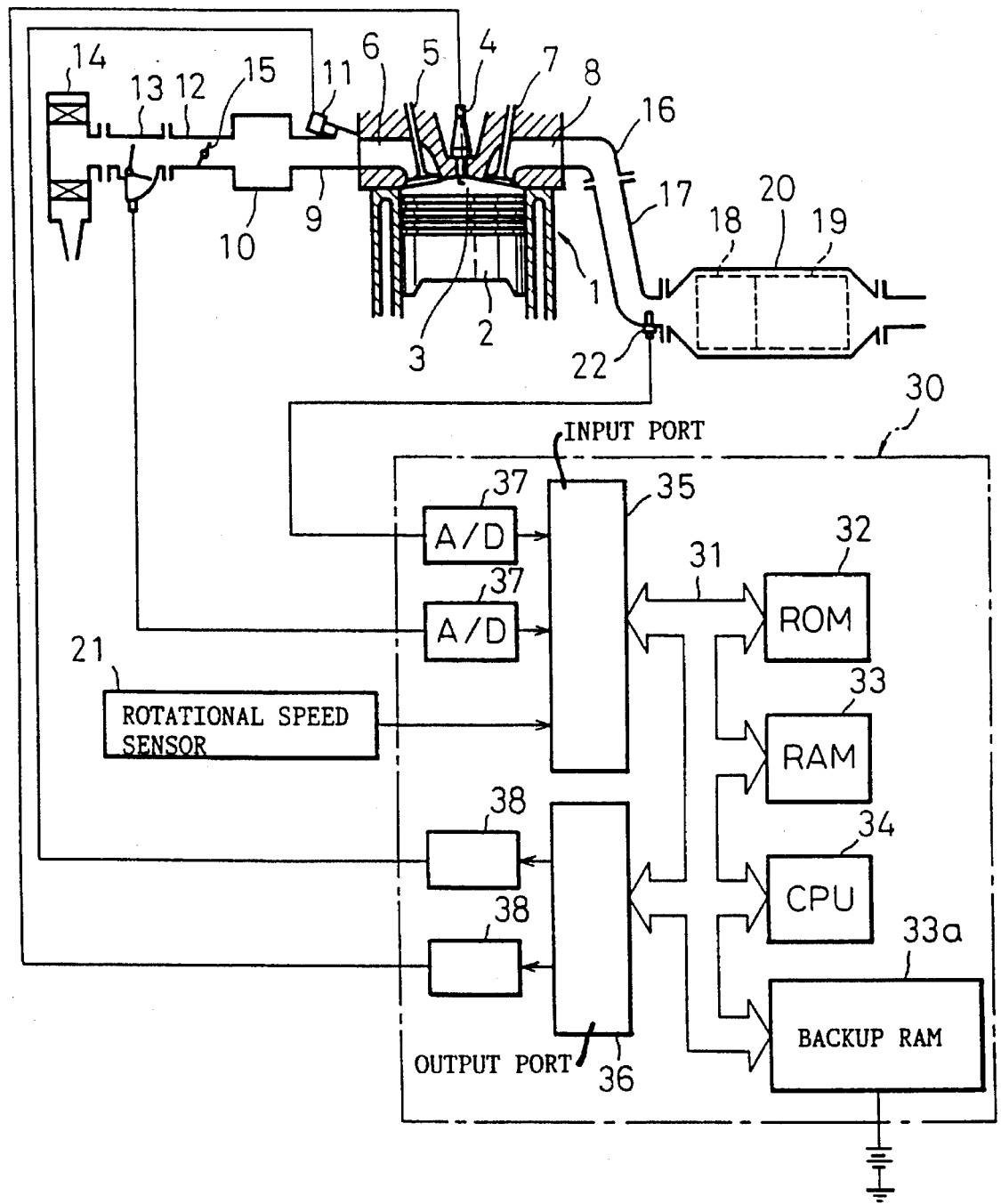
FIG. 12 is an overall view showing further another embodiment of the internal combustion engine.

FIG. 12 shows a further embodiment. Note that, in FIG. 12, constituent elements the same as those shown in FIG. 1 are indicated by the same symbols.

Referring to FIG. 12, in this embodiment, a temperature sensor 22 is arranged in the exhaust pipe 17 on the upstream side of the casing 20. This temperature sensor 22 generates an output voltage in proportion to the exhaust gas temperature flowing in the exhaust pipe 17, and this output voltage is input to the input port 35 via the AD converter 37. Further, in this embodiment, a bidirectional bus 31 is connected to a backup RAM 33a always connected to the power source.

This embodiment prevents the $SO_x$ released from the $SO_x$ absorbent 18 from being absorbed into the $NO_x$ absorbent 19 as much as possible. Note that, in this embodiment, the releasing control of the $SO_x$ and $NO_x$ is carried out considering also the temperature of the $SO_x$ absorbent 18, Accordingly, first of all, an explanation will be made of a relationship between the temperature of the $SO_x$ absorbent 18 and the releasing function of the $SO_x$.

Figure 13:
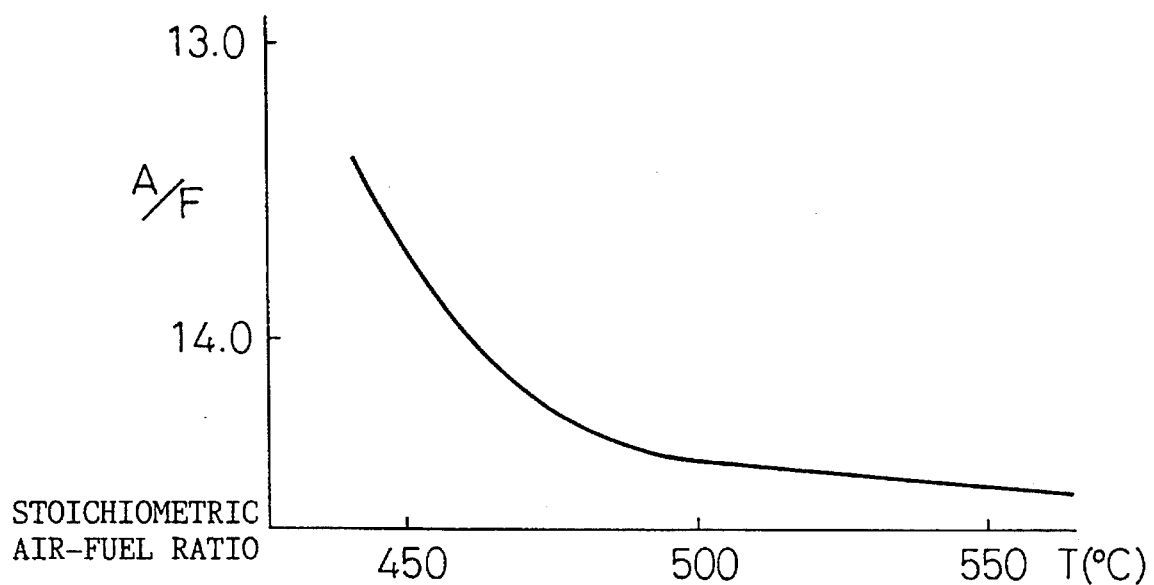
FIG. 13 is a view showing a releasing characteristic of the $SO_x$.

Namely, the decomposition function of the $SO_x$ absorbed in the $SO_x$ absorbent 18 depends on the temperature of the $SO_x$ absorbent 18, and the decomposition becomes more difficult as the temperature of the $SO_x$ absorbent 18 becomes lower. Accordingly, as the temperature of the $SO_x$ absorbent 18 becomes lower, the $SO_x$ becomes harder to be decomposed unless the air-fuel ratio of the air-fuel mixture flowing into the $SO_x$ absorbent 18 is made rich, and thus this means that the $SO_x$ is not released from the $SO_x$ absorbent 18. FIG. 13 shows a relationship between the air-fuel ratio A/F of the inflowing exhaust gas with which the $SO_x$ absorbent 18 can release the $SO_x$ and the temperature T of the $SO_x$ absorbent 18. It is seen from FIG. 13 that, so as to release the $SO_x$, the air-fuel ratio of the exhaust gas flowing into the $SO_x$ absorbent 18 must been made richer as the temperature T of the $SO_x$ absorbent 18 becomes lower.

Figure 14:
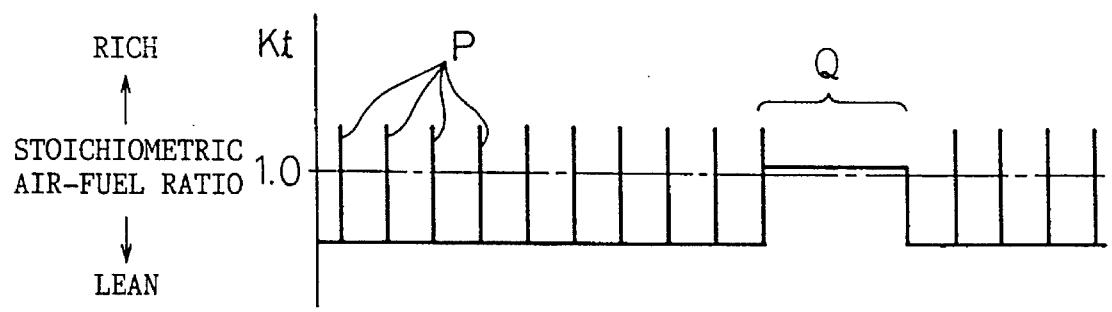
FIG. 14 is a view showing the $SO_x$ and $NO_x$ releasing timing.

Also in this embodiment, when the $NO_x$ and $SO_x$ should be released, the air-fuel mixture fed into the combustion chamber 3 is periodically made rich, and FIG. 14 shows a timing at which the air-fuel ratio of the air-fuel mixture is made rich in this way. Note that, in FIG. 14, P indicates a timing at which the $NO_x$ is released from the $NO_x$ absorbent 19, and Q indicates a timing at which the $SO_x$ is released from the $SO_x$ absorbent 18. As seen from FIG. 14, so as to release the $NO_x$ from the $NO_x$ absorbent 19, the period for which the air-fuel ratio of the air-fuel mixture is made rich is considerably short, and the air-fuel ratio of air-fuel mixture is made rich with a proportion of one time per several minutes. On the other hand, the amount of $SO_x$ contained in the exhaust gas is considerably smaller in comparison with the amount of $NO_x$, and therefore a considerably long time is taken until the $SO_x$ absorbent 18 is saturated by the $SO_x$. Accordingly, the period for which the air-fuel ratio of air-fuel mixture is made rich so as to release the $SO_x$ from the $SO_x$ absorbent 18 is considerably long, for example, the air-fuel ratio of air-fuel mixture is made rich with a proportion of one time per several hours.

As shown in FIG. 6, when the air-fuel ratio of the air-fuel mixture fed into the combustion chamber 3 is made rich, the $NO_x$ is released from the $NO_x$ absorbent 19 in a short time, but a considerably long time is required until the $SO_x$ is released from the $SO_x$ absorbent 18. Accordingly, in this embodiment, a time for which the air-fuel ratio of air-fuel mixture is continuously made rich so as to release the $SO_x$ is made considerably longer than the time for which the air-fuel ratio of air-fuel mixture is continuously made rich so as to release the $NO_x$. For example, in contrast to a fact that the air-fuel ratio of air-fuel mixture is made rich for about several seconds when the $NO_x$ is to be released, the air-fuel ratio of air-fuel mixture is made rich for about several minutes when the $SO_x$ is to be released. In this way, the air-fuel ratio of air-fuel mixture is made rich over a long time when the $SO_x$ is released, but as mentioned above, a period for which the air-fuel ratio of air-fuel mixture is made rich for the release of the $SO_x$ is long, and therefore a great increase of the fuel consumption amount will not be caused by this.

Figure 15:
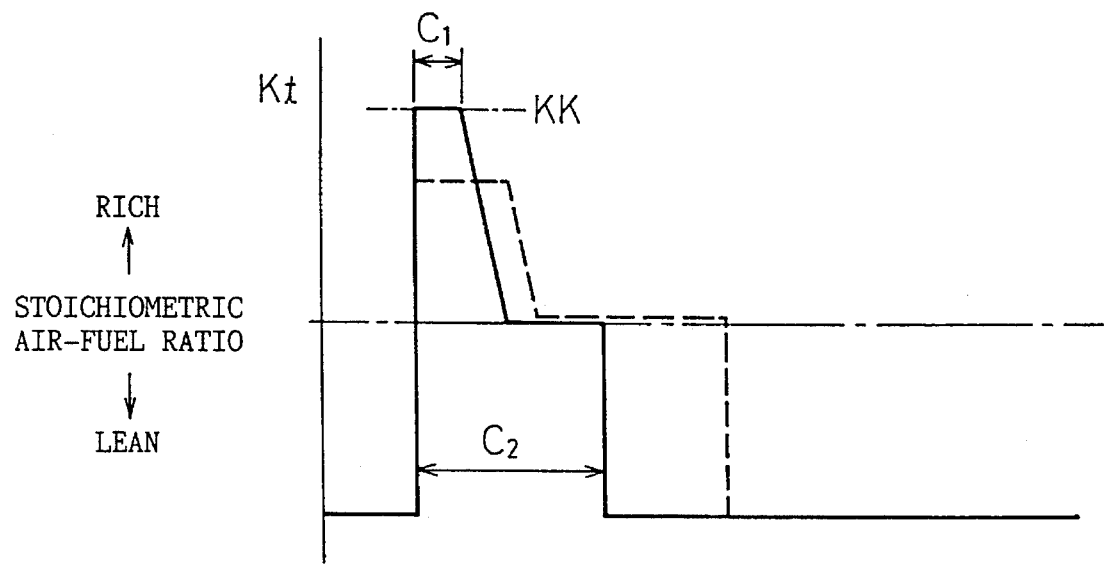
FIG. 15 is a view showing a rich control at the time of releasing of $NO_x$.

FIG. 15 shows a rich control of the air-fuel mixture when releasing the $NO_x$ (P of FIG. 14). Note that, Kt indicates the correction coefficient with respect to the basic fuel injection time TP.

As shown in FIG. 15, when the $NO_x$ should be released from the $NO_x$ absorbent 19, the air-fuel ratio of the air-fuel mixture air-fuel ratio of the air-fuel mixture fed into the combustion chamber 3 is made rich by increasing the correction coefficient Kt up to KK (>1.0), and then maintained at this rich state only for the time $C_1$. Subsequently, the correction coefficient Kt is gradually reduced, and then the correction coefficient Kt is maintained at 1.0, that is, the air-fuel ratio of the air-fuel mixture fed into the combustion chamber 3 is maintained at the stoichiometric air-fuel ratio. Subsequently, when the time $C_2$ has elapsed when the rich control is started, the correction coefficient Kt is made smaller than 1.0 again, and the combustion of the lean air-fuel mixture is started again.

Figure 16A:
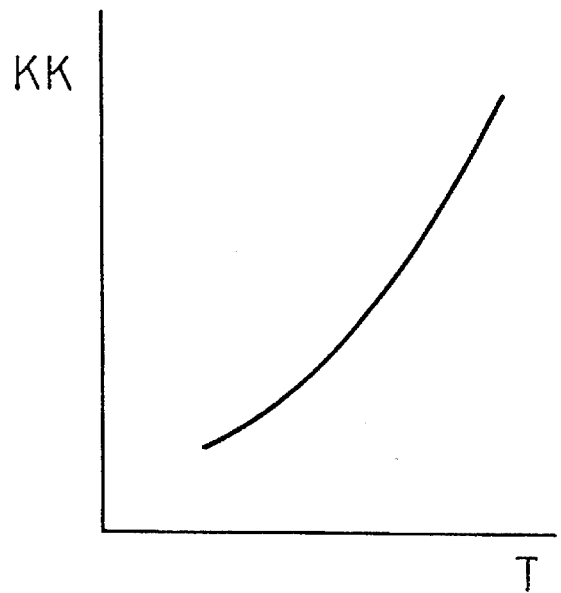
FIGS. 16A to 16C are views showing a relationship between various types of parameters and an exhaust gas temperature.
Figure 16B:
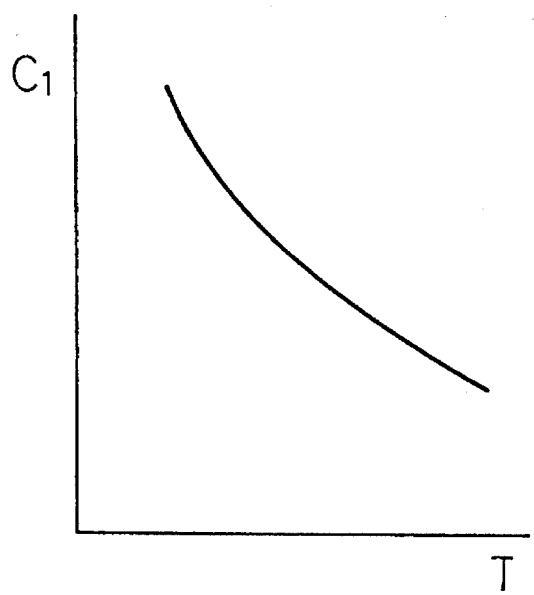

When the air-fuel ratio of the air-fuel mixture fed into the combustion chamber 3 becomes rich (Kt=KK), the most part of the $NO_x$ absorbed in the $NO_x$ absorbent 19 is abruptly released. The value of the correction coefficient KK and the time $C_1$ are determined so as to generate the unburnt HC and CO in an amount necessary for consuming the $O_2^-$ or $O^{2-}$ on the surface of the platinum Pt and reducing the whole $NO_x$ at this time. In this case, as the exhaust gas temperature becomes higher and the temperature of the $NO_x$ absorbent 19 becomes higher, the amount of the $NO_x$ released from the $NO_x$ absorbent 19 is increased. Accordingly, as shown in FIG. 16A, the value of the correction coefficient KK is made larger as the exhaust gas temperature T becomes higher, and as shown in FIG. 16B, the time $C_1$ is made shorter as the exhaust gas temperature T becomes higher. Note that, a relationship between the correction coefficient KK and the exhaust gas temperature T shown in FIG. 16A and the relationship between the time $C_1$ and the exhaust gas temperature T shown in FIG. 16B are stored in advance in the ROM 32.

On the other hand, as mentioned before, when the air-fuel ratio of the air-fuel mixture fed into the combustion chamber 3 becomes rich (Kt=KK), the most part of the $NO_x$ absorbed in the $NO_x$ absorbent 19 is abruptly released, and thereafter even if the air-fuel ratio has been made rich, the $NO_x$ is released from the $NO_x$ absorbent 19 only little by little. Accordingly, when the air-fuel ratio is continuously made rich, the unburnt HC and CO will be released into the atmosphere. Therefore, in this embodiment, as shown in FIG. 15, after the air-fuel ratio is made rich (Kt=KK), the degree of richness is made gradually smaller, and subsequently the air-fuel ratio is maintained at the stoichiometric air-fuel ratio (Kt=1.0), and the $NO_x$ gradually released from the $NO_x$ absorbent 18 is sequentially reduced.

Figure 16C:
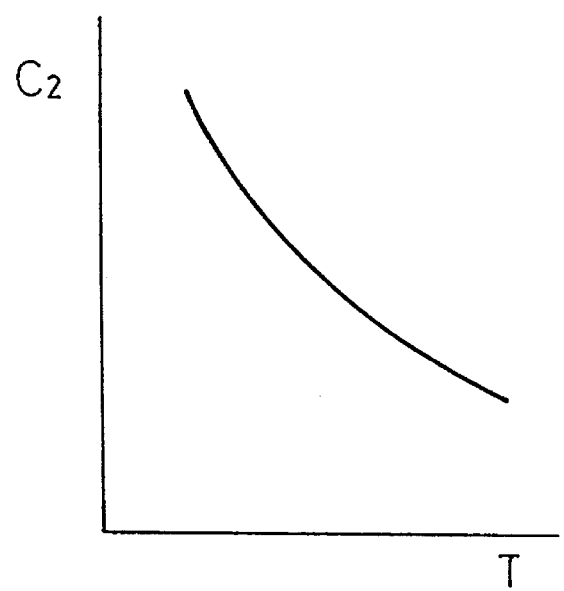

Note that, as the amount of the $NO_x$ released from the $NO_x$ absorbent 19 is larger when the air-fuel ratio is made rich, the amount of the $NO_x$ released from the $NO_x$ absorbent 19 becomes smaller, and accordingly a time until the $NO_x$ absorbent 19 ends releasing $NO_x$ becomes short. As mentioned before, as the exhaust gas temperature T becomes higher, the amount of the $NO_x$ released from the $NO_x$ absorbent 19 becomes larger when the air-fuel ratio is made rich, and accordingly, as shown in FIG. 16C, a time $C_2$ of from when the air-fuel ratio is made rich to when it is returned to lean again is made shorter as the exhaust gas temperature T becomes higher. Note that, a relationship between the time $C_2$ and the exhaust gas temperature T shown in FIG. 16C is stored in advance in the ROM 32.

In this way, KK, $C_1$, and $C_2$ are controlled in accordance with the exhaust gas temperature T, and when the exhaust gas temperature T is high, the correction coefficient Kt is changed with a pattern indicated by a solid line of FIG. 15, and changed with a pattern indicated by a broken line of FIG. 15 when the exhaust gas temperature T is low. Note that, in this case, a time for which the air-fuel ratio of air-fuel mixture is rich is short, and therefore almost no $SO_x$ is released from the $SO_x$ absorbent 18, and substantially only the $NO_x$ releasing action from the $NO_x$ absorbent 19 is carried out.

Figure 17:
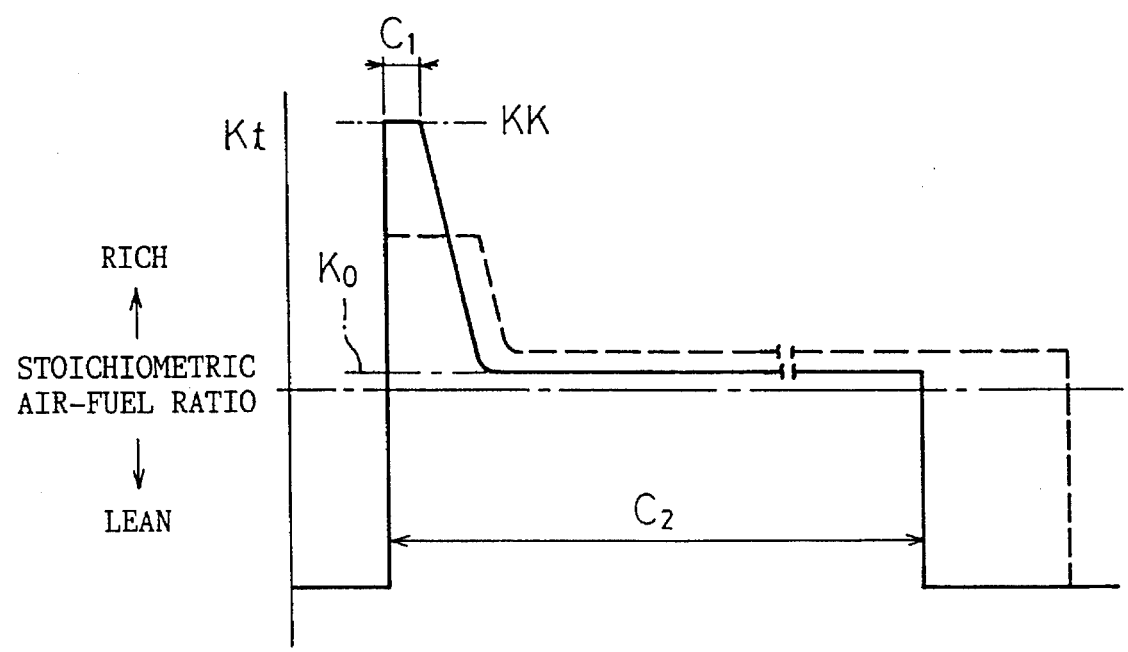
FIG. 17 is a view showing the rich control at the time of releasing of $SO_x$.

FIG. 17 shows the rich control of the air-fuel mixture when the $SO_x$ is released (Q in FIG. 14).

As shown in FIG. 17, even when the $SO_x$ should be released from the $SO_x$ absorbent 18, the air-fuel ratio of the air-fuel mixture fed into the combustion chamber 3 is made rich by increasing the correction coefficient Kt up to KK (>1.0), and then maintained at this rich state only for the time $C_1$. Subsequently, the correction coefficient Kt is gradually reduced, and then the correction coefficient Kt is maintained at Ko (>1.0), that is the air-fuel ratio of the air-fuel mixture fed into the combustion chamber 3 is continuously maintained rich. Namely, when the $SO_x$ should be released, first of all, the air-fuel ratio of air-fuel mixture is made very rich up to the first degree of richness (Kt=KK), and thereafter maintained at a second degree of richness (Kt=Ko) smaller than this first degree of richness (Kt= KK). Subsequently, when the time $C_2$ has elapsed when the rich control is started, the correction coefficient Kt is made smaller than 1.0 again, and the combustion of the lean air-fuel mixture is started again. Note that, the time $C_2$ when the $SO_x$ is released is considerably longer in comparison with the time $C_1$ at the time of releasing of the $NO_x$ shown in FIG. 15 and for example is about 3 minutes to 10 minutes.

As mentioned before, the $SO_x$ releasing speed from the $SO_x$ absorbent 18 is considerably slow, and accordingly even if the air-fuel ratio of the air-fuel mixture is continuously made rich, the releasing of the $SO_x$ cannot be completed in a short time. Namely, making the air-fuel ratio of the air-fuel mixture very rich leads to only an increase of the fuel consumption amount. Accordingly, when the $SO_x$ should be released, the air-fuel ratio of the air-fuel mixture is maintained at the lowest degree of richness with which the $NO_x$ can be released well, and this lowest degree of richness is indicated by Ko in FIG. 17. Accordingly, if the correction coefficient Kt is maintained at Ko, the $SO_x$ will be released well from the $SO_x$ absorbent 18. When the $SO_x$ should be released irrespective of this, first of all, the air-fuel ratio of air-fuel mixture is made very rich (Kt=KK). The reason for this will be explained next.

If the correction coefficient Kt is maintained at Ko when the $SO_x$ should be released, the $SO_x$ is gradually released from the $SO_x$ absorbent 18. At this time, the $NO_x$ is simultaneously released from the $NO_x$ absorbent 19, but the degree of richness is small, and therefore the $NO_x$ is gradually released also from the $NO_x$ absorbent 19. However, if the $SO_x$ released from the $SO_x$ absorbent 18 is flowing into the $NO_x$ absorbent 19 when the $NO_x$ is gradually released from the $NO_x$ absorbent 19 in this way, as mentioned before, the $NO_2$ and $SO_2$ react with each other ($SO_2+NO_2 \rightarrow SO_3+NO$), and thus the produced $SO_3$ will be absorbed into the $NO_x$ absorbent 19 in the form of $SO_4^-$. Such a reaction is not caused so far as the $NO_2$ does not exist, and accordingly so as to prevent the $SO_2$ from absorption into the $NO_x$ absorbent 19, it is necessary to prevent the $NO_2$ from releasing from the $NO_x$ absorbent 19 when the $SO_x$ is being released from the $SO_x$ absorbent 18. For this purpose, as shown in FIG. 17, when the $SO_x$ should be released, first of all the air-fuel ratio of the air-fuel mixture is made very rich (Kt=KK).

Namely, when the air-fuel ratio of the air-fuel mixture is made very rich (Kt=KK), the most part of the $NO_2$ is released from the $NO_x$ absorbent 19 at one time, and thereafter almost no $NO_2$ is released form the $NO_x$ absorbent 19. Accordingly, thereafter the $SO_2$ released from the $SO_x$ absorbent 18 will not react with the $NO_2$ when the correction coefficient Kt is maintained at Ko, and thus a risk of absorption of the $SO_2$ into the $NO_x$ absorbent 19 is eliminated.

Figure 18A:
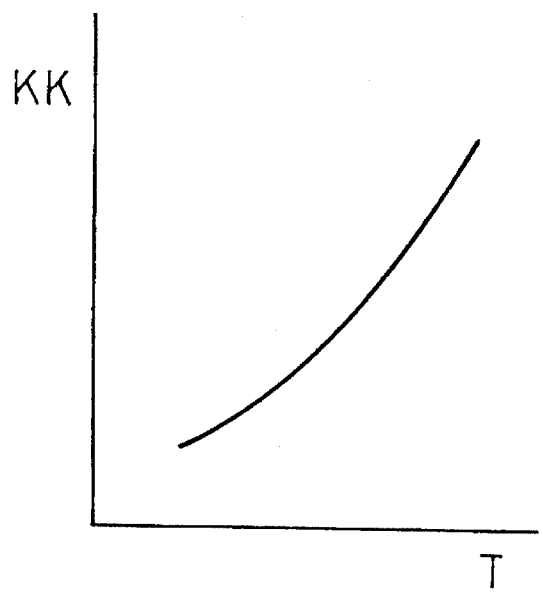
FIGS. 18A to 18D are views showing a relationship between various types of parameters and the exhaust gas temperature.
Figure 18B:
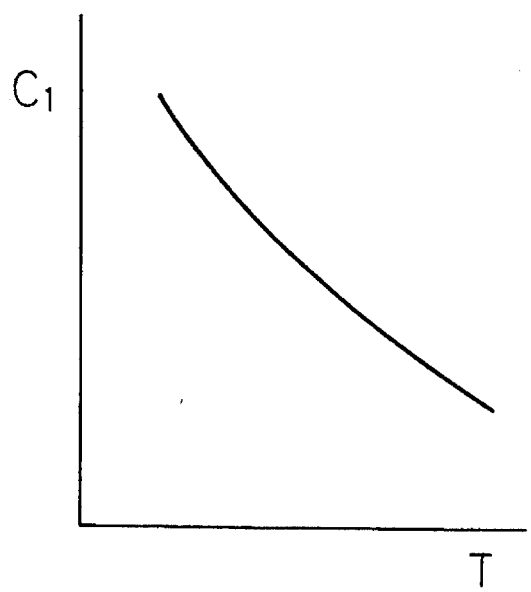

As mentioned before, when the air-fuel ratio of the air-fuel mixture becomes rich (Kt=KK), the most part of the $NO_x$ absorbed in the $NO_x$ absorbent 19 is abruptly released, and at this time, as the exhaust gas temperature is higher, and accordingly the temperature of the $NO_x$ absorbent 19 is higher, the amount of the $NO_x$ released from the $NO_x$ absorbent 19 is increased. Accordingly, as shown in FIG. 18A, the value of the correction coefficient KK is made larger as the exhaust gas temperature T becomes higher, and as shown in FIG. 18B, the time $C_1$ is made shorter as the exhaust gas temperature T becomes higher. Note that, a relationship between the correction coefficient KK and the exhaust gas temperature T shown in FIG. 18A and the relationship between the time $C_1$ and the exhaust gas temperature T shown in FIG. 18B are stored in advance in the ROM 32.

Figure 18C:
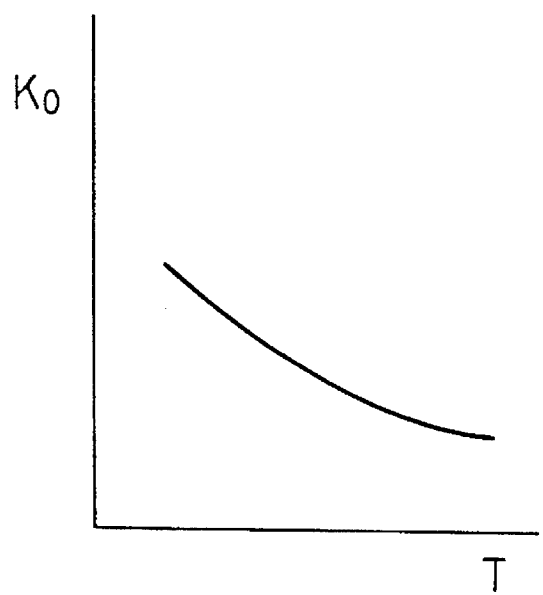

On the other hand, after the air-fuel ratio of the air-fuel mixture is made very rich (Kt=KK), it is maintained at a relatively small degree of richness (Kt= Ko), and at this time, the $SO_x$ is continuously released from the $SO_x$ absorbent 18. At this time, as shown in FIG. 13, as the temperature of the $SO_x$ absorbent 18, that is the exhaust gas temperature T becomes higher, the $SO_x$ can be continuously released even if the air-fuel ratio A/F of the air-fuel mixture is lowered. Accordingly, in this embodiment, as the exhaust gas temperature T becomes higher, the air-fuel ratio A/F of the air-fuel mixture is made smaller. Namely, when the exhaust gas temperature T is high, as indicated by a solid line in FIG. 17, the value of Ko is made relatively small, and when the exhaust gas temperature T is low, as indicated by a broken line in FIG. 17, the value of Ko is made relatively large. FIG. 18C shows a relationship between this value of Ko and the exhaust gas temperature T, which relationship is stored in advance in the ROM 32.

Figure 18D:
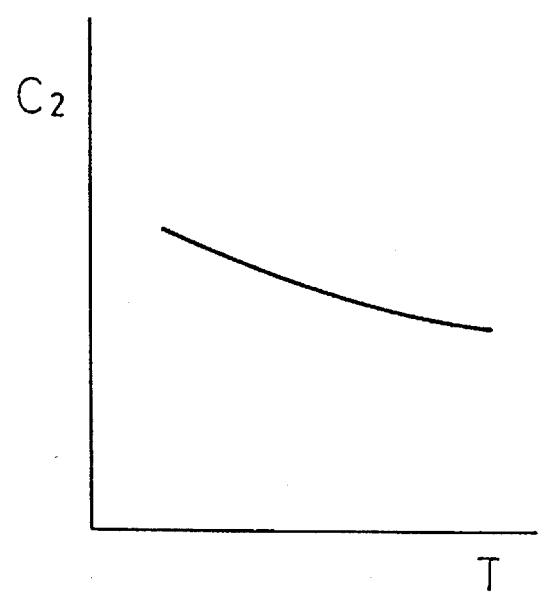

Note that, as the amount of the $SO_x$ released from the $SO_x$ absorbent 18 is larger when the air-fuel ratio of the air-fuel mixture is maintained rich (Kt=Ko), a time until the $SO_x$ absorbent 18 terminates the release of $SO_x$ becomes shorter. As mentioned before, as the exhaust gas temperature T becomes higher, the decomposition speed of $SO_x$ becomes faster, and the releasing speed of $SO_x$ becomes faster, and accordingly, as shown in FIG. 18D, a time $C_2$ from when the air-fuel ratio is made rich to when it is returned to lean again is made shorter as the exhaust gas temperature T becomes higher. Note that, a relationship between the time $C_2$ and the exhaust gas temperature T shown in FIG. 18D is stored in advance in the ROM 32.

Figure 19:
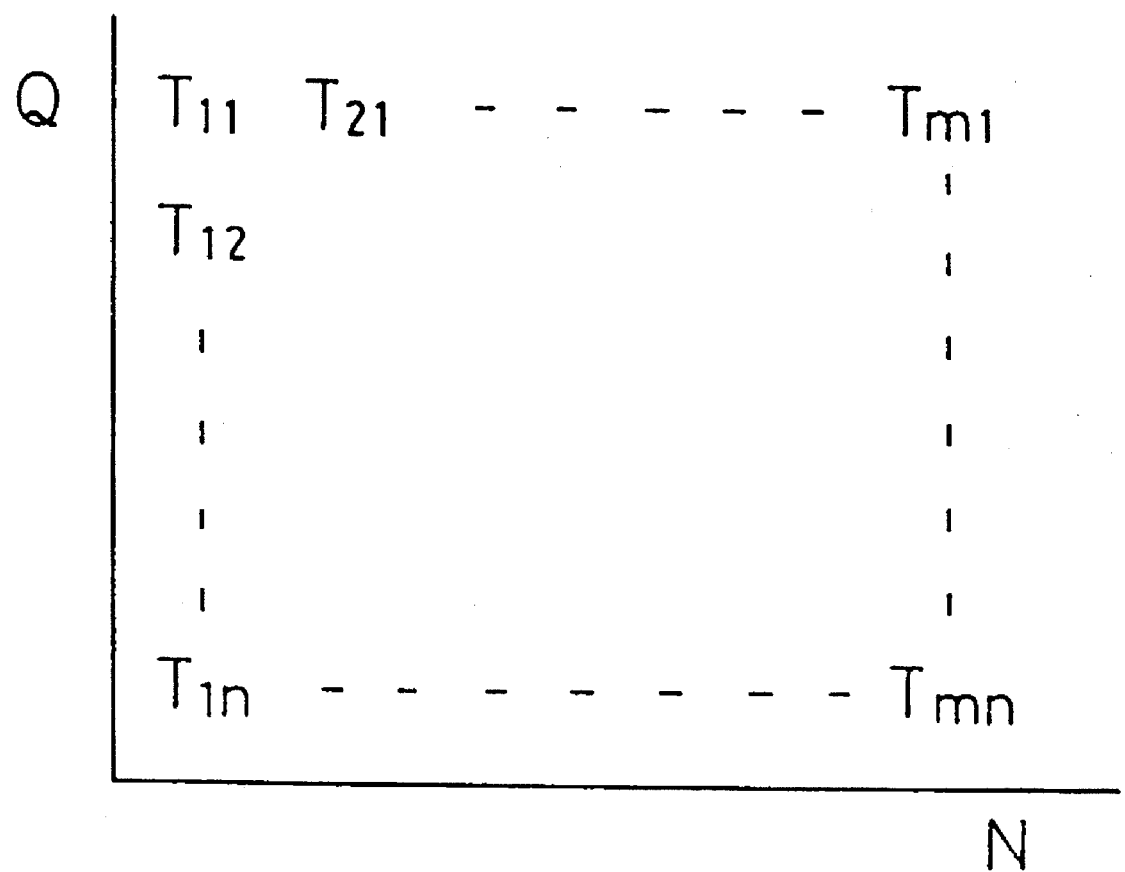
FIG. 19 view showing a map of the exhaust gas temperature.

As shown in FIGS. 16A to 16C and FIGS. 18A to 18D, the various values KK, $C_1$, Ko, and $C_2$ are functions of the exhaust gas temperature T, and in this embodiment, this exhaust gas temperature T is detected by the temperature sensor 22. In this way, it is also possible to directly detect the exhaust gas temperature T, but it is also possible to estimate the same from the intake air amount Q and the engine rotational speed N. In this case, it is sufficient if the relationship among the exhaust gas temperature T, the intake air amount Q, and the engine rotational speed N is found in advance from experiments and this relationship is stored in advance in the ROM 32 in the form of a map as shown in FIG. 19 and the exhaust gas temperature T is calculated from this map.

Next, the absorption and releasing control of the $NO_x$ and $SO_x$ will be explained referring to FIG. 20 to FIG. 22.

Figure 20:
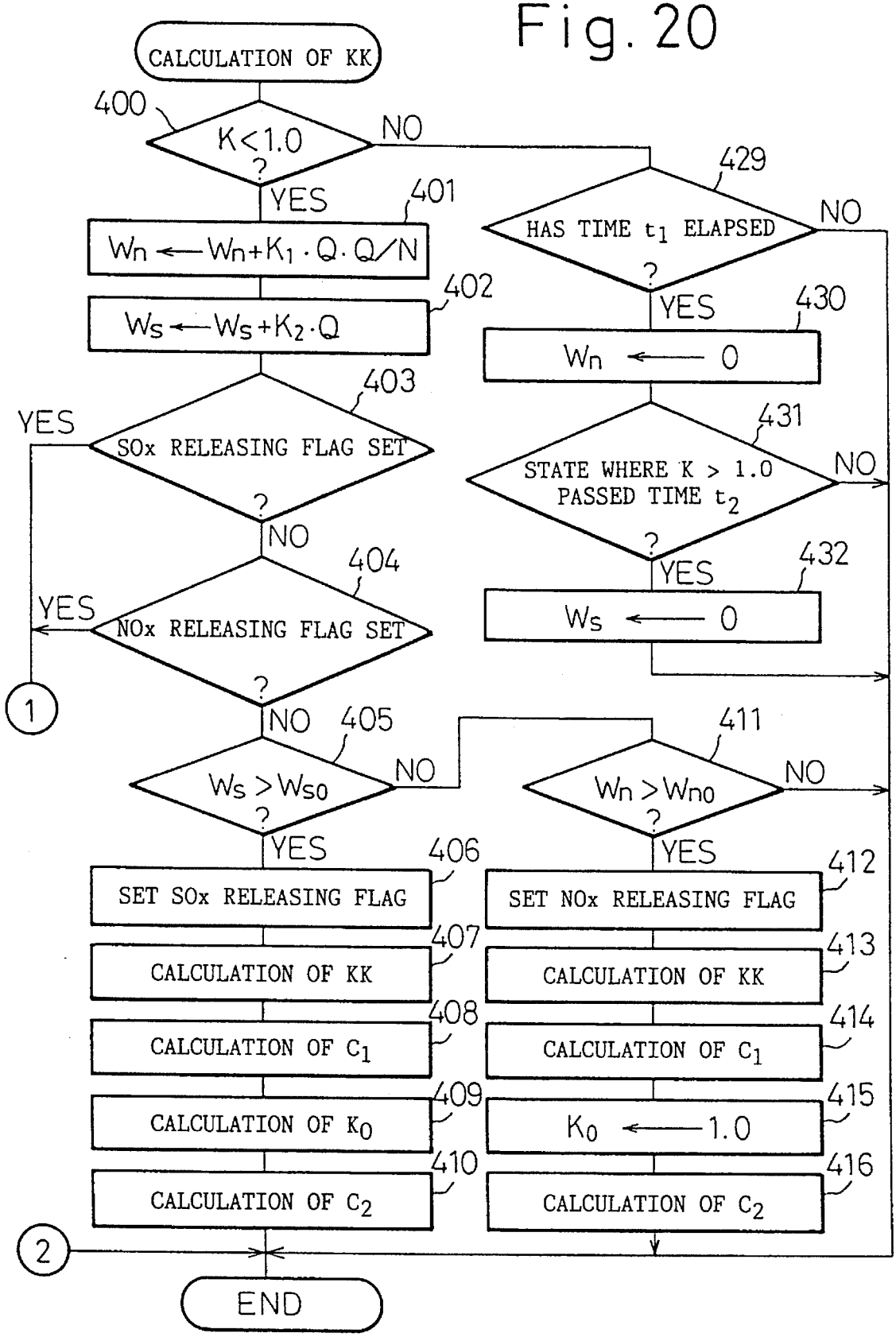
FIG. 20 and 21 are flow charts for calculating the correction coefficient KK.
Figure 21:
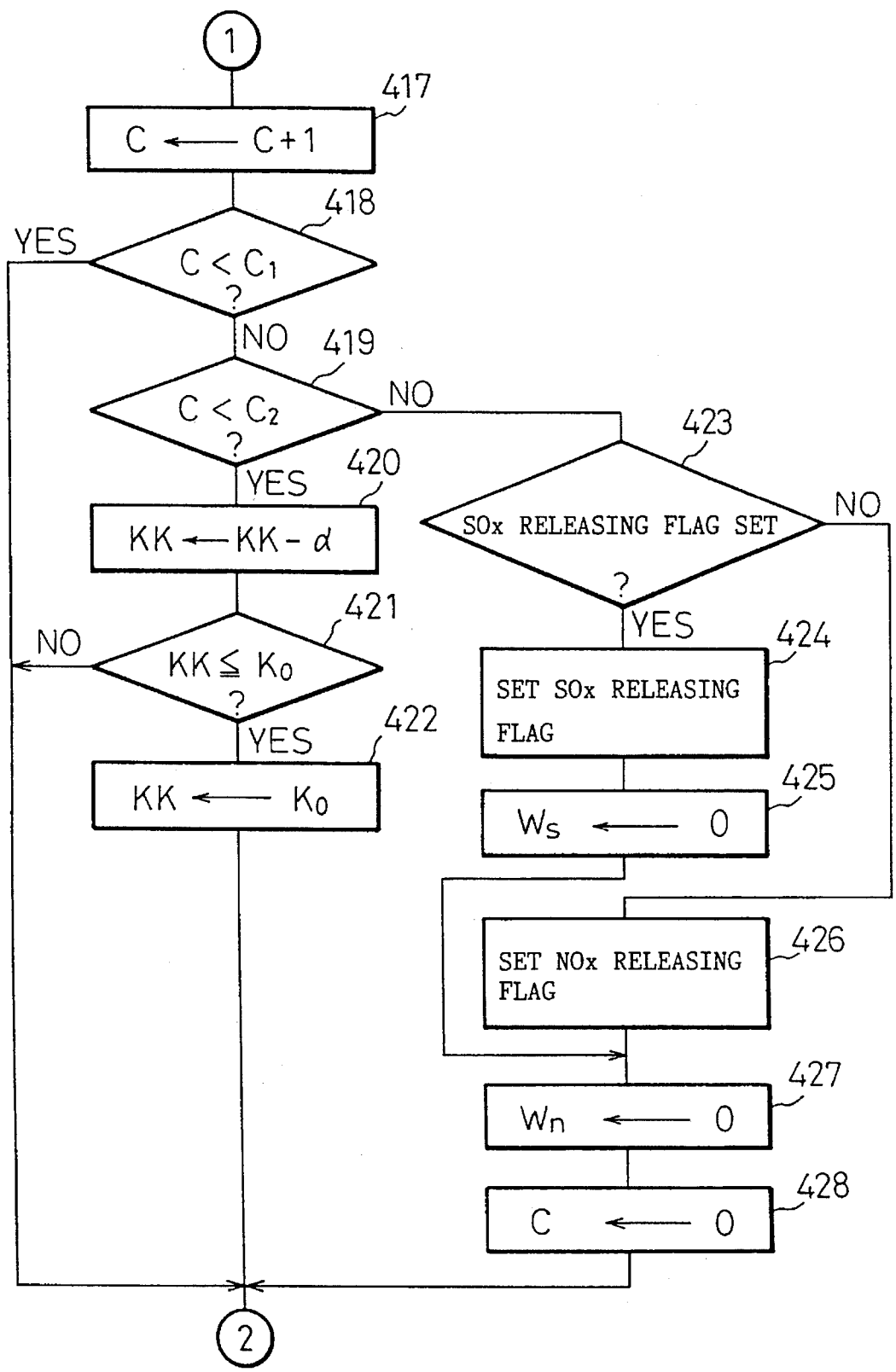

FIG. 20 and FIG. 21 show a calculation routine of the correction coefficient KK at the time of rich control, which routine is executed by interruption at every predetermined time interval.

Referring to FIG. 20 and FIG. 21, first of all, it is determined at step 400 whether or not the correction coefficient K is smaller than 1.0, that is, whether or not the lean air-fuel mixture is being burned. When K<1.0, that is, when the lean air-fuel mixture is being burned, the processing routine goes to step 401, at which the amount Wn of $NO_x$ absorbed in the absorbent 19 is calculated. Namely, the amount of $NO_x$ discharged from the combustion chamber 3 is increased as the intake air amount Q becomes larger, and increased as the engine load Q/N becomes higher, and therefore the amount Wn of the $NO_x$ absorbed in the $NO_x$ absorbent 19 will be represented by the sum of Wn and $K_1 \cdot Q \cdot Q/N$ ($k_1$ is a constant).

Subsequently, at step 402, the amount Ws of the $SO_x$ absorbed in the $SO_x$ absorbent 18 is calculated. Namely, the amount of $SO_x$ discharged from the combustion chamber 3 is increased as the intake air amount Q becomes larger, and therefore the amount Wn of the $SO_x$ absorbed in the $SO_x$ absorbent 18 will be represented by the sum of Wn and $K_2 \cdot Q$ ($k_2$ is a constant). This $SO_x$ amount Ws is stored in the backup RAM 33a. Subsequently, at step 403, it is determined whether or not the $SO_x$ releasing flag indicating that the $SO_x$ should be released has been set. When the $SO_x$ releasing flag has not been set, the processing routine goes to step 404, at which it is determined whether or not the $NO_x$ releasing flag indicating that the $NO_x$ should be released has been set. When the $NO_x$ releasing flag has not been set, the processing routine goes to step 405.

At step 405, it is determined whether or not the amount W of the $SO_x$ absorbed in the $SO_x$ absorbent 18 is larger than the predetermined set up amount Wso. This set up amount Wso is for example about 30 percent based on the maximum amount of $SO_x$ that can be absorbed by the $SO_x$ absorbent 18. When Ws≦Wso, the processing routine goes to step 411. At step 411, it is determined whether or not the amount Wn of the $NO_x$ absorbed in the $NO_x$ absorbent 19 is larger than the predetermined set amount Wno. This set amount Wso is for example about 30 percent based on the maximum amount of $NO_x$ that can be absorbed by the $NO_x$ absorbent 19. When Wn≦Wno, the processing cycle is completed.

On the other hand, when it is determined at step 405 that Ws>Wso, the processing routine goes to step 406, at which the $SO_x$ releasing flag is set. Subsequently, at step 407, the correction coefficient KK is calculated from the relationship shown in FIG. 18A, and then at step 408, the time $C_1$ is calculated from the relationship shown in FIG. 18B. Subsequently, at step 409, the correction coefficient KK is calculated from the relationship shown in FIG. 18C, and then at step 410, the time $C_2$ is calculated from the relationship shown in FIG. 18D. Subsequently, the processing cycle is completed. Note that, when the $SO_x$ releasing flag is set and various values KK, $C_1$, Ko, and $C_2$ are calculated, as will be mentioned later, the air-fuel ratio of air-fuel mixture is made rich.

On the other hand, when it is determined that Wn>Wno at step 411, the processing routine goes to step 412, at which the $NO_x$ releasing flag is set. Subsequently, at step 413, the correction coefficient KK is calculated from the relationship shown in FIG. 16A, and then at step 414, the time $C_1$ is calculated from the relationship shown in FIG. 16B. Subsequently, at step 415, the correction coefficient Ko is made 1.0, and then at step 416, the time $C_2$ is calculated from the relationship shown in FIG. 16C. Subsequently, the processing cycle is completed. Note that, when the $NO_x$ releasing flag is set and various values KK, $C_1$, Ko, and $C_2$ are calculated, as will be mentioned later, the air-fuel ratio of air-fuel mixture is made rich.

When the $SO_x$ releasing flag or the $NO_x$ releasing flag is set, the processing routine goes from step 403 or step 404 to step 417, at which the count value C is incremented exactly by one. Subsequently, at step 418, it is determined whether or not the count value C is smaller than the time $C_1$. When C<$C_1$, the processing cycle is completed, and accordingly the correction coefficient is maintained at KK as it is for the time $C_1$. Subsequently, when C becomes equal to or larger than $C_1$, the processing routine goes to step 419, at which it is determined whether or not the count value C is smaller than the time $C_2$. When C<$C_2$, the processing routine goes to step 420, at which the predetermined value α is subtracted from the correction coefficient KK. Accordingly, the value of the correction coefficient KK becomes gradually smaller.

Subsequently, at step 421, it is determined whether or not the correction coefficient KK has become smaller than Ko. When KK>Ko, the processing cycle is completed, and when KK becomes equal to or smaller than Ko, the processing routine goes to step 422, at which KK is made Ko. Accordingly, after when KK becomes equal to Ko, at the time of the releasing of $SO_x$, the correction coefficient is maintained at Ko (>1.0), while at the time of the releasing of $NO_x$, the correction coefficient is maintained at 1.0.

Subsequently, when it is decided at step 419 that C becomes equal to or larger than $C_2$, the processing routine goes to step 423, at which it is determined whether or not the $SO_x$ releasing flag has been set. When the $SO_x$ releasing flag has been set, the processing routine goes to step 424, at which the $SO_x$ releasing flag is reset. When the $SO_x$ releasing flag is reset, as will be mentioned later, the combustion of the lean air-fuel mixture is started again. Subsequently, at step 425, the amount Ws of the $SO_x$ absorbed in the $SO_x$ absorption 18 is made zero, and then at step 427, the amount Wn of the $NO_x$ absorbed in the $NO_x$ absorption 19 is made zero. Subsequently, at step 428, the count value C is made zero.

On the other hand, at step 423, when it is decided that the $SO_x$ releasing flag has not been set, the processing routine goes to step 426, at which the $NO_x$ releasing flag is reset. When the $NO_x$ releasing flag is reset, as will be mentioned later, the combustion of the lean air-fuel mixture is started again. Subsequently, at step 427, the amount Wn of the $NO_x$ absorbed in the $NO_x$ absorption 19 is made zero. Subsequently, at step 428, the count value C is made zero.

On the other hand, when it is decided at step 50 that K is equal to or larger than 1.0, that is, when the air-fuel ratio of the air-fuel mixture fed into the engine cylinder is the stoichiometric air-fuel ratio or rich, the processing routine goes to step 429, at which it is determined whether or not the state of K≧1.0 continues for the predetermined time $t_1$, for example 10 seconds. When the state of K≧1.0 does not continue for the predetermined time $t_1$, the processing cycle is completed, and when the state of K≧1.0 continues for the predetermined time $t_1$, the processing routine goes to step 430, at which Wn is made zero. Namely, when the time for which air-fuel ratio of the air-fuel mixture fed into the engine cylinder is made the stoichiometric air-fuel ratio or rich continues for about 10 seconds, it is considered that the most part of the $NO_x$ absorbed in the $NO_x$ absorbent 19 was released, and accordingly, in this case, Wn is made zero at step 430.

Subsequently, at step 431, it is determined whether or not the state of K>1.0 continues for the predetermined time $t_2$ ($t_2$>$t_1$), for example, 10 minutes. When the state of K>1.0 does not continue for the predetermined time $t_2$, the processing cycle is completed, and when the state of K>1.0 continues for the predetermined time $t_2$, the processing routine goes to step 432, at which Ws is made zero. Namely, when the time for which air-fuel ratio of the air-fuel mixture fed into the engine cylinder is made rich continues for about 10 minutes, it is considered that the most part of the $SO_x$ absorbed in the $SO_x$ absorbent 18 was released, and accordingly, in this case, Ws is made zero at step 432.

Figure 22:
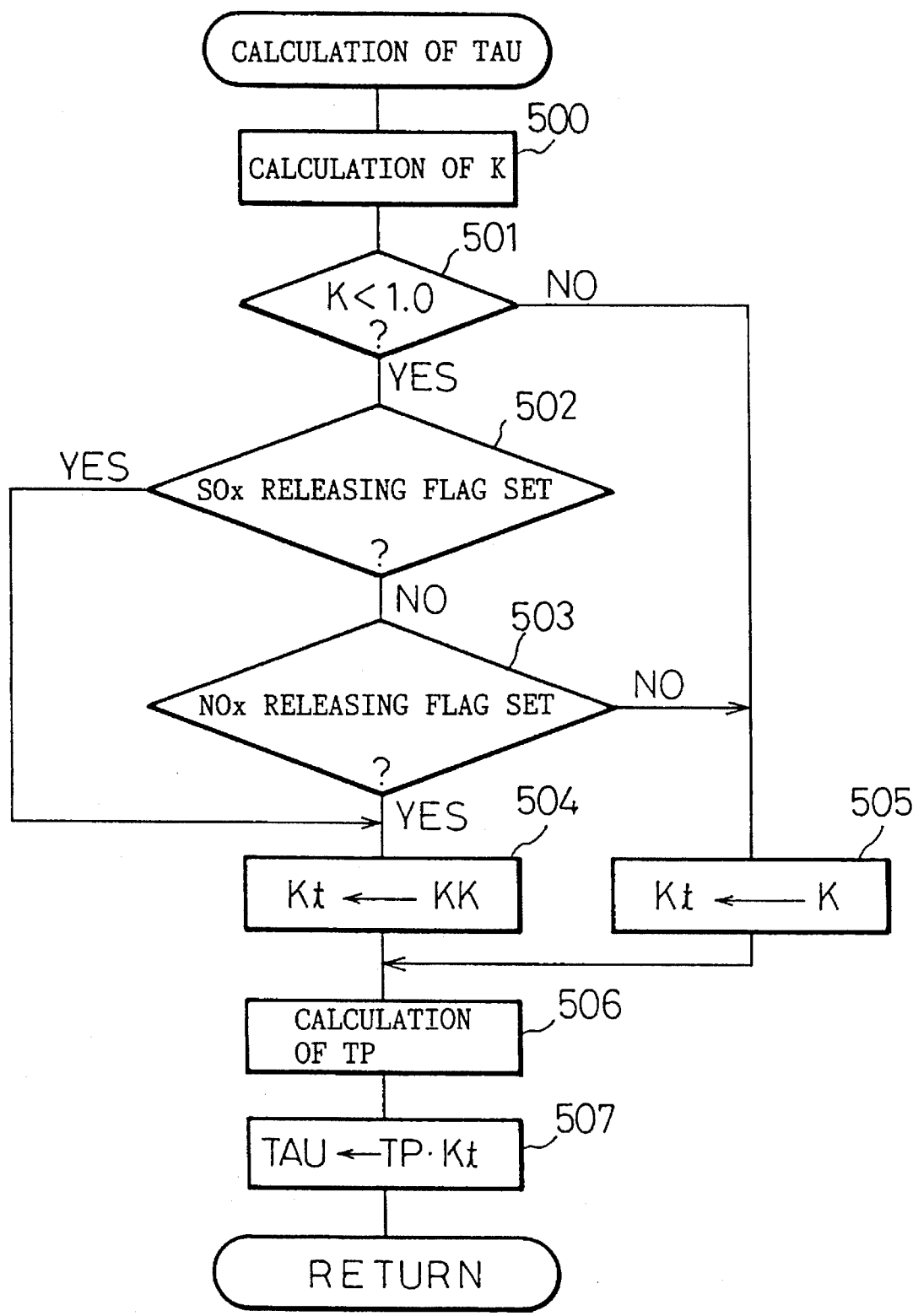
FIG. 22 is a flow chart for calculating the fuel injection time TAU.

FIG. 22 shows the calculation routine of the basic fuel injection time TAU, which routine is repeatedly executed.

Referring to FIG. 22, first of all, at step 500, the correction coefficient K is calculated. This correction coefficient K is made for example 0.6 at the time of an operation state when the lean air-fuel mixture should be burned. Also, this correction coefficient K has become the function of the engine coolant temperature at the time of the engine warm-up operation and is made smaller as the engine coolant temperature becomes higher within a range where K≧1.0. Also, at the time of acceleration operation, this correction coefficient is made 1.0, and at the time of full load operation, this correction coefficient K is made a larger value than 1.0.

Subsequently, at step 501, it is determined whether or not the correction coefficient K is smaller than 1.0. When K≧1.0, the processing routine goes to step 505, at which K is made Kt. Contrary to this, when K<1.0, the processing routine goes to step 502, at which it is determined whether or not the $SO_x$ releasing flag has been set. When the $SO_x$ releasing flag has not been set, the processing routine goes to step 503, at which it is determined whether or not the $NO_x$ releasing flag has been set. When the $NO_x$ releasing flag has not been set, the processing routine goes to step 505. Subsequently, at step 506, the basic fuel injection time TP is calculated from the map shown in FIG. 2, and then at step 507, the basic fuel injection time TAU (=TP·Kt) is calculated. Accordingly, when neither of the $SO_x$ releasing flag nor $NO_x$ releasing flag has been set even when K≧1.0 or K<1.0, the air-fuel ratio of the air-fuel mixture is made the air-fuel ratio in accordance with the correction coefficient K.

On the other hand, when the $SO_x$ releasing flag or the $NO_x$ releasing flag is set, the processing routine goes from step 502 or step 503 to step 504, at which Kt is made KK calculated by the routine shown in FIG. 20 and FIG. 21. Subsequently, the processing routine passes step 506, and the basic fuel injection time TAU is calculated at step 507. Accordingly, at this time, the air-fuel ratio of the air-fuel mixture is forcibly made rich.

Figure 23:
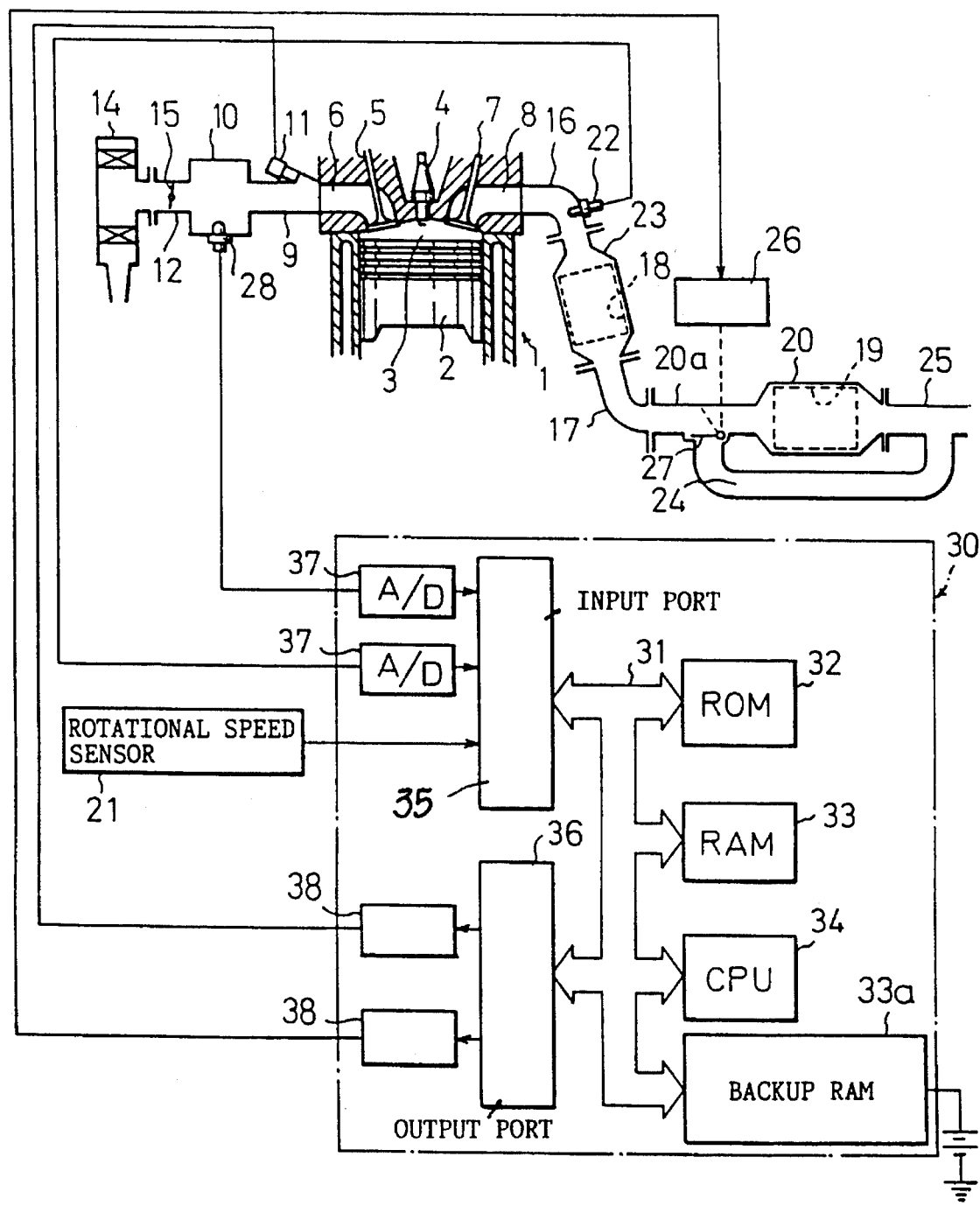
FIG. 23 is an overall view showing still another embodiment of the internal combustion engine.

FIG. 23 shows a still further embodiment. Note that, in this embodiment, the same constituent elements as those shown in FIG. 1 and FIG. 12 are indicated by the same symbols.

Referring to FIG. 23, in this embodiment, the exhaust port 8 is connected via the exhaust manifold 16 to the casing 23 containing the $SO_x$ absorbent 18, and the outlet portion of the casing 23 is connected via the exhaust pipe 17 to the casing 20 containing the $NO_x$ absorbent 19. A bypass passage 24 is branched from the inlet portion 20a of the casing 20, and this bypass passage 24 is connected to the exhaust pipe 25 connected to the outlet portion of the casing 20. A switch valve 27 controlled by an actuator 26 is arranged at the branch portion of the bypass passage 24 from the inlet portion 20a of the casing 20. This switch valve 27 is controlled by the actuator 26 to either position between a bypass closed position at which the inlet portion of the bypass passage 24 is closed and the inlet portion to the $NO_x$ absorbent 19 is fully opened as indicated by the solid line in FIG. 23 and a bypass opening position at which the inlet portion to the $NO_x$ absorbent 19 is closed and the inlet portion of the bypass passage 24 is fully opened as indicated by a broken line of FIG. 23.

Also, in this embodiment, a pressure sensor 28 generating an output voltage in proportion to the absolute pressure in the surge tank 10 is attached to the interior of the surge tank 10, and the output voltage of this pressure sensor 28 is input to the input port 35 via the AD converter 37.

Also in this embodiment, the fuel injection time TAU is calculated based on for example the following equation.

$$TAU = TP \cdot K$$

Figure 24:
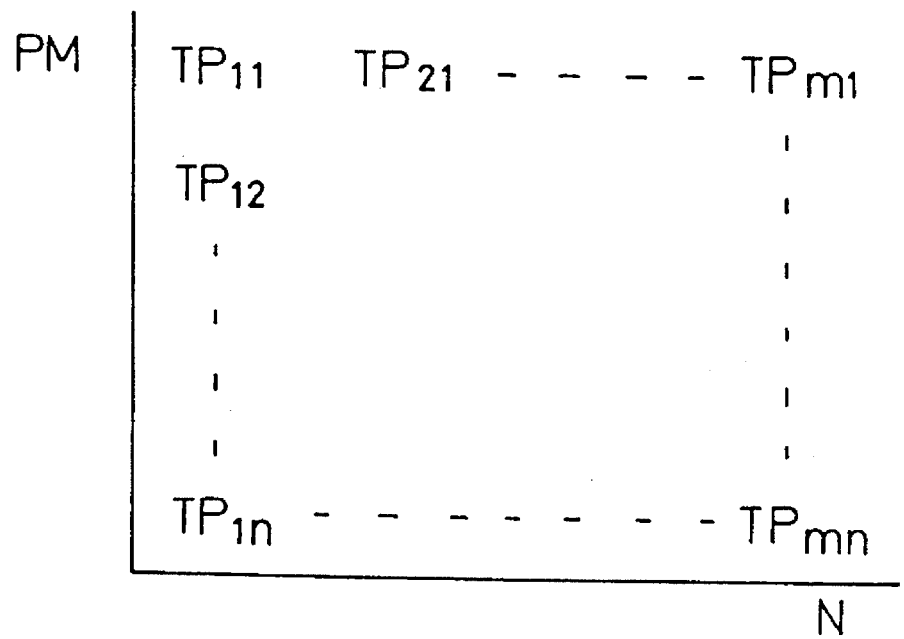
FIG. 24 is a view showing a map of the basic fuel injection time.

Here, TP indicates the basic fuel injection time, and K indicates the correction coefficient. The basic fuel injection time TP indicates a fuel injection time necessary for making the air-fuel ratio of the air-fuel mixture fed into the engine cylinder the stoichiometric air-fuel ratio. This basic fuel injection time TP is found in advance by experiments and stored in advance in the ROM 32 in the form of a map as shown in FIG. 24 as the functions of the absolute pressure PM of the surge tank 10 expressing the engine load and the engine rotational speed N. The correction coefficient K is a coefficient for controlling the air-fuel ratio of the air-fuel mixture fed into the engine cylinder, and if K=1.0, the air-fuel ratio of the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and if K becomes larger than 1.0, the air-fuel ratio of the air-fuel mixture fed into the engine cylinder becomes smaller than the stoichiometric air-fuel ratio, that is, becomes rich.

Figure 25:
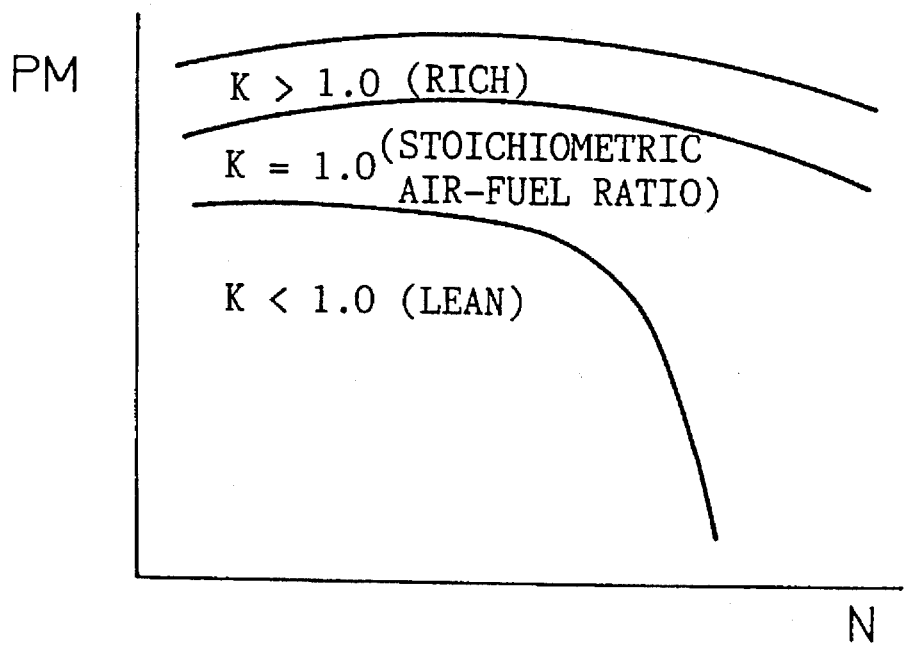
FIG. 25 is a view showing the correction coefficient K.

The value of this correction coefficient K is determined in advance with respect to the absolute pressure PM in the surge tank 10 and the engine rotational speed N, and FIG. 25 shows one embodiment of the value of this correction coefficient K. In the embodiment shown in FIG. 25, in a region in which the absolute pressure PM inside the surge tank 10 is relatively low, that is, in the engine low or medium load operation region, the value of the correction coefficient K is made a value smaller than 1.0, and accordingly, at this time, the air-fuel ratio of the air-fuel mixture fed into the engine cylinder is made lean. On the other hand, in a region in which the absolute pressure PM inside the surge tank 10 is relatively high, that is, in the engine high load operation region, the value of the correction coefficient K is made 1.0, and accordingly, at this time, the air-fuel ratio of the air-fuel mixture fed into the engine cylinder is made the stoichiometric air-fuel ratio. Also, in a region in which the absolute pressure PM inside the surge tank 10 becomes the highest, that is, in the engine full load operation region, the value of the correction coefficient K is made a value larger than 1.0, and accordingly, at this time, the air-fuel ratio of the air-fuel mixture fed into the engine cylinder is made rich. In the internal combustion engine, usually the frequency of low and medium load operation is the highest, and accordingly in the most part of the operation period, the lean air-fuel mixture will be burned.

Also in this embodiment, as the $SO_x$ absorbent 18, use is made of an absorbent which carries at least one member selected from a transition metal such as copper Cu, iron Fe, manganese Mn, and nickel Ni, sodium Na, tin Sn, titanium Ti, and lithium Li on a carrier made of alumina. Note that, in this $SO_x$ absorbent 18, as mentioned before, when the air-fuel ratio of the exhaust gas flowing into the $SO_x$ absorbent 18 is lean, the $SO_2$ contained in the exhaust gas is oxidized on the surface of the absorbent while absorbed into the absorbent in the form of sulfuric acid ion $SO_4^{2-}$, and in this case, when the platinum Pt is carried on the carrier of the $SO_x$ absorbent 18, $SO_2$ becomes easily adhered onto the platinum Pt in the form of $SO_3^{2-}$, and thus the $SO_2$ becomes easily absorbed into the absorbent in the form of the sulfuric acid ion $SO_4^{2-}$. Accordingly, so as to promote the absorption of the $SO_2$, preferably the platinum Pt is carried on the carrier of the $SO_x$ absorbent 18.

Figure 26A:
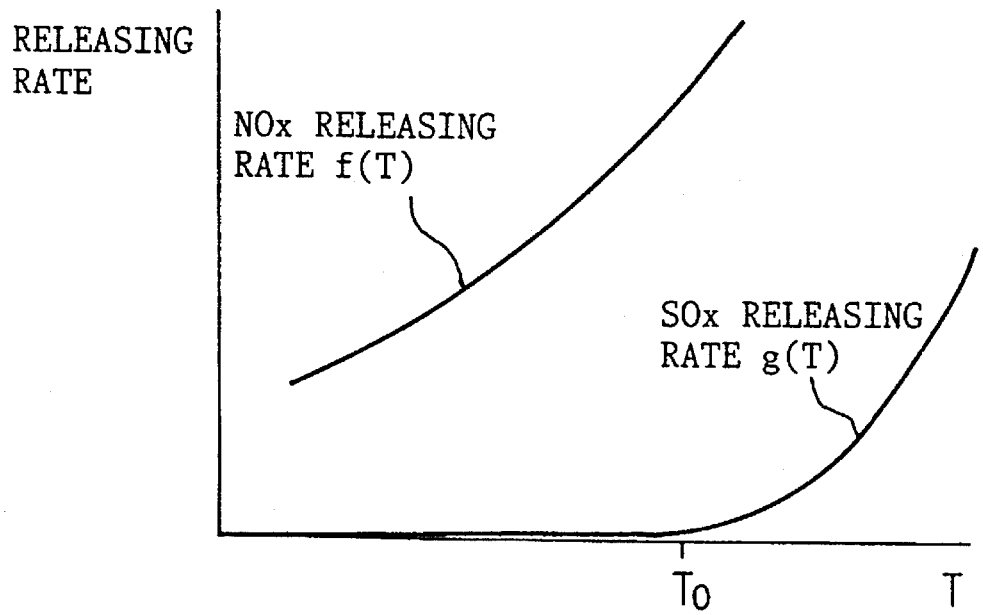
FIGS. 26A and 26B are graphs showing an $NO_x$ releasing rate and an $SO_x$ releasing rate.
Figure 26B:
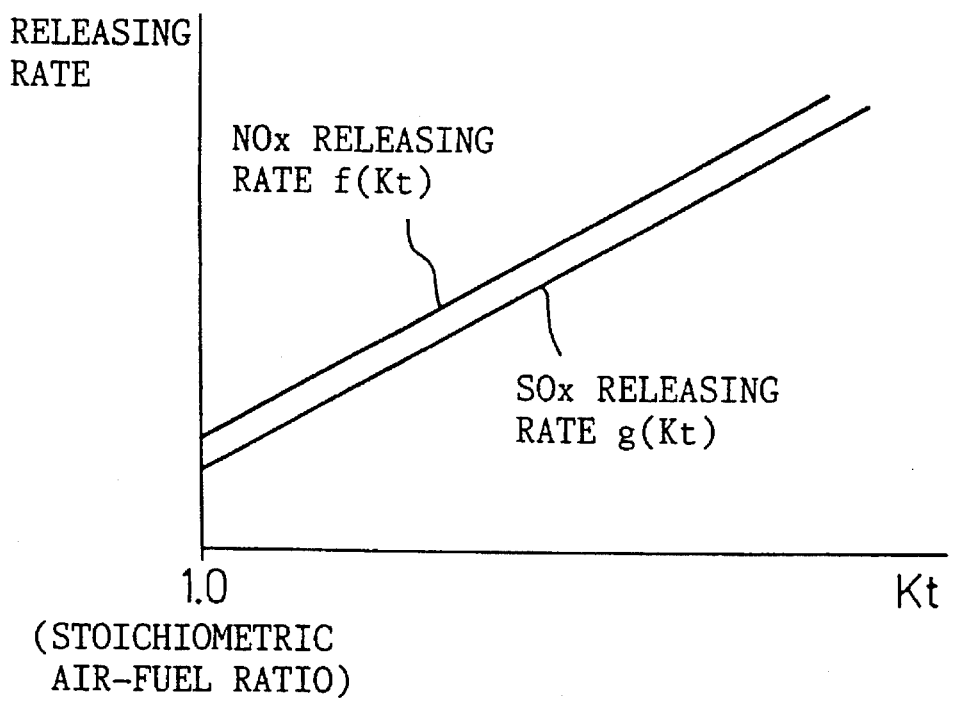

Next, a detailed explanation will be made again of the $NO_x$ releasing function from the $NO_x$ absorbent 19 and the $SO_x$ releasing function from the $SO_x$ absorbent 18 referring to FIGS. 26A and 26B. FIG. 26A shows a relationship between the temperature T of the $NO_x$ absorbent 19 and the $SO_x$ absorbent 18 when the air-fuel ratio of the exhaust gas flowing into the $SO_x$ absorbent 18 and the $NO_x$ absorbent 19 is made rich, the $NO_x$ releasing rate f(T) from the $NO_x$ absorbent 19, and the $SO_x$ releasing rate g(T) from the $SO_x$ absorbent 18, and FIG. 26B shows a relationship between the correction coefficient Kt with respect to the basic fuel injection time TP (stoichiometric air-fuel ratio when Kt=1.0, rich when Kt>1.0, and lean when Kt<1.0), the $NO_x$ releasing rate f(Kt) from the $NO_x$ absorbent 19, and the $SO_x$ releasing rate g(Kt) from the $SO_x$ absorbent 18.

In the $NO_x$ absorbent 19, when the temperature of the $NO_x$ absorbent 19 is almost 150° C. or more, when the $NO_2$ on the surface of the platinum Pt no longer exists, the reaction is immediately advanced to the direction of ($NO_3^- \rightarrow NO_2$), and the $NO_x$ is immediately released from the absorbent. Accordingly, as shown in FIG. 26A, even if the temperature of the $NO_x$ absorbent 19 is considerably low, the $NO_x$ releasing rate f(T) becomes considerably high. Namely, this means that $NO_x$ is released from the $NO_x$ absorbent 19 at a considerably high speed. Note that, as shown in FIG. 26A, as the temperature T of the $NO_x$ absorbent 19 becomes higher, the $NO_x$ releasing rate f(T) becomes higher, and as shown in FIG. 26B, as the value of the correction coefficient Kt becomes larger, that is, the degree of richness of the air-fuel ratio of the exhaust gas becomes higher, the $NO_x$ releasing rate f(Kt) becomes higher.

Contrary to this, the $SO_x$ absorbed in the $SO_x$ absorbent 18 is stable in comparison with the $NO_x$ absorbed in the $NO_x$ absorbent 19, and therefore is difficult to be decomposed, and the decomposition of this $SO_x$ is not sufficiently caused unless the temperature T of the $SO_x$ absorbent 18 exceeds the temperature To determined according to the type of the $SO_x$ absorbent 18. Accordingly, as shown in FIG. 26A, when the temperature T of the $SO_x$ absorbent 18 is lower than To, the $SO_x$ releasing rate g(T) is extremely low, that is, almost no $SO_x$ is released from the $SO_x$ absorbent 18, and if the temperature T of the $SO_x$ absorbent 18 exceeds To, the $SO_x$ releasing function from the $SO_x$ absorbent 18 is substantially started. Note that, also for $SO_x$, when the temperature T of the $SO_x$ absorbent 18 exceeds To, as shown in FIG. 26A, as the temperature T of the $SO_x$ absorbent 18 becomes higher, the $SO_x$ releasing rate g(T) becomes higher, and as shown in FIG. 26B, as the value of the correction coefficient Kt becomes larger, the $SO_x$ releasing rate g(kt) becomes higher.

Figure 27A:
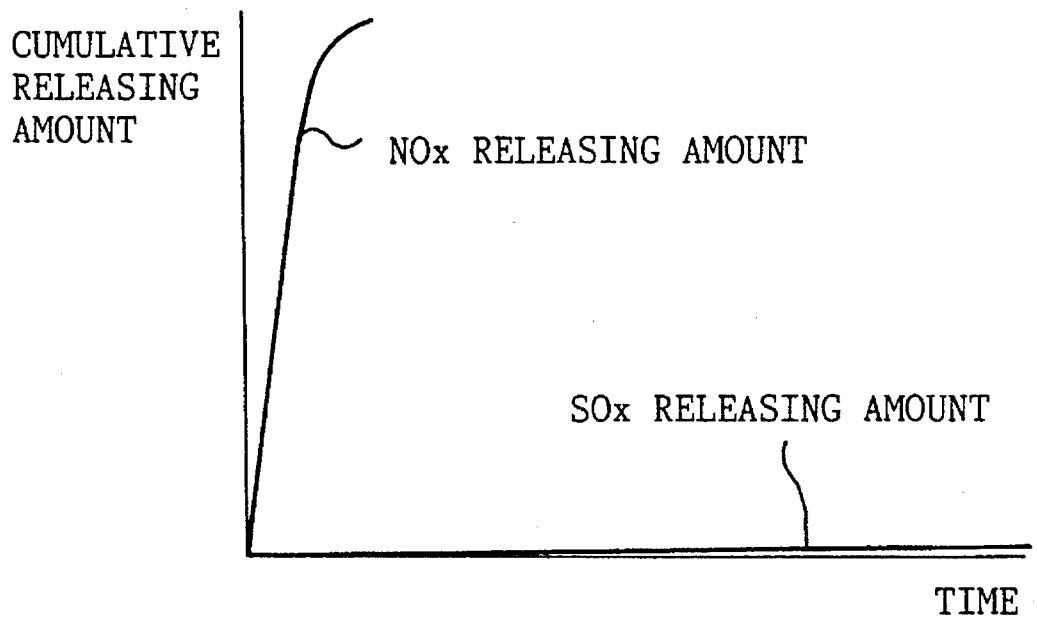
FIGS. 27A and 27B are graphs showing a cumulative release of the $NO_x$ and $SO_x$.
Figure 27B:
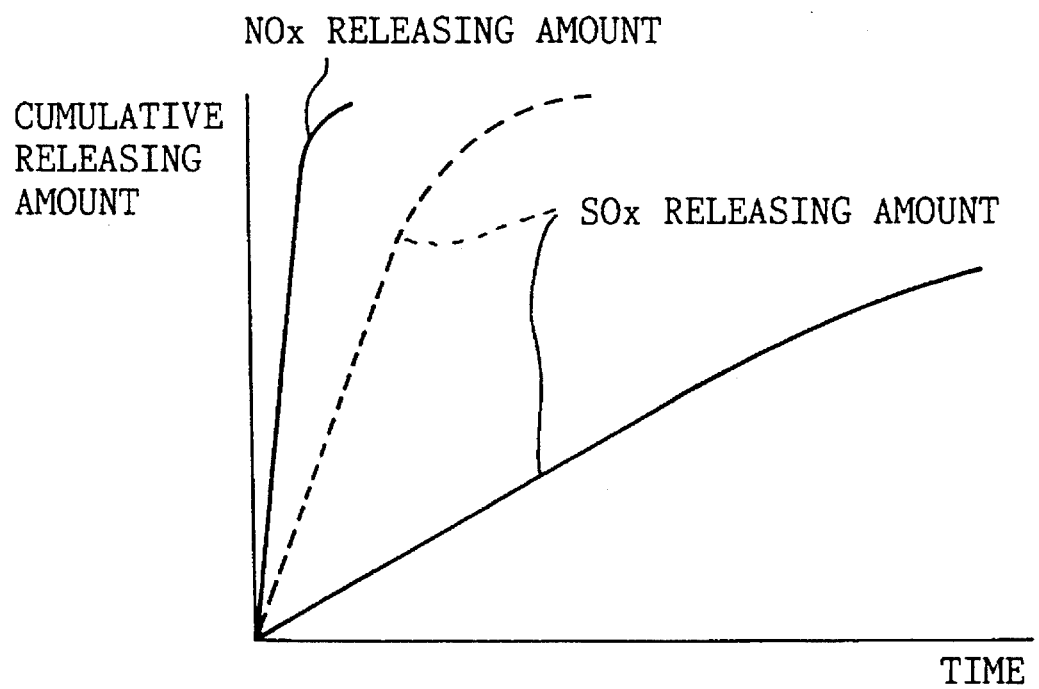

FIG. 27A shows the cumulative $NO_x$ release from the $NO_x$ absorbent 19 and the cumulative $SO_x$ release from the $SO_x$ absorbent 18 when the air-fuel ratio of the inflowing exhaust gas to the $NO_x$ absorbent 19 and the $SO_x$ absorbent 18 is made rich when the temperature T of the $NO_x$ absorbent 19 and the $SO_x$ absorbent 18 is lower than To (FIG. 26A); and a solid line of FIG. 27B shows the cumulative $NO_x$ release from the $NO_x$ absorbent 19 and the cumulative $SO_x$ release from the $SO_x$ absorbent 18 When the air-fuel ratio of the inflowing exhaust gas to the $NO_x$ absorbent 19 and the $SO_x$ absorbent 18 is made rich when the temperature T of the $NO_x$ absorbent 19 and the $SO_x$ absorbent 18 is higher than To (FIG. 26A).

When the temperature T of the $SO_x$ absorbent 18 is lower than To, as shown in FIG. 26A, almost no $SO_x$ is released, and accordingly, at this time, when the air-fuel ratio of the exhaust gas flowing into the $NO_x$ absorbent 19 and the $SO_x$ absorbent 18 is made rich, as shown in FIG. 27A, the $NO_x$ is quickly released from the $NO_x$ absorbent 19, but almost no $SO_x$ is released from the $SO_x$ absorbent 18.

On the other hand, when the temperature T of the $SO_x$ absorbent 18 becomes higher than To, as shown in FIG. 26A, the $SO_x$ releasing function is carried out, and therefore, at this time, if the air-fuel ratio of the exhaust gas flowing into the the $NO_x$ absorbent 19 and the $SO_x$ absorbent 18 is made rich, as indicated by the solid line in FIG. 27B, both of the $NO_x$ and $SO_x$ are released. In this case, the $NO_x$ is released from the $NO_x$ absorbent 19 in a short time, but the decomposition rate of $SO_x$ in the $SO_x$ absorbent 18 is low, and therefore the $SO_x$ is released from the $SO_x$ absorbent 18 only slowly. Note that, also in this case, when the temperature T of the $SO_x$ absorbent 18 becomes high, as seen from FIG. 26A, the $SO_x$ releasing rate g(T) becomes high, and therefore, as indicated by a broken line in FIG. 27B, the $SO_x$ is released from the $SO_x$ absorbent 18 relatively fast.

Also, the $NO_x$ release indicated by the solid line in FIG. 27B shows the $NO_x$ release from the $SO_x$ absorbent 18 in which a transition metal such as copper Cu, iron Fe, manganese Mn, nickel Ni, or the like, sodium Na, or lithium Li or the like is carried on the carrier made of alumina, and in the $SO_x$ absorbent 18 in which for example titania $TiO_2$ is carried on a carrier made of alumina, as indicated by the broken line in FIG. 27B, $SO_x$ is released from the $SO_x$ absorbent 18 relatively fast. In this way the $SO_x$ releasing speed from the $SO_x$ absorbent 18 changes also according to the type of the $SO_x$ absorbent 18, and changes also according to the temperature T of the $SO_x$ absorbent 18.

As mentioned before, if the air-fuel ratio of the exhaust gas flowing into the the $SO_x$ absorbent 18 and the $NO_x$ absorbent 19 is made rich when the temperature T of the $SO_x$ absorbent 17 is higher than To, the $SO_x$ is released from the $SO_x$ absorbent 18, and the $NO_x$ is released from the $NO_x$ absorbent 19. At this time, if the exhaust gas flowing out from the $SO_x$ absorbent 18 is made to flow into the $NO_x$ absorbent 19, as mentioned before, the $SO_x$ released from the $SO_x$ absorbent 18 is absorbed into the $NO_x$ absorbent 19. Therefore, in this embodiment, so as to prevent the $SO_x$ released from the $SO_x$ absorbent 18 from absorption into the $NO_x$ absorbent 19 in this way, when the $SO_x$ absorbent 18 should release the $SO_x$, the exhaust gas flowing out of the $SO_x$ absorbent 18 is guided into the bypass passage 24.

Namely, in this embodiment, when the lean air-fuel mixture is burned, the switch valve 27 is held at the bypass closed position indicated by the solid line in FIG. 23, and accordingly, at this time, the exhaust gas flowing out of the $SO_x$ absorbent 18 flows into the $NO_x$ absorbent 19. Accordingly, at this time, the $SO_x$ in the exhaust gas is absorbed by the $SO_x$ absorbent 18, and therefore only the $NO_x$ is absorbed into the $NO_x$ absorbent 19. Subsequently, when the $SO_x$ from the $SO_x$ absorbent 18 should be released, as shown in FIG. 28, the air-fuel ratio of the air-fuel mixture fed into the combustion chamber 3 is switched from lean to rich, and simultaneously the switch valve 27 is switched to the bypass opening position indicated by the broken line in FIG. 23. When the air-fuel ratio of the air-fuel mixture fed into the combustion chamber 3 becomes rich, as shown in FIG. 28, $SO_x$ is released from the $SO_x$ absorbent 18, but at this time, the flowing out exhaust gas from the $SO_x$ absorbent 18 does not flowing into the $NO_x$ absorbent 19, but flows into the bypass passage 24.

Subsequently, when the releasing action of the $SO_x$ should be stopped, the air-fuel ratio of the air-fuel ratio of the air-fuel mixture fed into the combustion chamber 3 is switched from rich to lean, and simultaneously the switch valve 27 is switched to the bypass closed position indicated by the solid line in FIG. 23. When the air-fuel ratio of the air-fuel ratio of the air-fuel mixture fed into the combustion chamber 3 becomes lean, as shown in FIG. 28, the releasing action of $SO_x$ from the $SO_x$ absorbent 18 is stopped.

In this way, in the embodiment shown in FIG. 28, when the $SO_x$ is being released from the $SO_x$ absorbent 18, the exhaust gas flowing out of the $SO_x$ absorbent 18 flows into the bypass passage 24, and therefore it becomes possible to prevent the $SO_x$ from absorption into the $NO_x$ absorbent 19. Note that, at this time, the unburnt HC and CO and $NO_x$ are discharged from the engine, but as mentioned before, the $SO_x$ absorbent 18 has a three-way catalytic function, and therefore these unburnt HC and CO and $NO_x$ are considerably removed at the $SO_x$ absorbent 18, and accordingly, at this time, there is no risk of releasing of a large amount of unburnt HC and CO and $NO_x$ into the atmosphere.

Figure 29:
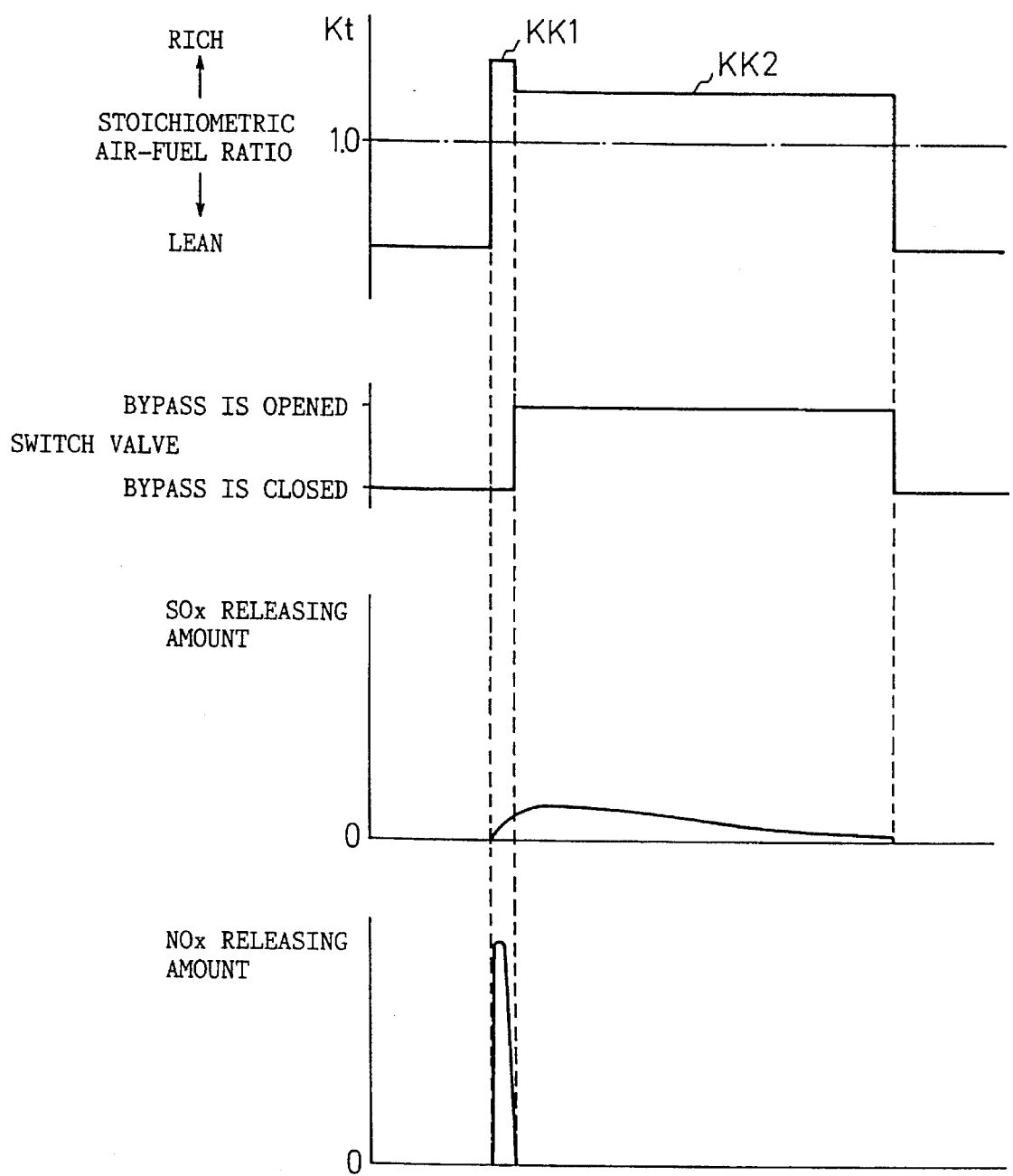
FIG. 29 is a timing chart of an $SO_x$ and NO releasing control.
Figure 30:
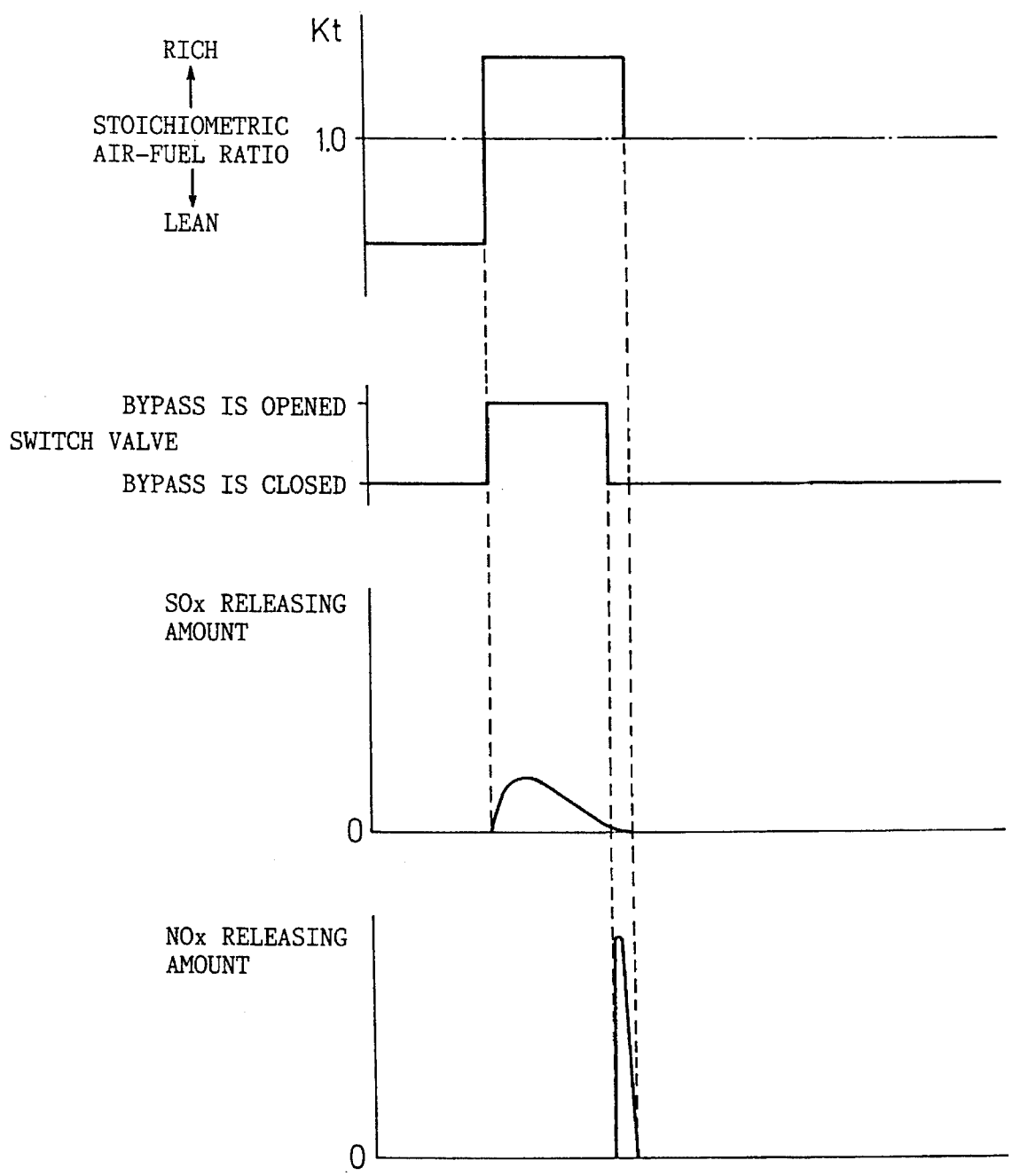
FIG. 30 is a timing chart of the $SO_x$ and $NO_x$ releasing control.

FIG. 29 and FIG. 30 show respectively different embodiments in which when the air-fuel ratio of the air-fuel mixture fed into the combustion chamber 3 is made rich so as to release the $SO_x$ from the $SO_x$ absorbent 18, the releasing action of the $NO_x$ from the $NO_x$ absorbent 19 is carried out together with the former.

The embodiment shown in FIG. 29 shows the $SO_x$ and $NO_x$ releasing control which can be applied to a case where the $SO_x$ releasing speed from the $SO_x$ absorbent 18 is considerably slower in comparison with the $NO_x$ releasing speed from the $NO_x$ absorbent 19. As indicated by the solid line in FIG. 27B, where the $SO_x$ releasing speed is slower in comparison with the $NO_x$ releasing speed, when the air-fuel ratio of the exhaust gas flowing into the the $SO_x$ absorbent 18 and the $NO_x$ absorbent 19 is switched from lean to rich, the $NO_x$ is released from the $NO_x$ absorbent 19 in a short time, and in addition during a time when the releasing action of $NO_x$ is carried out, almost no $SO_x$ is released from the $SO_x$ absorbent 18. Accordingly, in this embodiment, during a predetermined period after when the air-fuel ratio of the air-fuel mixture fed into the combustion chamber 3 is switched from lean to rich (Kt=KK1) (a period for which Kt=KK1 is maintained in FIG. 29), the switch valve 27 is held at the bypass closed position, and then when this predetermined period has elapsed, the switch valve 27 is switched to the bypass opening position. For the predetermined period after this (period for which Kt= KK2 is maintained), the air-fuel ratio of the air-fuel mixture fed into the combustion chamber 3 is maintained rich (Kt=KK2), and when this predetermined period has elapsed, the switch valve 27 is switched to the bypass closed position.

In this way, in this embodiment, in an initial stage when the air-fuel ratio of the air-fuel mixture is switched from lean to rich, the switch valve 27 is held at the bypass closed position, and therefore the $NO_x$ is rapidly released from the $NO_x$ absorbent 19. At this time, the releasing of the $SO_x$ is started also from the $SO_x$ absorbent 18, but the release of $SO_x$ is small, and accordingly, even if this $SO_x$ is absorbed into the $NO_x$ absorbent 19, the amount of absorption of $SO_x$ is not so much increased. The most part of the $SO_x$ is released from the $SO_x$ absorbent 18 after the switch valve 27 is switched to the bypass closed position, and accordingly the most part of the $SO_x$ is fed into the bypass passage 24.

The embodiment shown in FIG. 30 shows the $SO_x$ and $NO_x$ releasing control controlled so as to prevent the $SO_x$ from absorption into the $NO_x$ absorbent 19 as much as possible. In this embodiment, when the air-fuel ratio of the air-fuel mixture fed into the combustion chamber 3 is made rich, the switch valve 27 is switched to the bypass closed position. At this time, the releasing of the $SO_x$ is started from the $SO_x$ absorbent 18, and this $SO_x$ is all fed into the bypass passage 24. Subsequently, when the releasing action of the $SO_x$ from the $SO_x$ absorbent 18 is almost completed, the switch valve 27 is switched to the bypass closed position while maintaining the air-fuel ratio of the air-fuel mixture rich. When the switch valve 27 is switched to the bypass closed position, the $NO_x$ is rapidly released from the $NO_x$ absorbent 19, and when the releasing action of $NO_x$ from the $NO_x$ absorbent 19 is completed, the air-fuel ratio of the air-fuel mixture is switched from rich to lean.

In this embodiment, after the $SO_x$ releasing action from the $SO_x$ absorbent 18 is completely terminated, if the switch valve 27 is switched from the bypass opening position to the bypass closed position, it is possible to completely prevent the $SO_x$ from absorption into the $NO_x$ absorbent 19.

Note that, even in a case where the releasing speed of the $SO_x$ from the $SO_x$ absorbent 18 is slow as indicated by the solid line in FIG. 27B, when the temperature of the $SO_x$ absorbent 18 becomes high, as mentioned before, the $SO_x$ releasing speed becomes faster. In this way, when the $SO_x$ and $NO_x$ releasing action as shown in FIG. 29 is carried out when the $SO_x$ releasing speed becomes faster, immediately after the air-fuel ratio of the air-fuel mixture is switched from lean to rich, a large amount of the $SO_x$ is released also from the $SO_x$ absorbent 18, and thus a large amount of the $SO_x$ becomes absorbed into the $NO_x$ absorbent 19. Therefore, in another embodiment according to the present invention, when the temperature of the $SO_x$ absorbent 18 is relatively low and the releasing speed of $SO_x$ is slow, the releasing control of the $SO_x$ and $NO_x$ shown in FIG. 29 is carried out, and when the temperature of the $SO_x$ absorbent 18 becomes high and the releasing speed of $SO_x$ becomes faster, the releasing control of the $SO_x$ and $NO_x$ shown in FIG. 30 is carried out.

Figure 31:
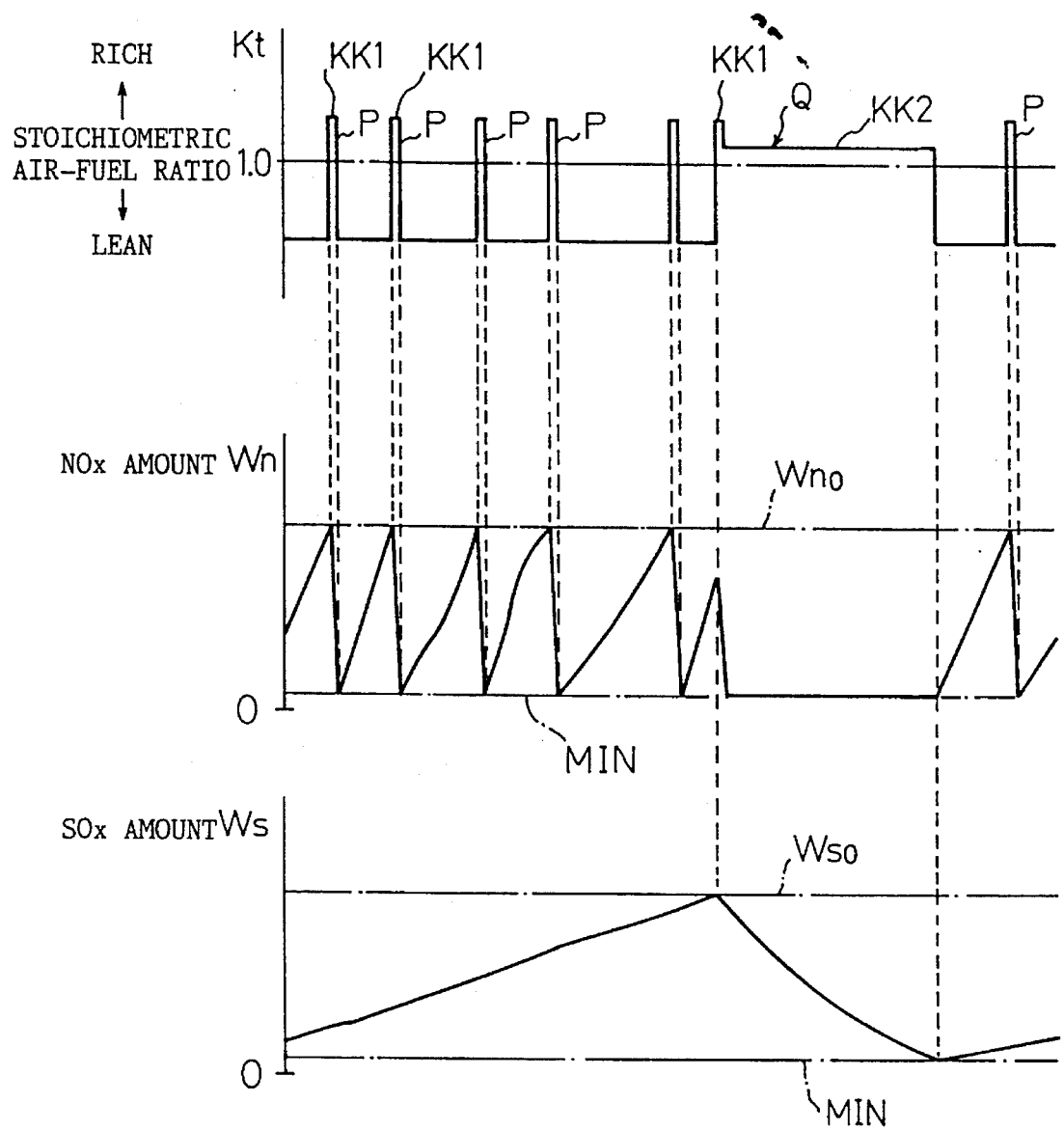
FIG. 31 is a timing chart showing the change of the air-fuel ratio of the $NO_x$ and $SO_x$ releasing control, etc.

FIG. 31 shows the releasing control timing of the $NO_x$ and $SO_x$. Note that, this FIG. 31 shows a case using the embodiment shown in FIG. 29 as the SO releasing control. Also, in FIG. 31, P indicates the $NO_x$ releasing control, and Q indicates the $NO_x$ and $SO_x$ releasing control.

In the embodiment shown in FIG. 31, the releasing processing of the $NO_x$ and $SO_x$ is carried out based on the $NO_x$ amount Wn and the $SO_x$ amount Ws. In this case, as the amount Wn of $NO_x$ absorbed in the $NO_x$ absorbent 19 and the amount Ws of $SO_x$ absorbed in the $SO_x$ absorbent 18, an estimated absorption amount estimated from the operation state of the engine is used. This $NO_x$ amount Wn and $SO_x$ amount $SO_x$ will be mentioned later.

As shown in FIG. 31, when the $NO_x$ amount Wn exceeds the maximum allowable value Wno, the air-fuel ratio of the air-fuel mixture is made rich (Kt=KK1), and the releasing action of $NO_x$ from the $NO_x$ absorbent 19 is started. When the releasing action of $NO_x$ is started, the $NO_x$ amount Wn is rapidly reduced, and when the $NO_x$ amount Wn reaches the lower limit value MIN, the air-fuel ratio of the air-fuel mixture is switched from rich to lean, and the releasing action of $NO_x$ is stopped. Contrary to this, when the $SO_x$ amount Sn exceeds the maximum allowable value Wso, the air-fuel ratio of the air-fuel mixture is made rich (Kt=KK1) for a predetermined period, and the releasing action of $NO_x$ from the $NO_x$ absorbent 19 is started. At this time, also the releasing action of $SO_x$ from the $SO_x$ absorbent 18 is started. Subsequently, when the $NO_x$ amount Wn reaches the lower limit value MIN, the switch valve 27 is switched to the bypass opening position. Subsequently, when the $SO_x$ amount Ws reaches the lower limit value MIN, the air-fuel ratio of the air-fuel mixture is switched from rich to lean, and the releasing action of $SO_x$ is stopped.

Note that, as seen from FIG. 31, the period of making the air-fuel ratio of the air-fuel mixture rich so as to release the $NO_x$ from the $NO_x$ absorbent 19 is considerably short, and the air-fuel ratio of the air-fuel mixture is made rich with a proportion of one time per several minutes. On the other hand, as mentioned before, the amount of $SO_x$ contained in the exhaust gas is considerably smaller than the amount of $NO_x$, and therefore a considerably long time is taken until the $SO_x$ absorbent 18 is saturated by the $SO_x$. Accordingly, the period of making the air-fuel ratio of the air-fuel mixture rich so as to release the $SO_x$ from the $SO_x$ absorbent 18 is considerably short, and the air-fuel ratio of the air-fuel mixture is made rich with a proportion of for example one time per several hours.

FIGS. 32A to 32D show the flag switch valve control routine for executing the $NO_x$ and $SO_x$ releasing control shown in FIG. 28, which routine is executed by the interruption at every predetermined time interval.

Referring to FIGS. 32A to 32D, first of all, at step 600 to step 608, the amount Wn of $NO_x$ absorbed in the $NO_x$ absorbent 19 and the amount Ws of $SO_x$ absorbed in the $SO_x$ absorbent 18 are calculated. Namely, first of all, at step 600, it is determined whether or not the correction coefficient Kt with respect to the basic fuel injection time TP is smaller than 1.0. When Kt<1.0, that is, when the lean air-fuel mixture is fed into the combustion chamber 3, the processing routine goes to step 601, at which the $NO_x$ amount Wn is calculated based on the following equation, and then the processing routine goes to step 602, at which the $SO_x$ amount Ws is calculated based on the following equation.

$$Wn=Wn+K_1 \cdot N \cdot PM$$

$$Ws=Ws+K_2 \cdot N \cdot PM$$

Here, N indicates the engine rotational speed; PM indicates the absolute pressure in the surge tank 10; and $K_1$ and $K_2$ indicate constants ($K_1 < K_2$). The amount of the $NO_x$ and amount of $SO_x$ discharged from the engine per unit time are in proportion to the engine rotational speed N and in proportion to the absolute pressure PM in the surge tank 10, and therefore the $NO_x$ amount Wn and the $SO_x$ amount Ws are represented as in the above equations. Accordingly, it is seen from these equations that so far as the combustion of the lean air-fuel mixture is continued, the $NO_x$ amount Wn and the $SO_x$ amount Ws are increased. When the $NO_x$ amount Wn is calculated at step 601, and the $SO_x$ amount Ws is calculated at step 602, the processing routine goes to step 609.

On the other hand, when it is determined at step 600 that Kt≧1.0, that is, when air-fuel ratio of the air-fuel mixture fed into the combustion chamber 3 is the stoichiometric air-fuel ratio or rich, the processing routine goes to step 603, at which the $NO_x$ amount Wn is calculated based on the following equation, and then the processing routine goes to step 604, at which the $SO_x$ amount Ws is calculated based on the following equation:

$$Wn=Wn-Wn \cdot f(T) \cdot f(Kt)$$

$$Ws=Ws-Ws \cdot g(T) \cdot g(Kt)$$

Figure 33:
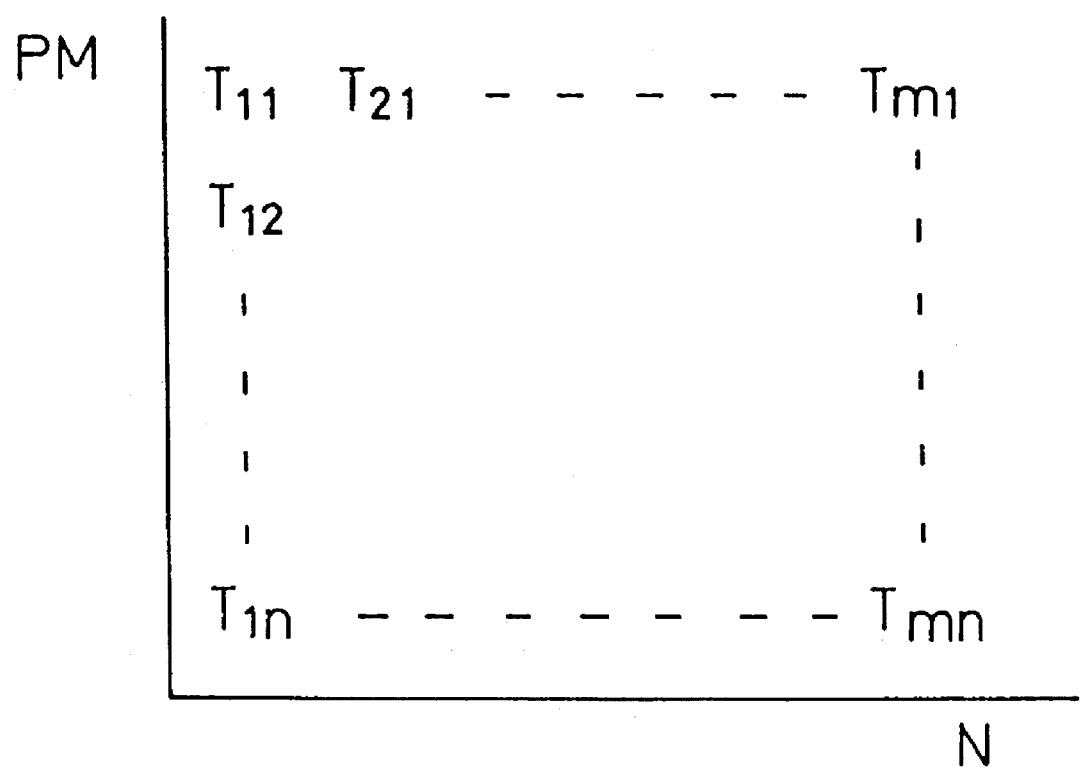
FIG. 33 is a view showing the map of the exhaust gas temperature T.

Here, f(T) and g(T) indicate the $NO_x$ releasing rate and the $SO_x$ releasing rate shown in FIG. 26A, respectively, and f(Kt) and g(Kt) indicate the $NO_x$ releasing rate and the $SO_x$ releasing rate shown in FIG. 26B, respectively. As shown in FIG. 26A, the $NO_x$ releasing rate f(T) and the $SO_x$ releasing rate g(T) are functions of the exhaust gas temperature T, and accordingly these $NO_x$ releasing rate f(T) and $SO_x$ releasing rate g(T) are calculated from the exhaust gas temperature T detected by the temperature sensor 22. Note that, it is also possible to directly detect the exhaust gas temperature T by the temperature sensor 22 in this way, but it is also possible to estimate the same from the absolute pressure PM in the surge tank 10 and the engine rotational speed N. In this case, it is sufficient if the relationship among the exhaust gas temperature T, the absolute pressure PM, and the engine rotational speed N is found in advance by experiments, this relationship is stored in advance in the ROM 32 in the form of the map as shown in FIG. 33, and the exhaust gas temperature T is calculated from this map.

Also, as shown in FIG. 26B, the $NO_x$ releasing rate f(Kt) and $SO_x$ releasing rate g(Kt) are functions of the correction coefficient Kt, and accordingly the $NO_x$ releasing rate f(Kt) and $SO_x$ releasing rate g(Kt) are calculated from the correction coefficient Kt. An actual $NO_x$ releasing rate is expressed by the product of the f(T) and the f(Kt), and therefore this means that the amount of $NO_x$ released from the $NO_x$ absorbent 19 per unit time is expressed by Wn·f(T)·f(Kt), and accordingly the amount Wn of $NO_x$ absorbed in the $NO_x$ absorbent 19 becomes like the above-mentioned equation. Similarly, the $SO_x$ releasing rate is expressed by the product of the g(T) and the g(Kt), and therefore this means that the amount of $SO_x$ released from the $SO_x$ absorbent 18 per unit time is expressed by Ws·g(T)·g(Kt), and accordingly the amount Ws of $SO_x$ absorbed in the $SO_x$ absorbent 18 becomes like the above-mentioned equation. Accordingly, it is seen that both of the $NO_x$ amount Wn and the $SO_x$ amount Ws are reduced when Kt≧1.0. Note that, the $NO_x$ amount Wn and the $SO_x$ amount Ws calculated at step 601 to step 604 is stored in the backup RAM 33a.

When the $NO_x$ amount Wn is calculated at step 603 and the $SO_x$ amount Ws is calculated at step 604, the processing routine goes to step 605, at which it is determined whether or not the $NO_x$ amount Wn becomes negative. When Wn<0, the processing routine goes to step 606, at which Wn is made zero, and then the processing routine goes to step 607. At step 607, it is determined whether or not the $SO_x$ amount Ws becomes negative. When Ws<0, the processing routine goes to step 608, at which Ws is made zero, and then the processing routine goes to step 609.

At step 609, it is determined whether or not the correction coefficient K determined according to the engine rotation state shown in FIG. 25 is smaller than 1.0. When K<1.0, that is, when the target air-fuel ratio determined according to the operation state of the engine is lean, the processing routine goes to step 610, at which it is determined whether or not the $SO_x$ processing has been set. When the $SO_x$ processing flag has not been set, the routine jumps to step 613, at which it is determined whether or not the $SO_x$ releasing flag has been set. When the $SO_x$ releasing flag has not been set, the processing routine goes to step 614, at which it is determined whether or not the $NO_x$ releasing flag has been set. When the $NO_x$ releasing flag has not been set, the processing routine goes to step 615.

At step 615, it is determined whether or not the $SO_x$ amount Ws has become larger than the maximum allowable value Wso (FIG. 31). When Ws≦Wso, the processing routine goes to step 616, at which it is determined whether or not the $NO_x$ amount Wn has become larger than the maximum allowable value Wno. When Wn≦Wno, the processing cycle is completed. At this time, the lean air-fuel mixture is fed into the combustion chamber 3, and the switch valve 27 is held at the bypass closed position.

On the other hand, when it is determined at step 616 that the Wn becomes larger than Wno, the processing routine goes to step 617, at which the $NO_x$ releasing flag is set, and then the processing cycle is completed. In the next processing cycle, it is determined at step 614 that the $NO_x$ releasing flag has been set, and therefore the processing routine goes to step 618, at which the correction coefficient Kt is made KK1. The value of this KK1 is a value of about 1.1 to 1.2 with which the air-fuel ratio of the air-fuel mixture fed into the combustion chamber 3 becomes about 12.0 to 13.5. When Kt is made KK1, the air-fuel ratio of the air-fuel mixture fed into the combustion chamber 3 is made rich. Subsequently, at step 619, it is determined whether or not the $NO_x$ amount Wn has become smaller than the lower limit value MIN (FIG. 31), and when Wn≧MIN, the processing cycle is completed. Contrary to this, when Wn becomes smaller than MIN, the processing routine goes to step 620, at which the $NO_x$ releasing flag is set. When the $NO_x$ releasing flag is reset, the air-fuel ratio of the air-fuel mixture fed into the combustion chamber 3 is switched from rich to lean. Accordingly, during a period from when Wn becomes larger than Wno to when Wn becomes smaller than MIN, the air-fuel ratio of the air-fuel mixture fed into the combustion chamber 3 is made rich, and during this time, the $NO_x$ is released from the $NO_x$ absorbent 19.

On the other hand, when it is decided at step 615 that the $SO_x$ amount Ws has become larger than the maximum allowable value Wso, the processing routine goes to step 621, at which it is determined whether or not the temperature T of exhaust gas flowing into the $SO_x$ absorbent 18 is higher than the set value To (FIG. 26A). When T≦To, the processing cycle is completed. Contrary to this, when T>To, the processing routine goes to step 622, at which the $SO_x$ releasing flag is set and then the processing cycle is completed.

In the next processing cycle, it is decided at step 613 that the $SO_x$ releasing flag has been set, and therefore the processing routine goes to step 623, at which the correction coefficient Kt is made KK2. The value of this KK2 is the value of about 1.1 to 1.2 with which the air-fuel ratio of the air-fuel mixture fed into the combustion chamber 3 becomes about 12.0 to 13.5. It is also possible to make the value of this KK2 different from the value of KK1, and make the same as the same value as the value of KK1. When the correction coefficient Kt is made KK2, the air-fuel ratio of the air-fuel mixture fed into the combustion chamber 3 is made rich. Subsequently, at step 624, the switch valve 27 is switched to the bypass opening position, and thus the exhaust gas flowing out of the $SO_x$ absorbent 18 is fed into the bypass passage 24.

Subsequently, at step 625, it is determined whether or not the $SO_x$ amount Ws has become smaller than the lower limit value MIN, and when Ws≧MIN, the processing cycle is completed. Contrary to this, when Ws becomes smaller than MIN, the processing routine goes to step 626, at which the switch valve 27 is switched to the bypass closed position, and then the processing routine goes to step 627, at which the $SO_x$ releasing flag is reset. When the $SO_x$ releasing flag is reset, the air-fuel ratio of the air-fuel mixture fed into the combustion chamber 3 is switched from rich to lean. Accordingly, when Ws becomes larger than Wso, if T>To, from when the Ws becomes larger than Wso to when Ws becomes smaller than MIN, the air-fuel ratio of the air-fuel mixture fed into the combustion chamber 3 is made rich and, at the same time, the switch valve 27 is held at the bypass opening position. Thus, during this term, the $SO_x$ is released from the $SO_x$ absorbent 18, and the released $SO_x$ is fed into the bypass passage 24.

Figure 32A:
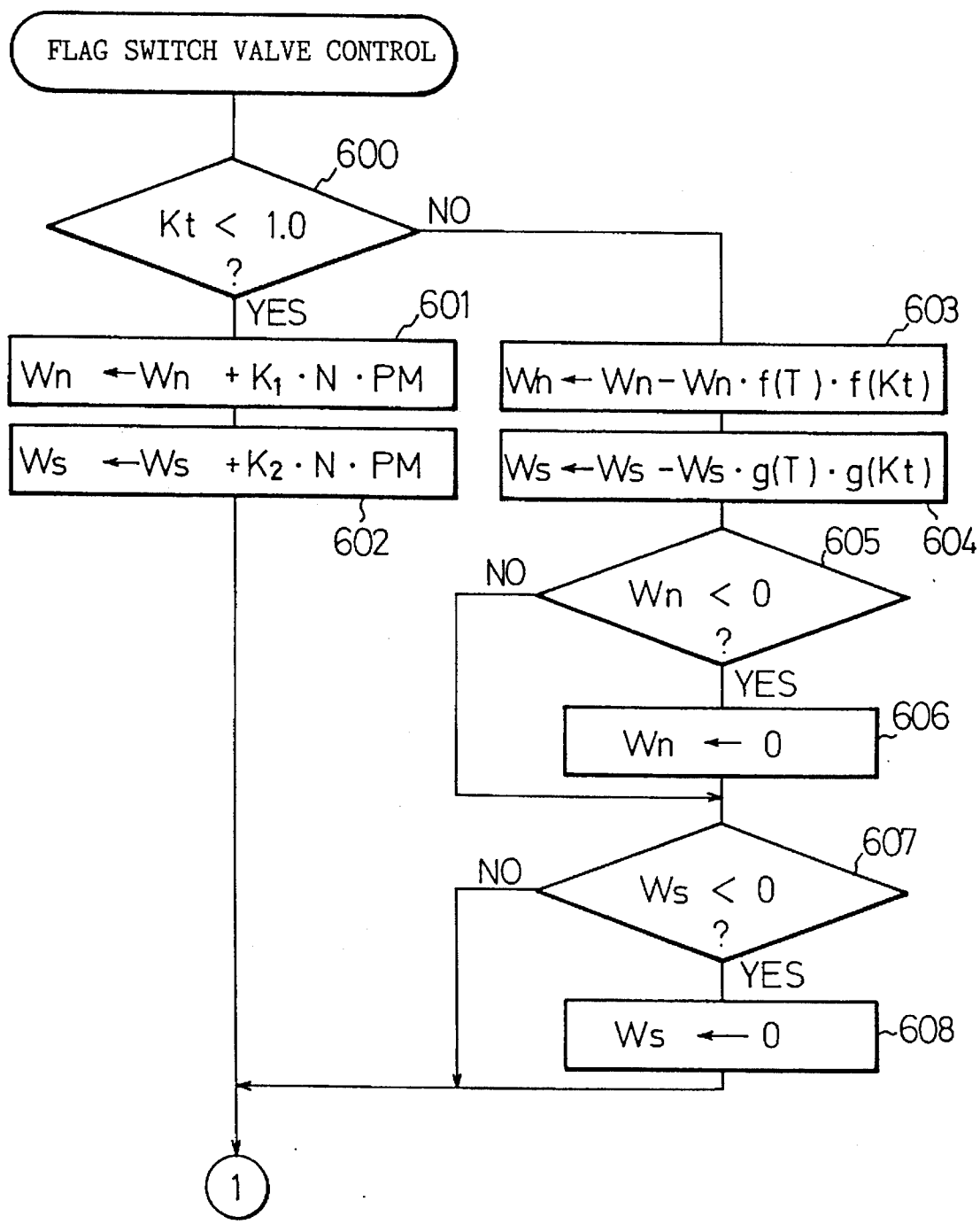
FIGS. 32A to 32D are flow charts of a flag switch valve control.
Figure 32B:
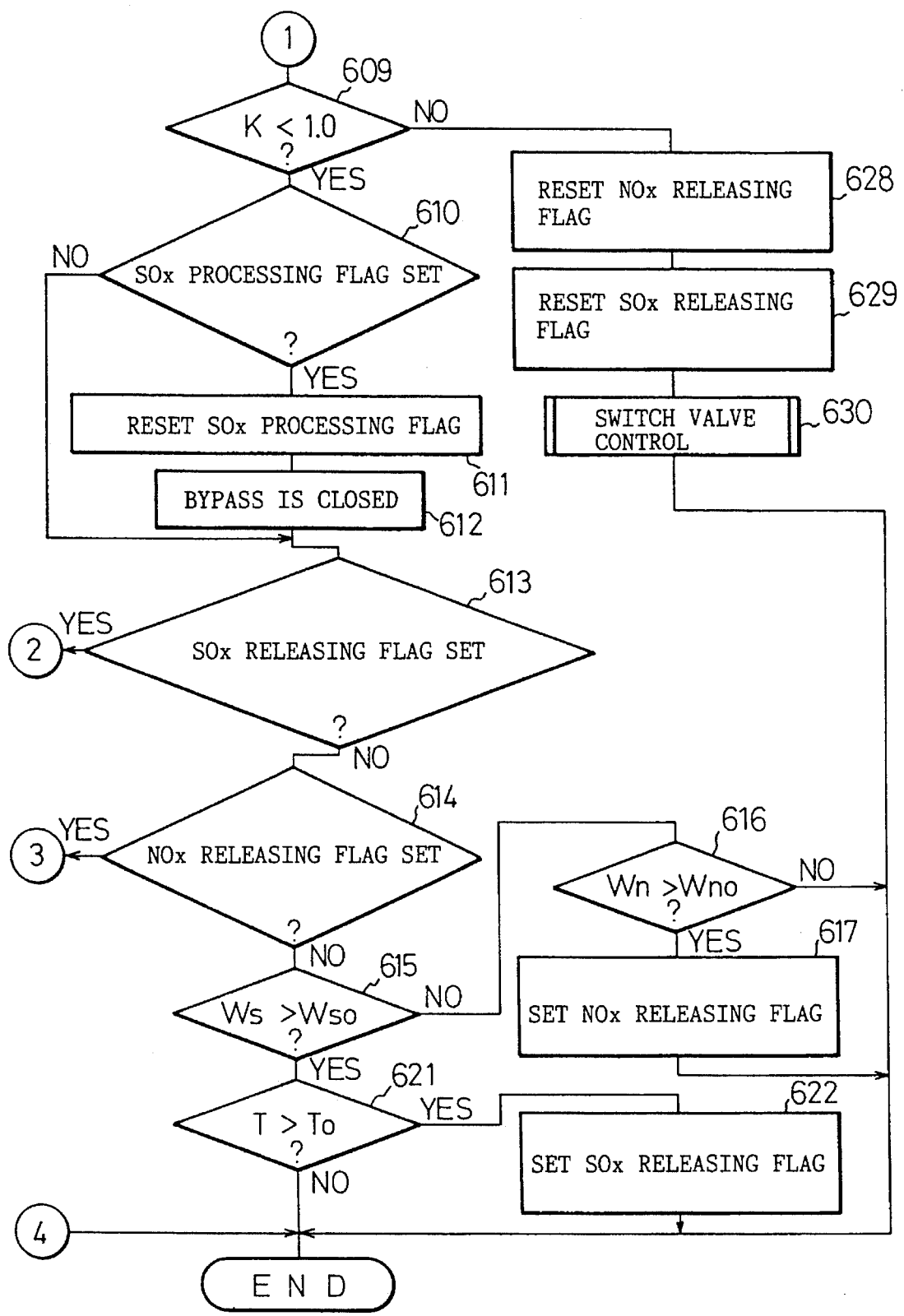
Figure 32C:
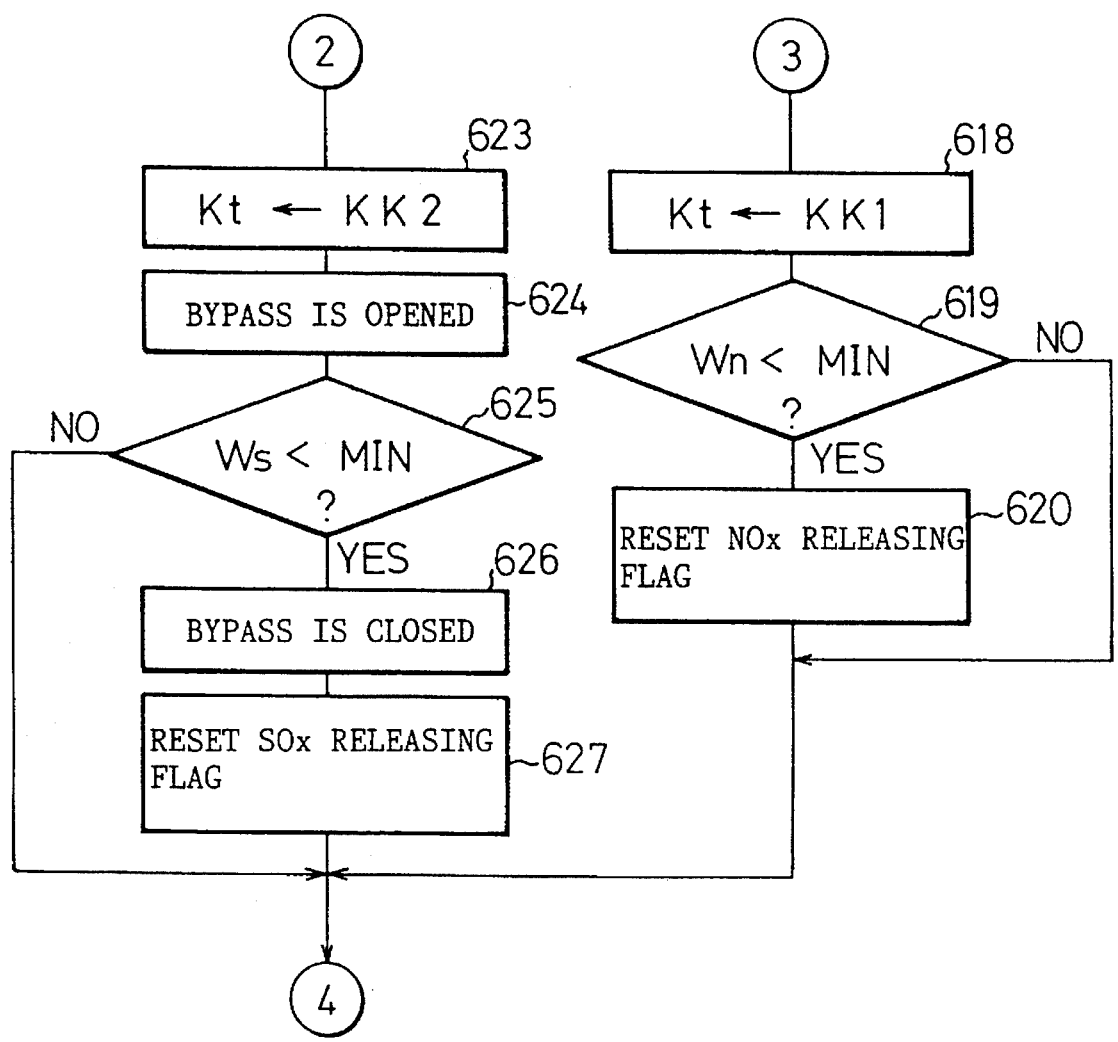
Figure 32D:
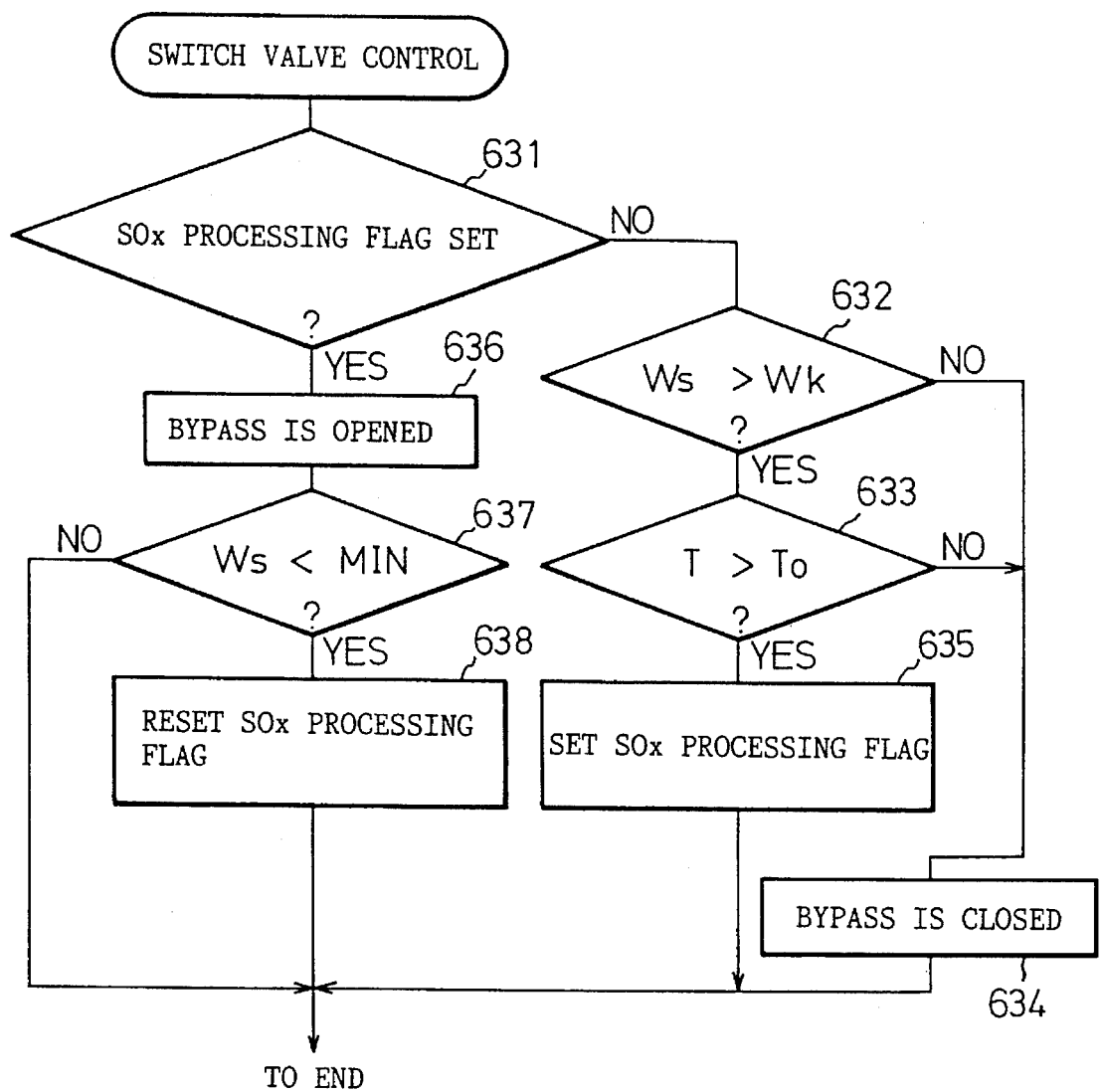

On the other hand, when it is determined at step 609 that K≧1.0, that is, when the target air-fuel ratio of the air-fuel mixture which should be fed into the combustion chamber 3 becomes the stoichiometric air-fuel ratio or rich, the processing routine goes to step 628, at which the $NO_x$ releasing flag is reset, and then the processing routine goes to step 629, at which the $SO_x$ releasing flag is reset. Subsequently, at step 630, the switch valve control shown in FIG. 32D is carried out. In this switch valve control, as shown in FIG. 32D, first of all, it is determined at step 631 whether or not the $SO_x$ processing flag has been set. When the $SO_x$ flag has not been set, the processing routine goes to step 632, at which it is determined whether or not the $SO_x$ amount Ws is larger than the set up value Wk (MIN<Wk<Wso). When Ws≦Wk, the processing routine goes to step 634, at which the switch valve 27 is made the bypass closed position. When Ws≦Wk, even if the $SO_x$ is released from the $SO_x$ absorbent 18, since the $SO_x$ release is small, the switch valve 27 is made the bypass closed position.

Contrary to this, when Ws>Wk, the processing routine goes to step 633, at which it is determined whether or not the temperature T of exhaust gas flowing into the $SO_x$ absorbent 18 is higher than the set value To (FIG. 26A). When T≦To, the processing routine goes to step 634. Namely, when T≦To, almost no $SO_x$ is released from the $SO_x$ absorbent 18, and therefore the switch valve 27 is made the bypass closed position. Note that, the $NO_x$ is released from the $NO_x$ absorbent 19 when the switch valve 27 is held at the bypass closed position.

On the other hand, when it is decided at step 633 that T>To, the processing routine goes to step 635, at which the $SO_x$ processing flag is set. When the $SO_x$ processing flag is set, the processing routine goes from step 631 to step 633, at which the switch valve 27 is switched to the bypass opening position. Namely, when Ws>Wk and T>To, a certain amount of $SO_x$ is released from the $SO_x$ absorbent 18, and therefore the switch valve 27 is made the bypass opening position so as to feed the released $SO_x$ into the bypass passage 24. Subsequently, at step 637, it is determined whether or not the amount Ws of $SO_x$ becomes smaller than the lower limit value MIN. When Ws becomes smaller than MIN, the processing routine goes to step 638, at which the $SO_x$ processing flag is reset. When the $SO_x$ processing flag is reset, in the next processing cycle, the processing routine goes from step 631 to step 632, since it is determined that Ws is equal to or smaller than Wk at this time, and therefore the processing routine goes to step 634, at which the switch valve 27 is switched to the bypass closed position.

On the other hand, where the $SO_x$ flag has been set when the operation state is changed from the state where K≧1.0 to the state where K<1.0, the processing routine goes from step 610 to step 611, at which the $SO_x$ processing flag is reset. Subsequently, at step 612, the switch valve 27 is switched to the bypass closed position.

Figure 34:
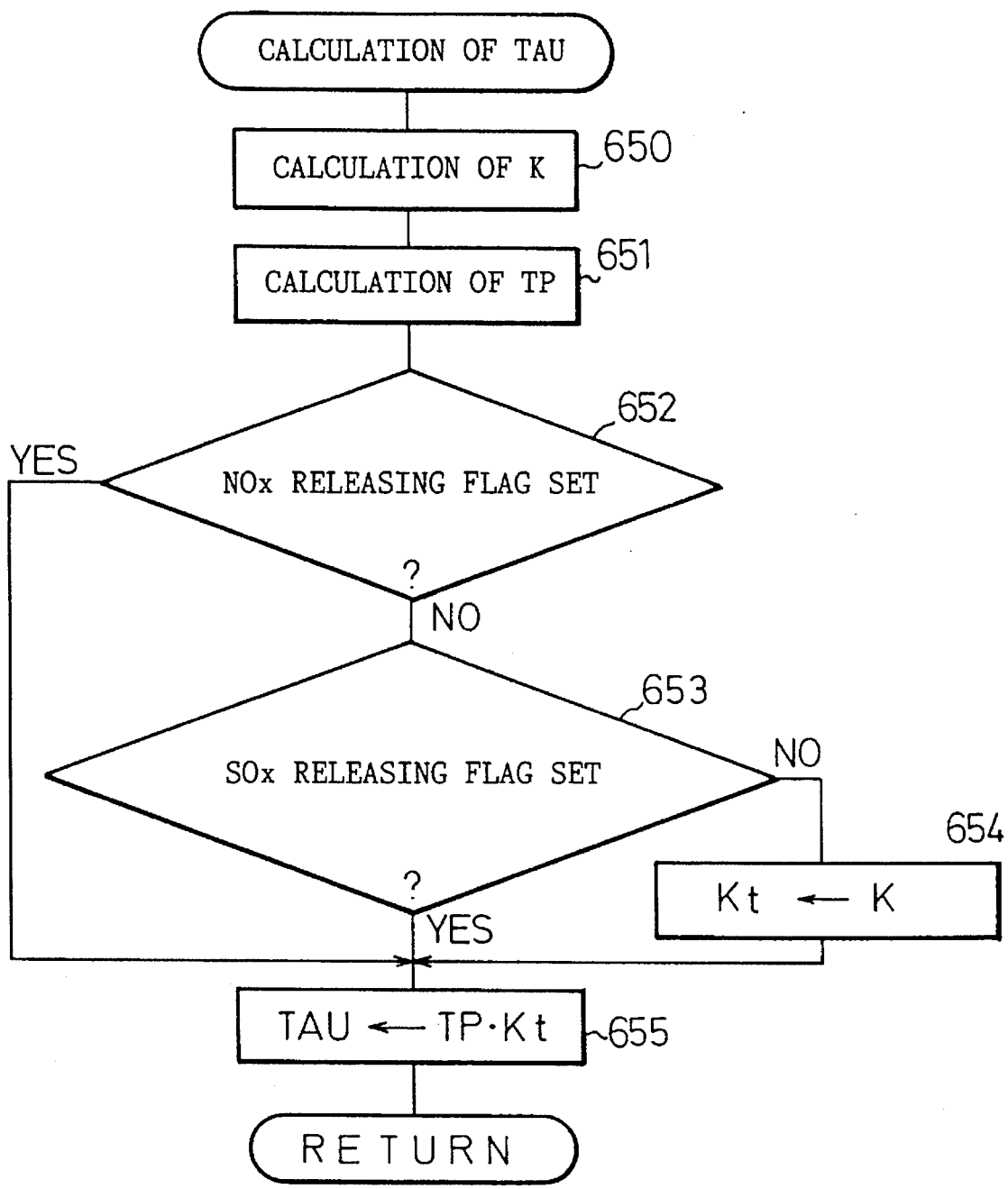
FIG. 34 is a flow chart for calculating the fuel injection time TAU.

FIG. 34 shows the calculation routine of the fuel injection time TAU, which routine is repeatedly executed.

Referring to FIG. 34, first of all, at step 650, the correction coefficient K determined in accordance with the engine operation state shown in FIG. 25 is calculated. Subsequently, at step 651, the basic fuel injection time TP is calculated from the map shown in FIG. 2. Subsequently, at step 652, it is determined whether or not the $NO_x$ releasing flag has been set, and when the $NO_x$ releasing flag has not been set, the processing routine goes to step 653, at which it is determined whether or not the $SO_x$ releasing flag has been set. When the $SO_x$ releasing flag has not been set, the processing routine goes to step 654, at which the correction coefficient K is made Kt, and then at step 655, the fuel injection time TAU (=TP·Kt) is calculated by multiplying the basic fuel injection time TP by Kt. Accordingly, when the $NO_x$ releasing flag and the $SO_x$ releasing flag have not been set, the air-fuel ratio of the air-fuel mixture fed into the combustion chamber 3 becomes the air-fuel ratio determined by the correction coefficient K.

Contrary to this, when the $NO_x$ releasing flag is set, the processing routine jumps to step 655, and when the $SO_x$ releasing flag is set, the processing routine goes to step 655. When the $NO_x$ releasing flag is set, in the routine shown in FIGS. 32A to 32D, Kt is made equal to KK1 (KK1>1.0), and therefore the air-fuel ratio of the air-fuel mixture fed into the combustion chamber 3 is made rich, while when the $SO_x$ releasing flag is set, in the routine shown in FIGS. 32A to 32D, Kt is made equal to KK2 (KK2>1.0), and therefore the air-fuel ratio of the air-fuel mixture fed into the combustion chamber 3 is made rich.

Figure 35A:
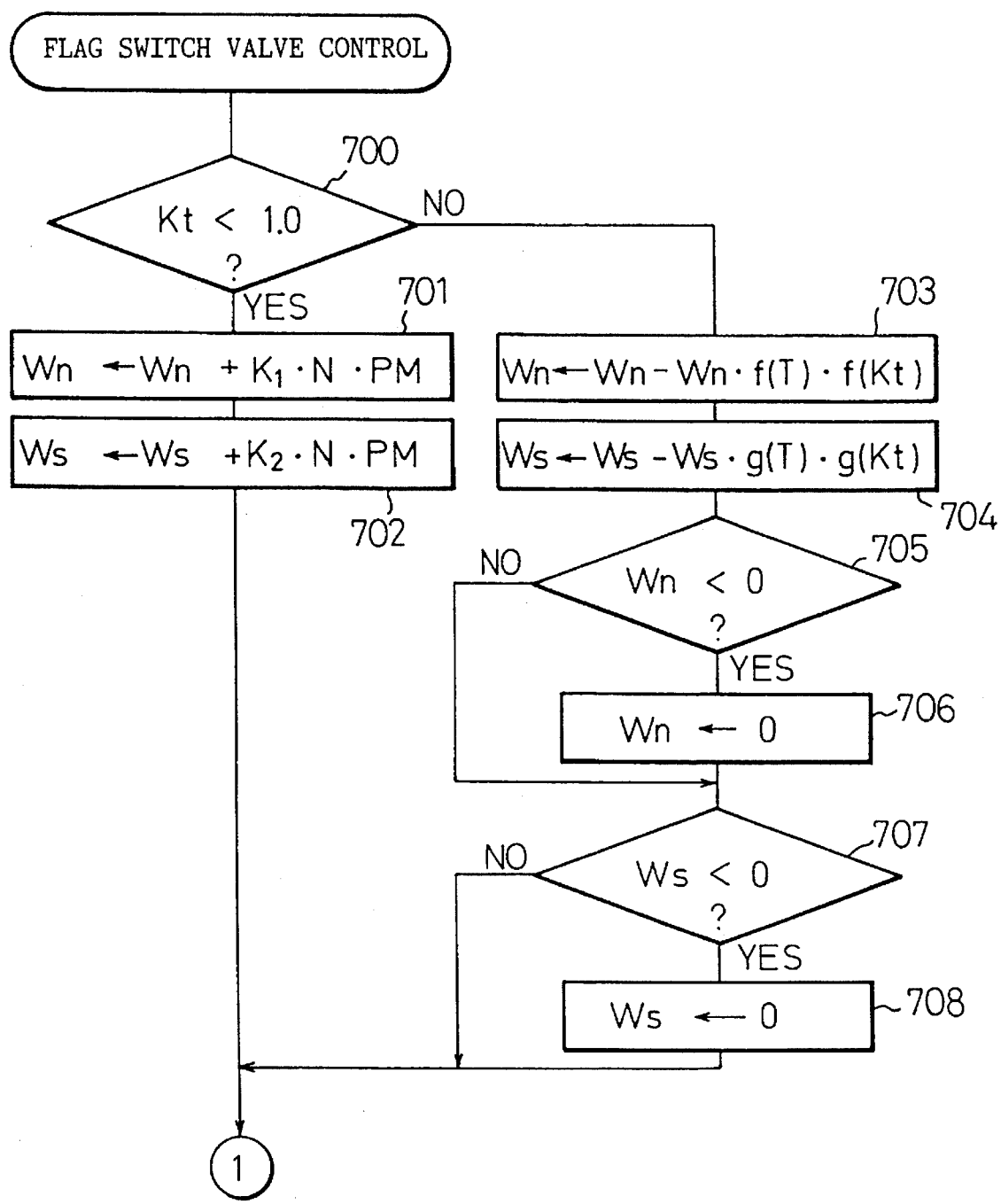
FIGS. 35A to 35D are flow charts of the flag switch valve control.
Figure 35B:
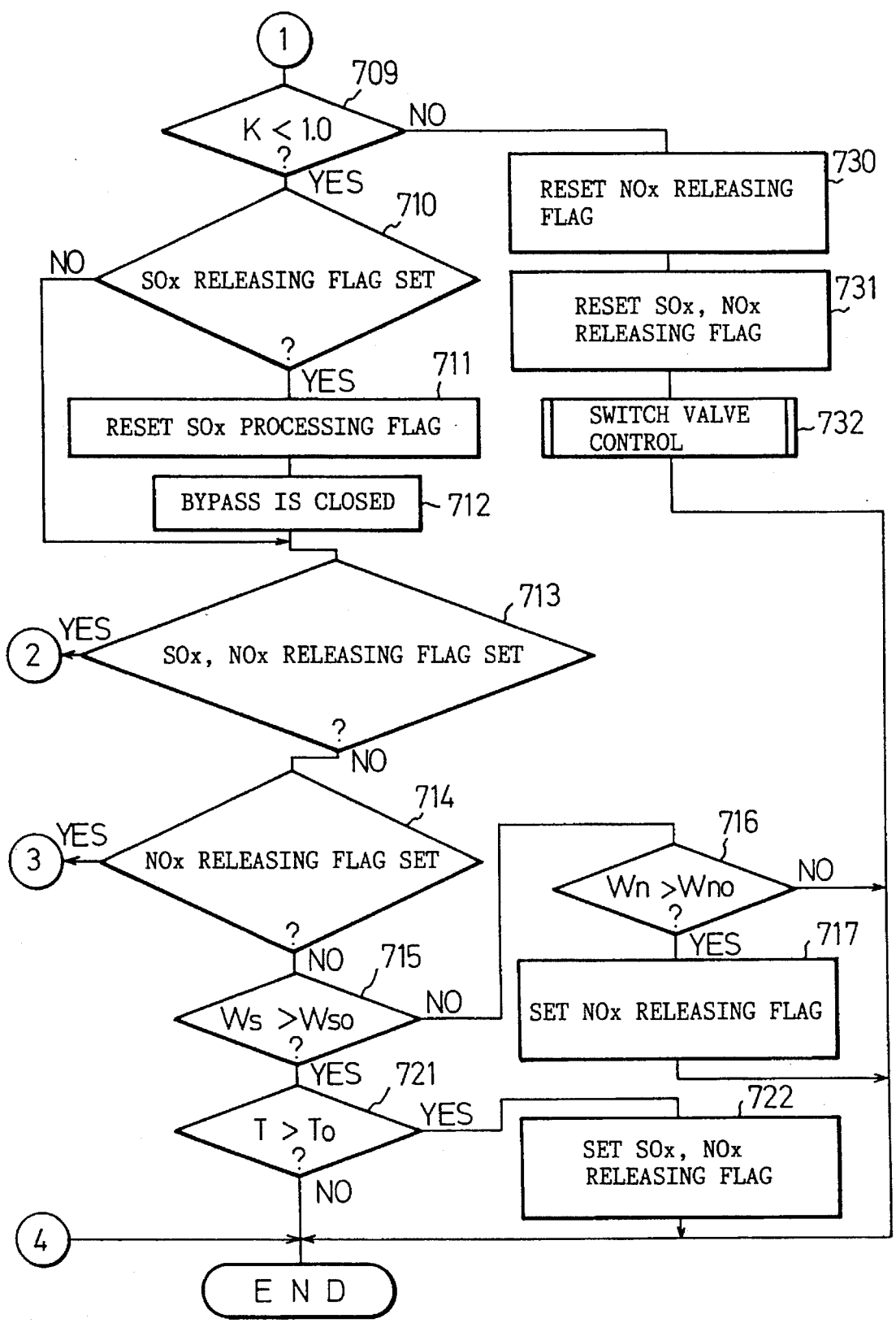
Figure 35C:
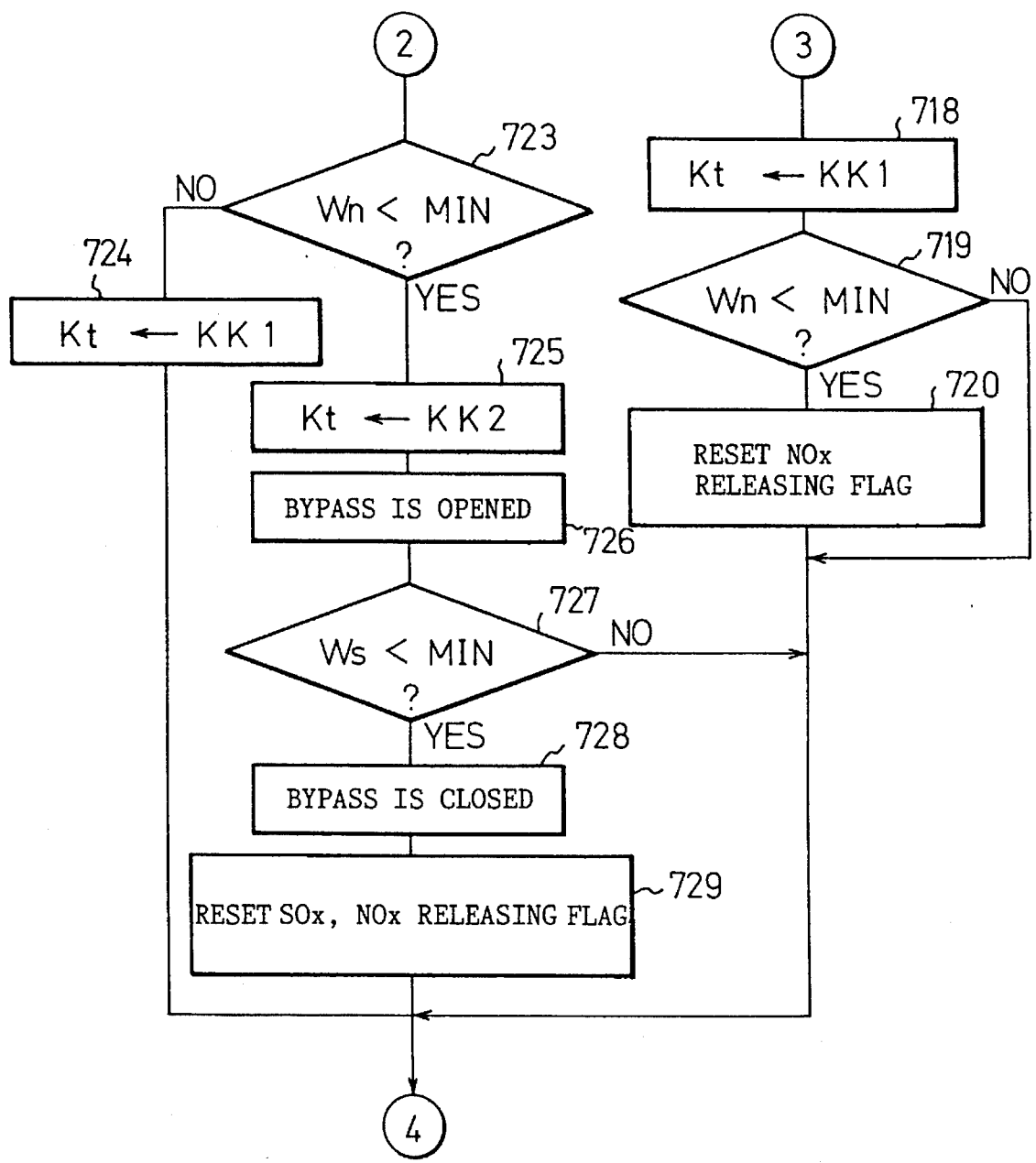
Figure 35D:
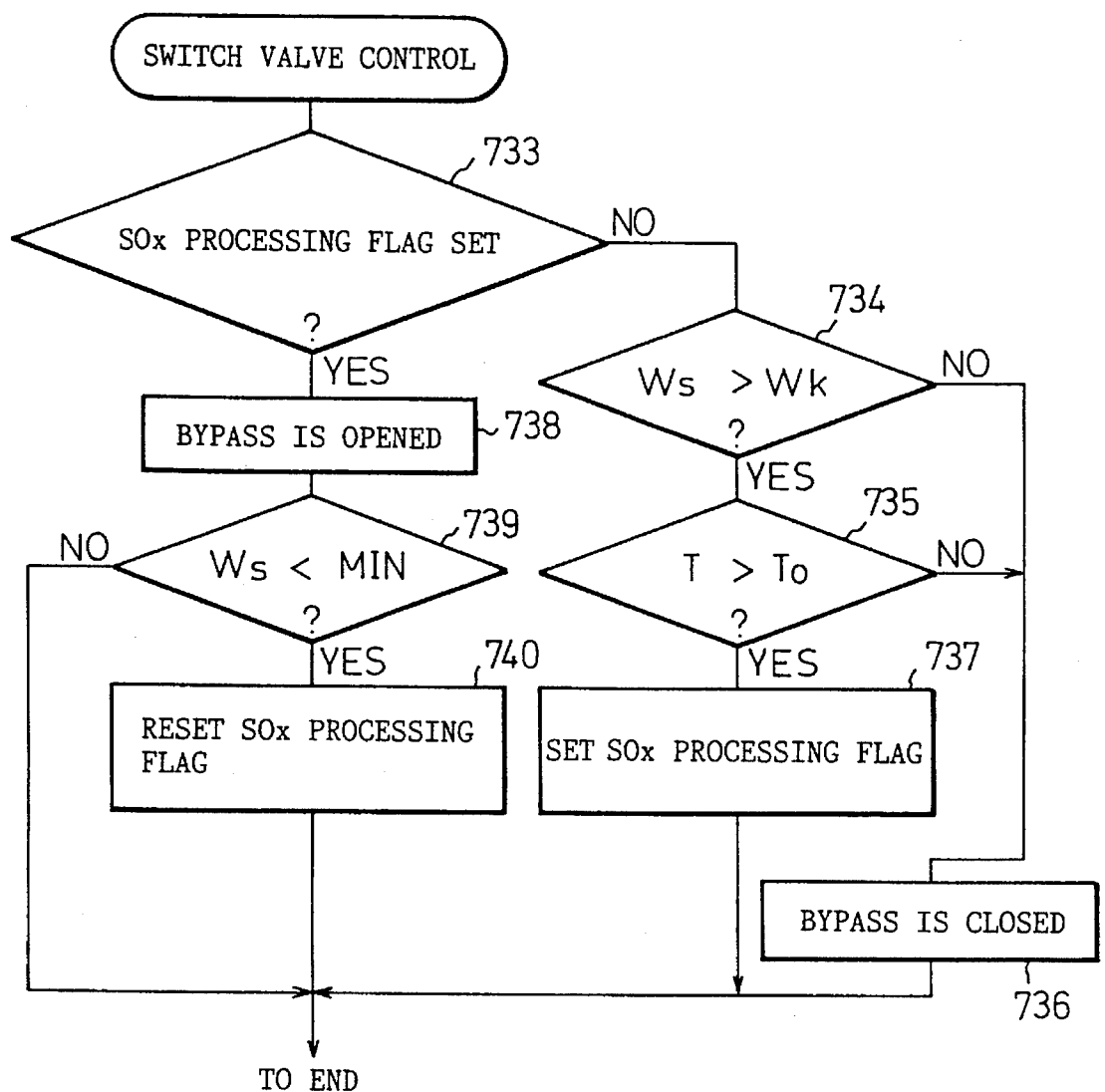

FIGS. 35A to 35D show the flag switch valve control routine for executing the $NO_x$ and $SO_x$ releasing control shown in FIG. 29, which routine is executed by interruption at every predetermined time interval. Note that, in this embodiment, the flow chart part shown in FIG. 35A, FIG. 35B, and FIG. 35D is substantially the same as the flow chart part shown in FIG. 32A, FIG. 32B, and FIG. 32D, and the part which is basically different from them is only the flow chart part shown in FIG. 35C.

Namely, referring to FIGS. 35A to 35D, first of all, at step 700, it is determined whether or not the correction coefficient Kt with respect to the basic fuel injection time TP is smaller than 1.0. When Kt<1.0, that is, when the lean air-fuel mixture is fed into the combustion chamber 3, the processing routine goes to step 701, at which the $NO_x$ amount Wn (=Wn+$K_1$·N·PM) is calculated, and then the processing routine goes to step 702, at which the $SO_x$ amount Ws (=Ws+$K_2$·N·PM) is calculated. Here, N indicates the engine rotational speed, P indicates the absolute pressure in the surge tank 10, and $K_1$ and $K_2$ indicate constants ($K_1 > K_2$). Then, the processing routine goes to step 709.

On the other hand, when it is determined at step 700 that Kt≧1.0, that is, when the air-fuel ratio of the air-fuel mixture fed into the combustion chamber 3 is the stoichiometric air-fuel ratio or rich, the processing routine goes to step 703, at which the $NO_x$ amount Wn (= Wn–Wn·f(T)·f(Kt)) is calculated, and then the processing routine goes to step 704, at which the $SO_x$ amount Ws (=Ws–Ws·g(T)·g(Kt)) is calculated. Here, f(T) and g(T) indicate the $NO_x$ releasing rate and $SO_x$ releasing rate shown in FIG. 26A, respectively, and f(Kt) and g(Kt) indicate the $NO_x$ releasing rate and $SO_x$ releasing rate shown in FIG. 26B, respectively When the $NO_x$ amount Wn is calculated at step 703, and the $SO_x$ amount Ws is calculated at step 704, the processing routine goes to step 705, at which it is determined whether or not the $NO_x$ amount Wn has become negative. When Wn<0, the processing routine goes to step 706, at which Wn is made zero, and then, the processing routine goes to step 707. At step 707, it is determined whether or not the $SO_x$ amount Ws becomes negative. When Ws<0, the processing routine goes to step 708, at which Ws is made zero, and then the processing routine goes to step 709.

At step 709, it is determined whether or not the correction coefficient K determined according to the engine operation state shown in FIG. 25 is smaller than 1.0. When K<1.0, that is, when the target air-fuel ratio determined according to the operation state of the engine is lean, the processing routine goes to step 710, at which it is determined whether or not the $SO_x$ processing has been set. When the $SO_x$ processing flag has not been set, the routine jumps to step 713, at which it is determined whether or not the $SO_x$ and $NO_x$ releasing flag has been set. When the $SO_x$ and $NO_x$ releasing flag has not been set, the processing routine goes to step 714, at which it is determined whether or not the $NO_x$ releasing flag has been set. When the $NO_x$ releasing flag has not been set, the processing routine goes to step 715.

At step 715, it is determined whether or not the $SO_x$ amount Ws has become larger than the maximum allowable value Wso (FIG. 31). When Ws≦Wso, the processing routine goes to step 716, at which it is determined whether or not the $NO_x$ amount Wn has become larger than the maximum allowable value Wno. When Wn≦Wno, the processing cycle is completed. At this time, the lean air-fuel mixture is fed into the combustion chamber 3, and the switch valve 27 is held at the bypass closed position.

On the other hand, when it is determined at step 716 that the Wn becomes larger than Wno, the processing routine goes to step 717, at which the $NO_x$ releasing flag is set, and then the processing cycle is completed. In the next processing cycle, it is determined at step 714 that the $NO_x$ releasing flag has been set, and therefore the processing routine goes to step 718, at which the correction coefficient Kt is made KK1. The value of this KK1 is a value of about 1.1 to 1.2 with which the air-fuel ratio of the air-fuel mixture fed into the combustion chamber 3 becomes about 12.0 to 13.5. When Kt is made KK1, the air-fuel ratio of the air-fuel mixture fed into the combustion chamber 3 is made rich. Subsequently, at step 719, it is determined whether or not the $NO_x$ amount Wn has become smaller than the lower limit value MIN (FIG. 31), and when Wn≧MIN, the processing cycle is completed. Contrary to this, when Wn becomes smaller than MIN, the processing routine goes to step 720, at which the $NO_x$ releasing flag is set. When the $NO_x$ releasing flag is reset, the air-fuel ratio of the air-fuel mixture fed into the combustion chamber 3 is switched from rich to lean. Accordingly, during a period from when Wn becomes larger than Wno to when Wn becomes smaller than MIN, the air-fuel ratio of the air-fuel mixture fed into the combustion chamber 3 is made rich, and during this time, the $NO_x$ is released from the $NO_x$ absorbent 19.

On the other hand, when it is decided at step 715 that the $SO_x$ amount Ws has become larger than the maximum allowable value Wso, the processing routine goes to step 721, at which it is determined whether or not the temperature T of exhaust gas flowing into the $SO_x$ absorbent 18 is higher than the set value To (FIG. 26A). When T≦To, the processing cycle is completed. Contrary to this, when T>To, the processing routine goes to step 722, at which the $SO_x$ and $NO_x$ releasing flag is set and then the processing cycle is completed.

In the next processing cycle, it is decided at step 713 that the $SO_x$ and $NO_x$ releasing flag has been set, and therefore the processing routine goes to step 723, at which it is determined whether or not the $NO_x$ amount Wn has become smaller than the lower limit value MIN. When Wn>MIN, the processing routine goes to step 724, at which the correction coefficient Kt is made KK1, and then the processing cycle is completed. Accordingly, when Ws becomes larger than Wso, the air-fuel ratio of the air-fuel mixture fed into the combustion chamber 3 is made rich (Kt=KK1) until when Wn becomes smaller than MIN, and the switch valve 27 is held at the bypass closed position. Accordingly, the $NO_x$ will be released from the $NO_x$ absorbent 19 during this time.

On the other hand, when it is decided at step 723 that Wn becomes smaller than MIN, the processing routine goes to step 725, at which the correction coefficient Kt is made KK2. The value of this KK2 is a value of about 1.1 to 1.2 with which the air-fuel ratio of the air-fuel mixture fed into the combustion chamber 3 becomes about 12.0 to 13.5. It is also possible to make the value of this KK2 different from the value of KK1, or make this the same value as the value of KK1. When the correction coefficient Kt is made KK2, the air-fuel ratio of the air-fuel mixture fed into the combustion chamber 3 is made rich. Subsequently, at step 726, the switch valve 27 is switched to the bypass opening position. Thus, the exhaust gas flowing out of the $SO_x$ absorbent 18 is fed into the bypass passage 24.

Subsequently, at step 727, it is determined whether or not the $SO_x$ amount Ws becomes smaller than the lower limit value MIN, and when Ws≧MIN, the processing cycle is completed. Contrary to this, when Ws becomes smaller than MIN, the processing routine goes to step 728, at which the switch valve 27 is switched to the bypass closed position, and then the processing routine goes to step 729, at which the $SO_x$ and $NO_x$ releasing flag is reset. When the $SO_x$ and $NO_x$ releasing flag is reset, the air-fuel ratio of the air-fuel mixture fed into the combustion chamber 3 is switched from rich to lean. Accordingly, if T>To when Ws becomes larger than Wso, the air-fuel ratio of the air-fuel mixture fed into the combustion chamber 3 is made rich (K=KK2) from when Wn becomes smaller than MIN to when Ws becomes smaller than MIN and, at the same time, the switch valve 27 is made the bypass opening position. Thus, during this time, the $SO_x$ is released from the $SO_x$ absorbent 18, and the released $SO_x$ is fed into the bypass passage 24.

On the other hand, when it is determined at step 709 that K≧1.0, that is, when the target air-fuel ratio of the air-fuel mixture which should be fed into the combustion chamber 3 becomes the stoichiometric air-fuel ratio or rich, the processing routine goes to step 730, at which the $NO_x$ releasing flag is reset, and then the processing routine goes to step 731, at which the $SO_x$ and $NO_x$ releasing flag is reset. Subsequently, at step 732, the switch valve control shown in FIG. 35D is carried out. In this switch valve control, as shown in FIG. 35D, first of all, at step 733, it is determined whether or not the $SO_x$ processing flag has been set. When the $SO_x$ processing flag has not been set, the processing routine goes to step 734, at which it is determined whether or not the $SO_x$ amount Ws is larger than the set value Wk (MIN<Wk<Wso). When Ws≦Wk, the processing routine goes to step 736, at which the switch valve 27 is made the bypass closed position. When Ws≦Wk, even if the $SO_x$ is released from the $SO_x$ absorbent 18, the amount of the released $SO_x$ is small, and therefore the switch valve 27 is made the bypass closed position.

Contrary to this, when Ws>Wk, the processing routine goes to step 735, at which it is determined whether or not the temperature T of exhaust gas flowing into the $SO_x$ absorbent 18 is higher than the set value To (FIG. 26A). When T≦To, the processing routine goes to step 736. Namely, when T≦To, almost no $SO_x$ is released from the $SO_x$ absorbent 18, and therefore the switch valve 27 is made the bypass closed position. Note that, the $NO_x$ is released from the $NO_x$ absorbent 19 when the switch valve 27 is held at the bypass closed position.

On the other hand, when it is decided at step 735 that T>To, the processing routine goes to step 737, at which the $SO_x$ processing flag is set. When the $SO_x$ processing flag is set, the processing routine goes from step 733 to step 738, at which the switch valve 27 is switched to the bypass opening position. Namely, when Ws>Wk and T>To, a certain amount of the $SO_x$ is released from the $SO_x$ absorbent 18, and therefore the switch valve 27 is made the bypass opening position so as to feed the released $SO_x$ into the bypass passage 24. Subsequently, at step 739, it is determined whether or not the amount Ws of $SO_x$ becomes smaller than the lower limit value MIN. When Ws becomes smaller than MIN, the processing routine goes to step 740, at which the $SO_x$ processing flag is reset. When the $SO_x$ processing flag is reset, in the next processing cycle, the processing routine goes from step 733 to step 734, since it is determined that Ws is equal to or smaller than Wk at this time, and therefore the processing routine goes to step 736, at which the switch valve 27 is switched to the bypass closed position.

On the other hand, where the $SO_x$ flag has been set when the operation state is changed from the state where K≧1.0 to the state where K<1.0, the processing routine goes from step 710 to step 711, at which the $SO_x$ processing flag is reset. Subsequently, at step 712, the switch valve 27 is switched to the bypass closed position.

Figure 36:
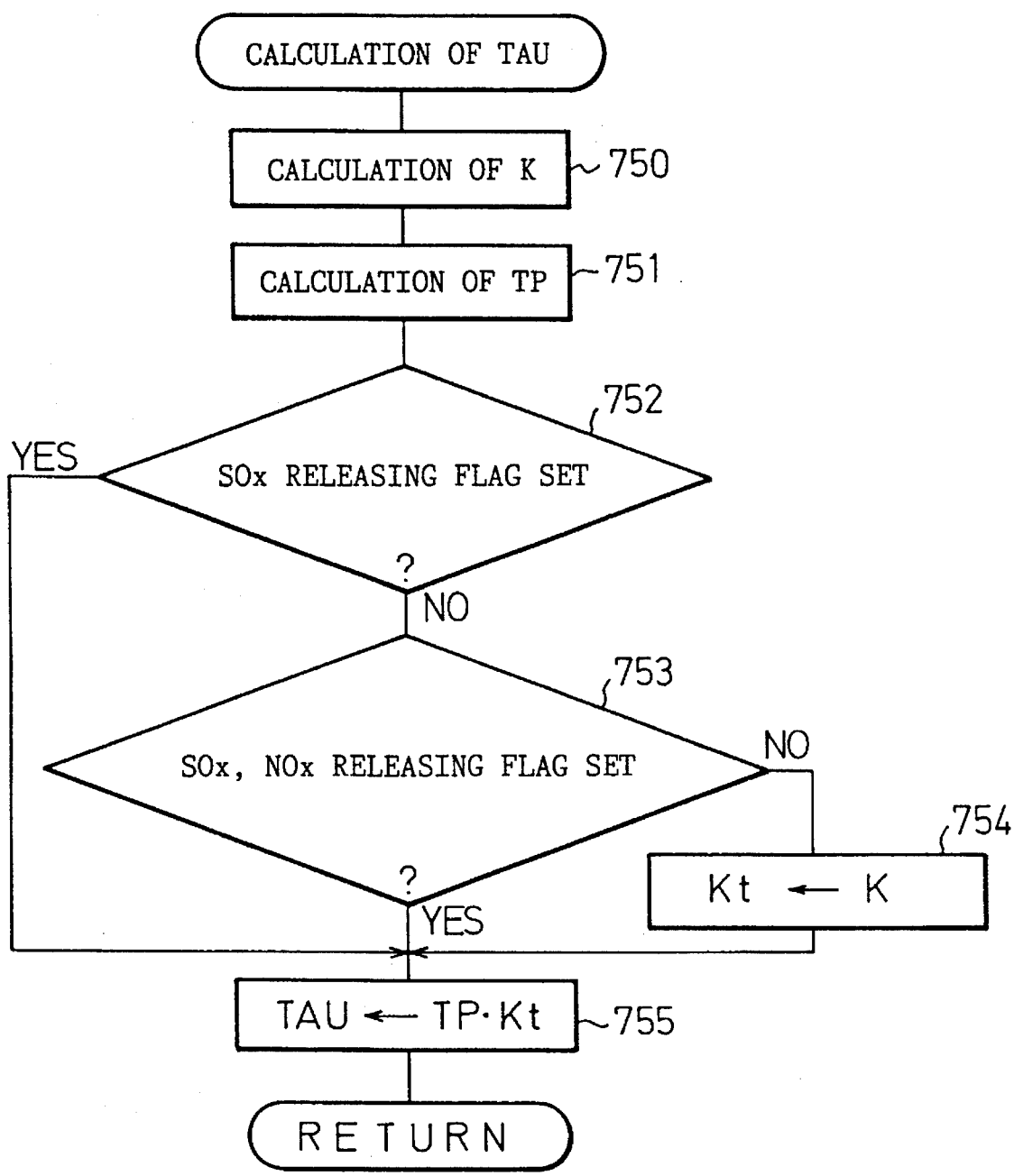
FIG. 36 is a flow chart for calculating the fuel injection time TAU.

FIG. 36 shows the calculation routine of the fuel injection time TAU, which routine is substantially the same as the routine shown in FIG. 34. Note that, this routine is repeatedly executed.

Namely, referring to FIG. 36, first of all, at step 750, the correction coefficient K determined in accordance with the engine operation state shown in FIG. 25 is calculated. Subsequently, at step 751, the basic fuel injection time TP is calculated from the map shown in FIG. 2. Subsequently, at step 752, it is determined whether or not the $NO_x$ releasing flag has been set, and when the $NO_x$ releasing flag has not been set, the processing routine goes to step 753, at which it is determined whether or not the $SO_x$ and $NO_x$ releasing flag has been set. When the $SO_x$ and $NO_x$ releasing flag has not been set, the processing routine goes to step 754, at which the correction coefficient K is made Kt, and then at step 755, the fuel injection time TAU (=TP·Kt) is calculated by multiplying the basic fuel injection time TP by Kt. Accordingly, when the $NO_x$ releasing flag and the $SO_x$ and $NO_x$ releasing flag have not been set, the air-fuel ratio of the air-fuel mixture fed into the combustion chamber 3 becomes the air-fuel ratio determined by the correction coefficient K.

Contrary to this, when the $NO_x$ releasing flag is set, the processing routine jumps to step 755, and when the $SO_x$ and $NO_x$ releasing flag is set, the processing routine goes to step 755. When the $NO_x$ releasing flag is set, in the routine shown in FIGS. 35A to 35D, Kt is made equal to KK1 (KK1>1.0), and therefore the air-fuel ratio of the air-fuel mixture fed into the combustion chamber 3 is made rich, while when the $SO_x$ and $NO_x$ releasing flag is set, in the routine shown in FIGS. 35A to 35D, Kt is made equal to KK1 (KK1>1.0), and then Kt is made equal to KK2 (KK2>1.0), and therefore the air-fuel ratio of the air-fuel mixture fed into the combustion chamber 3 is made rich.

Figure 37A:
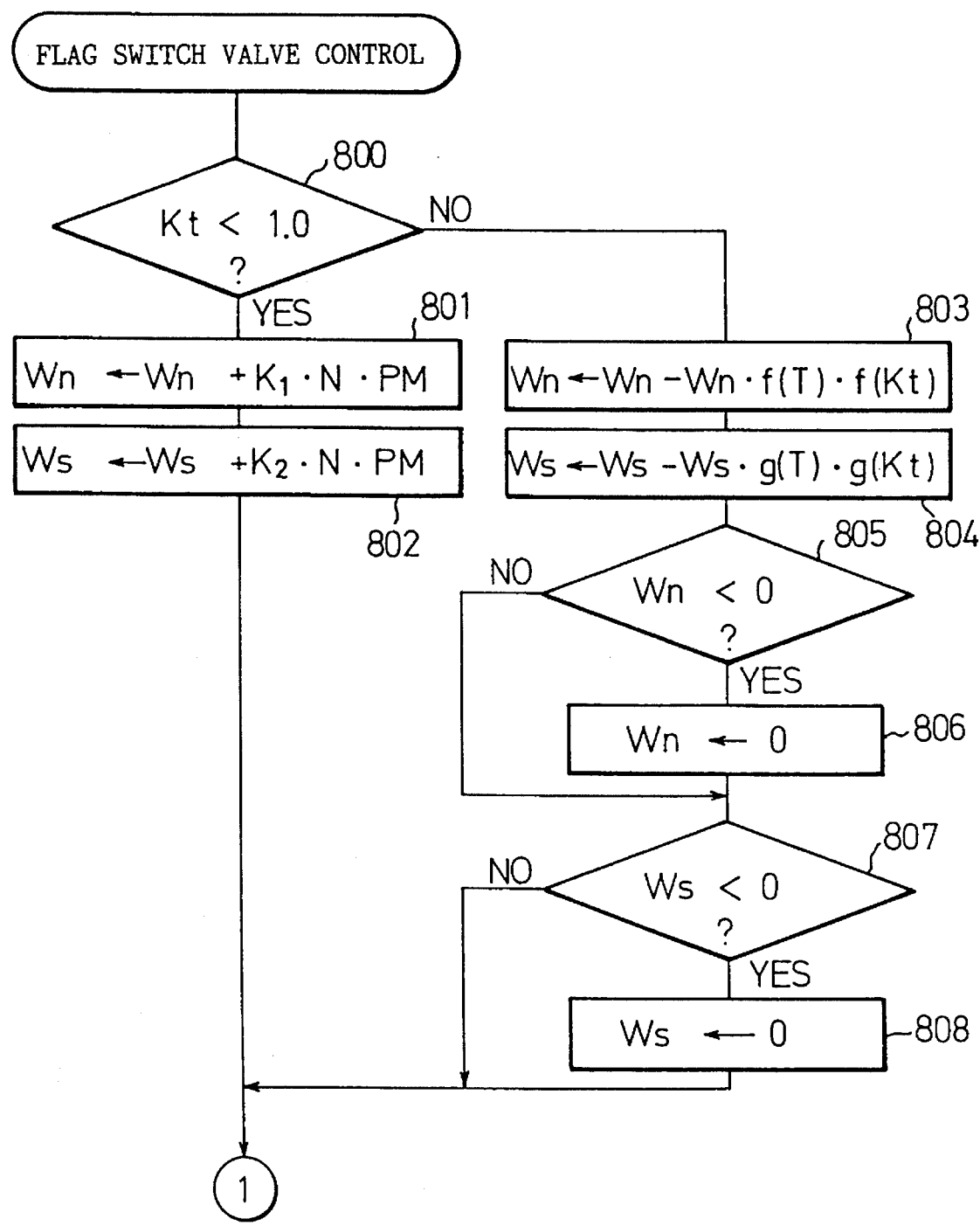
FIGS. 37A to 37D are flow charts of the flag switch valve control.
Figure 37B:
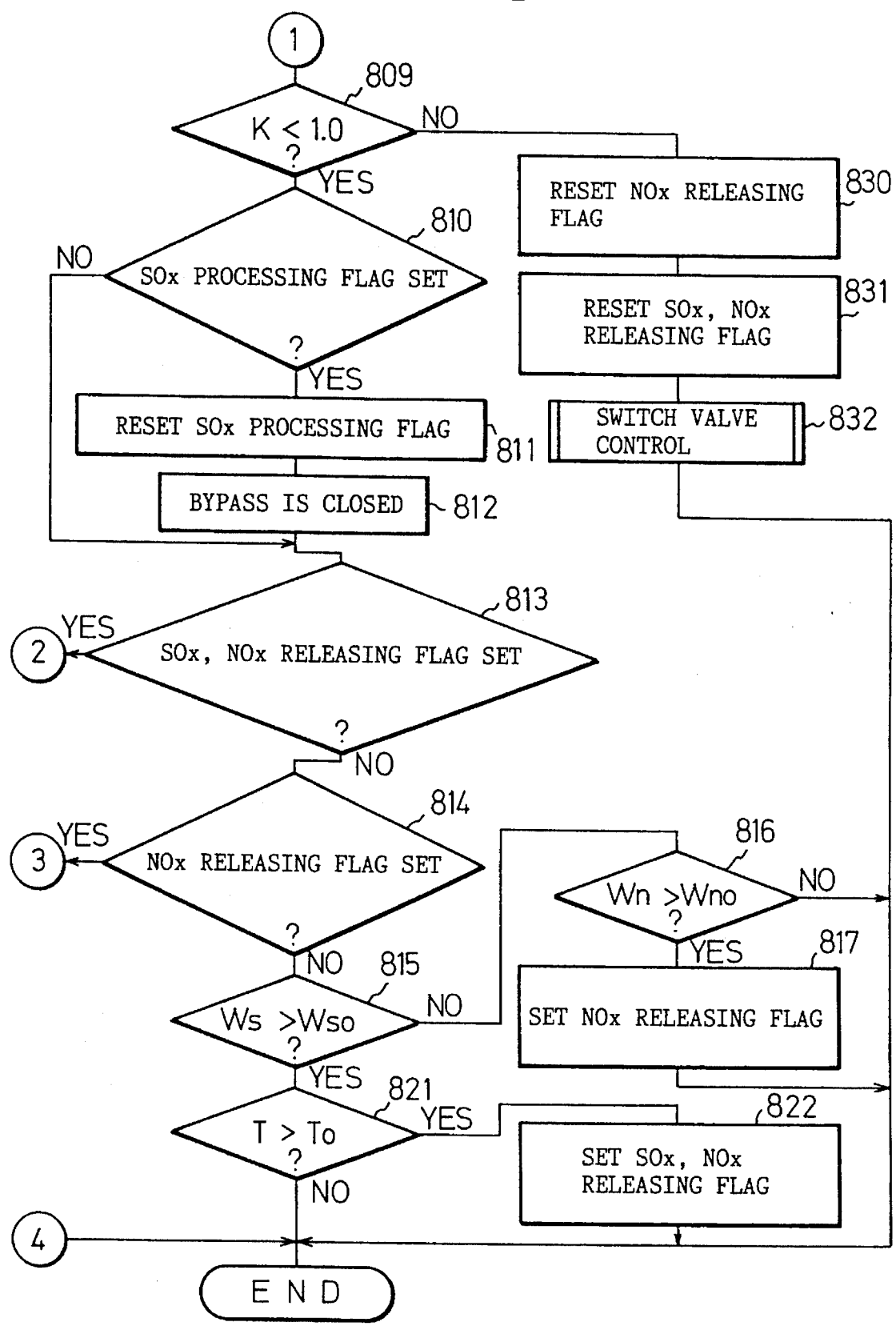
Figure 37C:
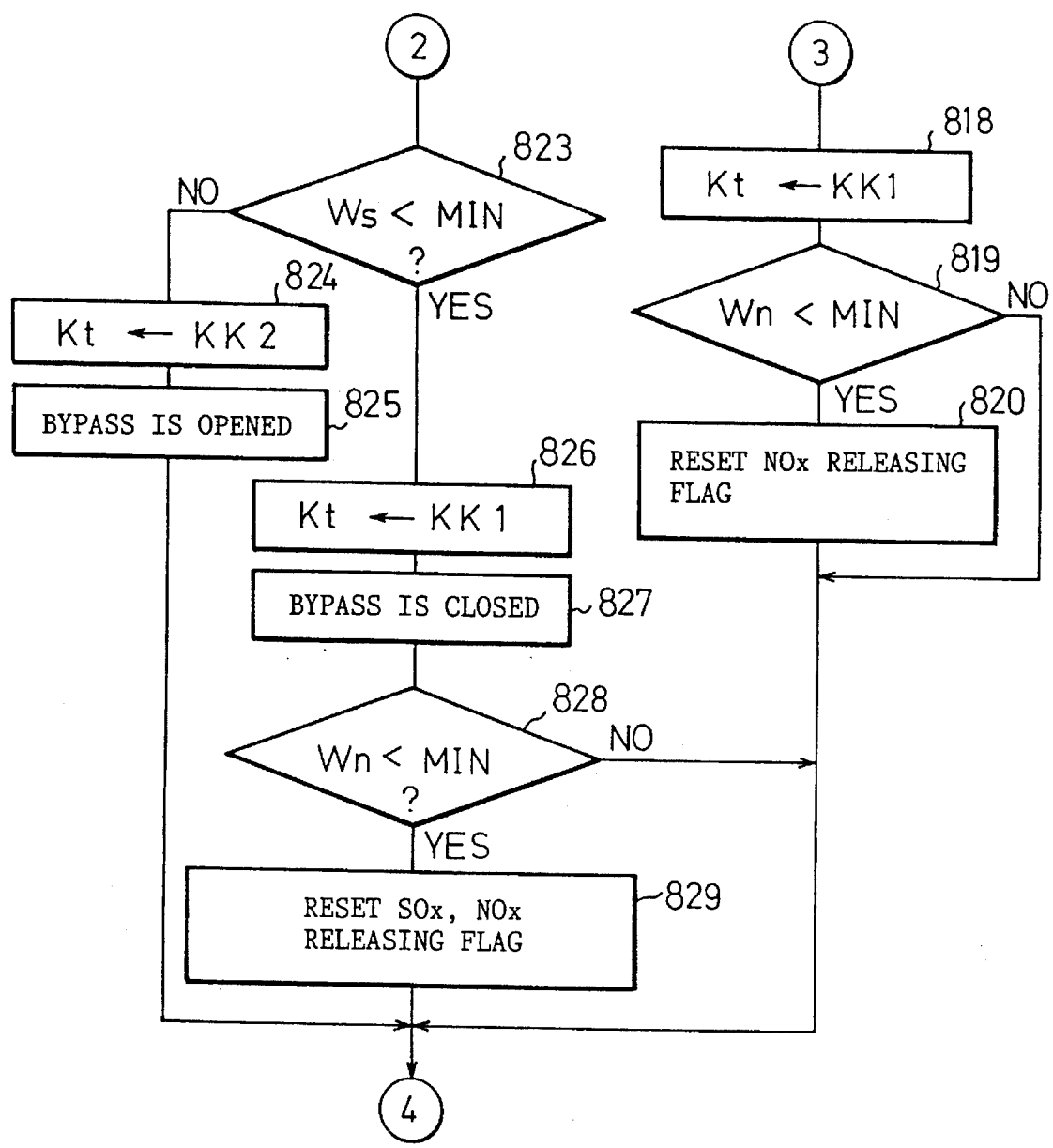
Figure 37D:
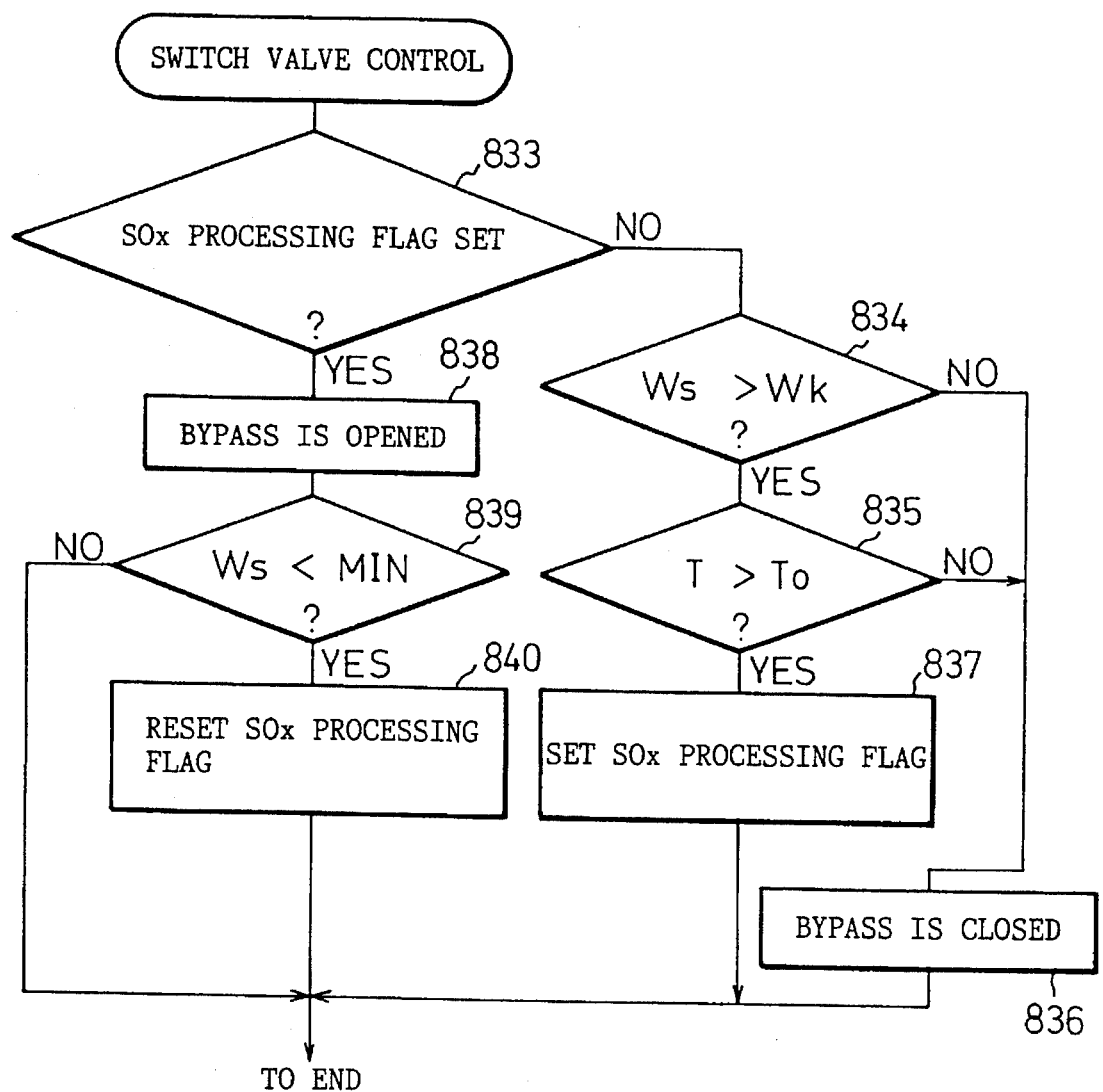

FIGS. 37A to 37D show the flag switch valve control routine for executing the $NO_x$ and $SO_x$ releasing control shown in FIG. 30, which routine is executed by interruption at every predetermined time interval. Note that, in this embodiment, the flow chart part shown in FIG. 37A, FIG. 37B, and FIG. 37D is substantially the same as the flow chart part shown in FIG. 32A, FIG. 32B, and FIG. 32D, and the part which is basically different from them is only the flow chart part shown in FIG. 37C.

Namely, referring to FIGS. 37A to 37D, first of all, at step 800, it is determined whether or not the correction coefficient Kt with respect to the basic fuel injection time TP is smaller than 1.0. When Kt<1.0, that is, when the lean air-fuel mixture is fed into the combustion chamber 3, the processing routine goes to step 801, at which the $NO_x$ amount Wn (=Wn+$K_1$·N·PM) is calculated, and then the processing routine goes to step 802, at which the $SO_x$ amount Ws (=Ws+K2·N·PM) is calculated. Here, N indicates the engine rotational speed, P indicates the absolute pressure in the surge tank 10, and $K_1$ and $K_2$ indicate constants ($K_1$>$K_2$). Then, the processing routine goes to step 809.

On the other hand, when it is determined at step 800 that Kt≧1.0, that is, when the air-fuel ratio of the air-fuel mixture fed into the combustion chamber 3 is the stoichiometric air-fuel ratio or rich, the processing routine goes to step 803, at which the $NO_x$ amount Wn (= Wn−Wn·f(T)·f(Kt)) is calculated, and then the processing routine goes to step 804, at which the $SO_x$ amount Ws (=Ws−Ws·g(T)·g(Kt)) is calculated. Here, f(T) and g(T) indicate the $NO_x$ releasing rate and $SO_x$ releasing rate shown in FIG. 26A, respectively, and f(Kt) and g(Kt) indicate the $NO_x$ releasing rate and $SO_x$ releasing rate shown in FIG. 26B, respectively When the $NO_x$ amount Wn is calculated at step 803, and the $SO_x$ amount Ws is calculated at step 804, the processing routine goes to step 805, at which it is determined whether or not the $NO_x$ amount Wn has become negative. When Wn<0, the processing routine goes to step 806, at which Wn is made zero, and then, the processing routine goes to step 807. At step 807, it is determined whether or not the $SO_x$ amount Ws becomes negative. When Ws<0, the processing routine goes to step 808, at which Ws is made zero, and then the processing routine goes to step 809.

At step 809, it is determined whether or not the correction coefficient K determined according to the engine operation state shown in FIG. 25 is smaller than 1.0. When K<1.0, that is, when the target air-fuel ratio determined according to the operation state of the engine is lean, the processing routine goes to step 810, at which it is determined whether or not the $SO_x$ processing flag has been set. When the $SO_x$ processing flag has not been set, the routine jumps to step 813, at which it is determined whether or not the $SO_x$ and $NO_x$ releasing flag has been set. When the $SO_x$ and $NO_x$ releasing flag has not been set, the processing routine goes to step 814, at which it is determined whether or not the $NO_x$ releasing flag has been set. When the $NO_x$ releasing flag has not been set, the processing routine goes to step 815.

At step 815, it is determined whether or not the $SO_x$ amount Ws has become larger than the maximum allowable value Wso (FIG. 31). When Ws≦Wso, the processing routine goes to step 816, at which it is determined whether or not the $NO_x$ amount Wn has become larger than the maximum allowable value Wno. When Wn≦Wno, the processing cycle is completed. At this time, the lean air-fuel mixture is fed into the combustion chamber 3, and the switch valve 27 is held at the bypass closed position.

On the other hand, when it is determined at step 816 that the Wn becomes larger than Wno, the processing routine goes to step 817, at which the $NO_x$ releasing flag is set, and then the processing cycle is completed. In the next processing cycle, it is determined at step 814 that the $NO_x$ releasing flag has been set, and therefore the processing routine goes to step 818, at which the correction coefficient Kt is made KK1. The value of this KK1 is a value of about 1.1 to 1.2 with which the air-fuel ratio of the air-fuel mixture fed into the combustion chamber 3 becomes about 12.0 to 13.5. When Kt is made KK1, the air-fuel ratio of the air-fuel mixture fed into the combustion chamber 3 is made rich. Subsequently, at step 819, it is determined whether or not the $NO_x$ amount Wn has become smaller than the lower limit value MIN (FIG. 31), and when Wn≧MIN, the processing cycle is completed. Contrary to this, when Wn becomes smaller than MIN, the processing routine goes to step 820, at which the $NO_x$ releasing flag is set. When the $NO_x$ releasing flag is reset, the air-fuel ratio of the air-fuel mixture fed into the combustion chamber 3 is switched from rich to lean. Accordingly, during a period from when Wn becomes larger than Wno to when Wn becomes smaller than MIN, the air-fuel ratio of the air-fuel mixture fed into the combustion chamber 3 is made rich, and during this time, the $NO_x$ is released from the $NO_x$ absorbent 19.

On the other hand, when it is decided at step 815 that the $SO_x$ amount Ws has become larger than the maximum allowable value Wso, the processing routine goes to step 821, at which it is determined whether or not the temperature T of exhaust gas flowing into the $SO_x$ absorbent 18 is higher than the set value To (FIG. 26A). When T≦To, the processing cycle is completed. Contrary to this, when T>To, the processing routine goes to step 822, at which the $SO_x$ and $NO_x$ releasing flag is set and then the processing cycle is completed.

In the next processing cycle, it is decided at step 813 that the $SO_x$ and $NO_x$ releasing flag has been set, and therefore the processing routine goes to step 823, at which it is determined whether or not the $SO_x$ amount Ws has become smaller than the lower limit value MIN. When Ws>MIN, the processing routine goes to step 824, at which the correction coefficient Kt is made KK2. The value of this KK2 is a value of about 1.1 to 1.2 with which the air-fuel ratio of the air-fuel mixture fed into the engine combustion chamber 3 becomes about 12.0 to 13.5. It is also possible to make the value of this KK2 different from the value of KK1, or make this the same value as the value of KK1. When the correction coefficient Kt is made KK2, the air-fuel ratio of the air-fuel mixture fed into the combustion chamber 3 is made rich. Subsequently, at step 825, the switch valve 27 is switched to the bypass opening position. Subsequently, the processing cycle is completed. Accordingly, if T>To when Ws becomes larger than Wso, the air-fuel ratio of the air-fuel mixture fed into the combustion chamber 3 is made rich from when Ws becomes larger than Wso to when Ws becomes smaller than MIN and, at the same time, the switch valve 27 is held at the bypass closed position. Thus, during this term, the $SO_x$ is released from the $SO_x$ absorbent 18, and the released $SO_x$ is fed into the bypass passage 24.

On the other hand, when it is determined at step 823 that Ws becomes smaller than MIN, the processing routine goes to step 826, at which the correction coefficient Kt is made KK1, and then the processing routine goes to step 827, at which the switch valve 27 is switched to the bypass closed position. Subsequently, at step 828, it is determined whether or not the $NO_x$ amount Wn becomes smaller than the lower limit value MIN, and when Wn≧MIN, the processing cycle is completed. Contrary to this, when Wn becomes smaller than MIN, the processing routine goes to step 829, at which the $SO_x$ and $NO_x$ releasing flag is reset, and then the processing cycle is completed. Accordingly, when Ws becomes smaller than MIN, the air-fuel ratio of the air-fuel mixture fed into the combustion chamber 3 is made rich (Kt=KK1) until when Wn becomes smaller than MIN, and the switch valve 27 is held at the bypass closed position. Accordingly, this means that $NO_x$ is released from the $NO_x$ absorbent 19 during this time.

On the other hand, when it is determined at step 809 that K≧1.0, that is, when the target air-fuel ratio of the air-fuel mixture which should be fed into the combustion chamber 3 becomes the stoichiometric air-fuel ratio or rich, the processing routine goes to step 830, at which the $NO_x$ releasing flag is reset, and then the processing routine goes to step 831, at which the $SO_x$ and $NO_x$ releasing flag is reset. Subsequently, at step 832, the switch valve control shown in FIG. 37D is carried out. In this switch valve control, as shown in FIG. 37D, first of all, at step 833, it is determined whether or not the $SO_x$ processing flag has been set. When the $SO_x$ processing flag has not been set, the processing routine goes to step 834, at which it is determined whether or not the $SO_x$ amount Ws is larger than the set up value Wk (MIN<Wk<Wso). When Ws≦Wk, the processing routine goes to step 836, at which the switch valve 27 is made the bypass closed position. When Ws≦Wk, even if the $SO_x$ is released from the $SO_x$ absorbent 18, the amount of the released $SO_x$ is small, and therefore the switch valve 27 is made the bypass closed position.

Contrary to this, when Ws>Wk, the processing routine goes to step 835, at which it is determined whether or not the temperature T of exhaust gas flowing into the $SO_x$ absorbent 18 is higher than the set value To (FIG. 26A). When T≦To, the processing routine goes to step 836. Namely, when T≦To, almost no $SO_x$ is released from the $SO_x$ absorbent 18, and therefore switch valve 27 is made the bypass closed position. Note that, the $NO_x$ is released from the $NO_x$ absorbent 19 when the switch valve 27 is held at the bypass closed position.

On the other hand, when it is decided at step 835 that T>To, the processing routine goes to step 837, at which the $SO_x$ processing flag is set. When the $SO_x$ processing flag is set, the processing routine goes from step 833 to step 838, at which the switch valve 27 is switched to the bypass opening position. Namely, when Ws>Wk and T>To, a certain amount of the $SO_x$ is released from the $SO_x$ absorbent 18, and therefore the switch valve 27 is made the bypass opening position so as to feed the released $SO_x$ into the bypass passage 24. Subsequently, at step 839, it is determined whether or not the amount Ws of $SO_x$ becomes smaller than the lower limit value MIN. When Ws becomes smaller than MIN, the processing routine goes to step 840, at which the $SO_x$ processing flag is reset. When the $SO_x$ processing flag is reset, in the next processing cycle, the processing routine goes from step 833 to step 834, since it is determined that Ws is equal to or smaller than Wk at this time, and therefore the processing routine goes to step 836, at which the switch valve 27 is switched to the bypass closed position.

On the other hand, where the $SO_x$ flag has been set when the operation state is changed from the state where K≧1.0 to the state where K<1.0, the processing routine goes from step 810 to step 811, at which the $SO_x$ processing flag is reset. Subsequently, at step 812, the switch valve 27 is switched to the bypass closed position.

Figure 38:
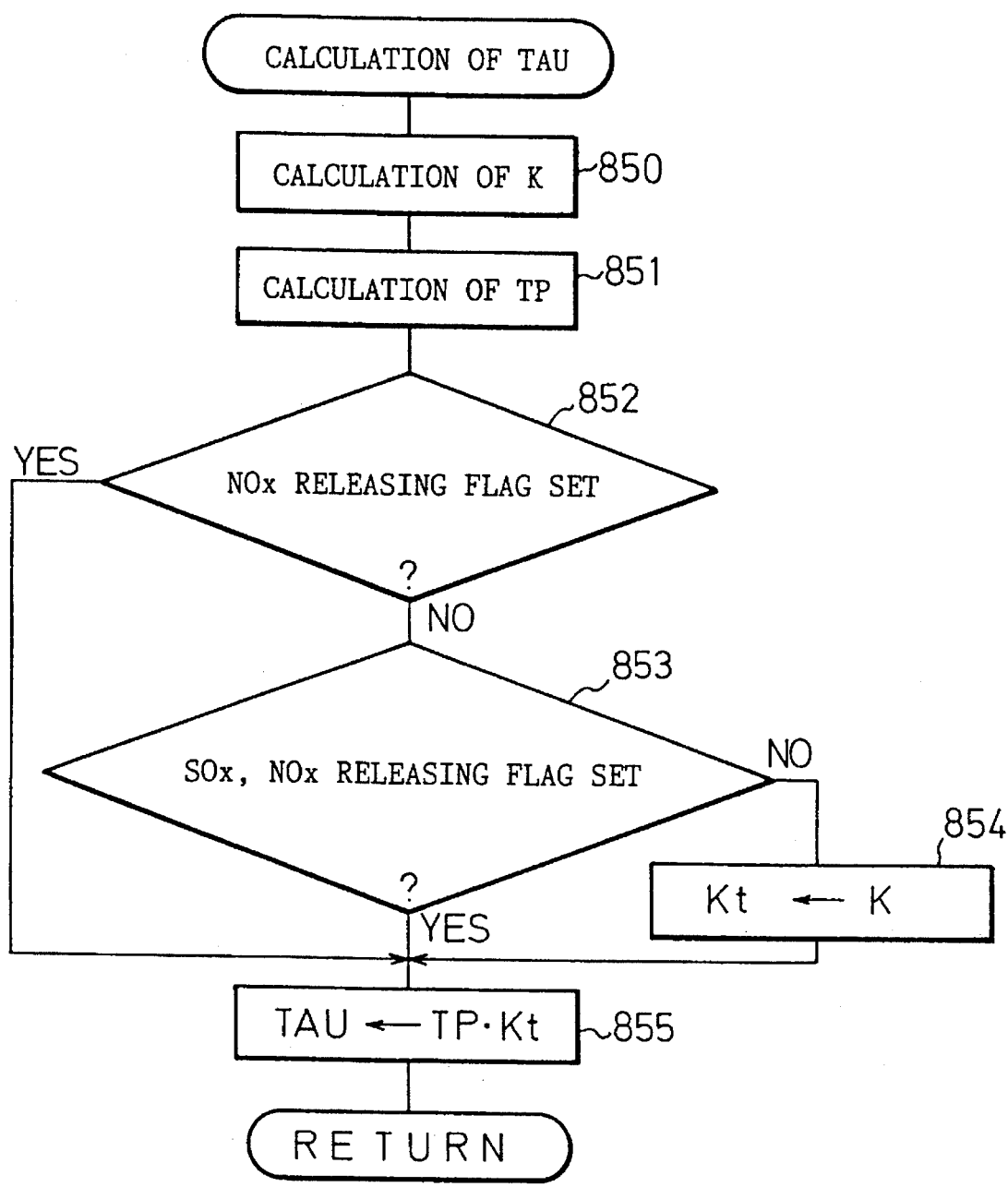
FIG. 38 is a flow chart for calculating the fuel injection time TAU.

FIG. 38 shows the calculation routine of the fuel injection time TAU, which routine is exactly the same as the routine shown in FIG. 36.

Namely, referring to FIG. 38, first of all, at step 850, the correction coefficient K determined in accordance with the engine operation state shown in FIG. 25 is calculated. Subsequently, at step 851, the basic fuel injection time TP is calculated from the map shown in FIG. 2. Subsequently, at step 852, it is determined whether or not the $NO_x$ releasing flag has been set, and when the $NO_x$ releasing flag has not been set, the processing routine goes to step 853, at which it is determined whether or not the $SO_x$ and $NO_x$ releasing flag has been set. When the $SO_x$ and $NO_x$ releasing flag has not been set, the processing routine goes to step 854, at which the correction coefficient K is made Kt, and then at step 855, the fuel injection time TAU (=TP·Kt) is calculated by multiplying the basic fuel injection time TP by Kt. Accordingly, when the $NO_x$ releasing flag and the $SO_x$ and $NO_x$ releasing flag have not been set, the air-fuel ratio of the air-fuel mixture fed into the combustion chamber 3 becomes the air-fuel ratio determined by the correction coefficient K.

Contrary to this, when the $NO_x$ releasing flag is set, the processing routine jumps to step 855, and when the $SO_x$ and $NO_x$ releasing flag is set, the processing routine goes to step 855. When the $NO_x$ releasing flag is set, in the routine shown in FIGS. 37A to 37D, Kt is made equal to KK1 (KK1>1.0), and therefore the air-fuel ratio of the air-fuel mixture fed into the combustion chamber 3 is made rich, while when the $SO_x$ and $NO_x$ releasing flag is set, in the routine shown in FIGS. 37A to 37D, Kt is made equal to KK2 (KK2>1.0), and then Kt is made equal to KK1 (KK1>1.0), and therefore the air-fuel ratio of the air-fuel mixture fed into the combustion chamber 3 is made rich.

Figure 39A:
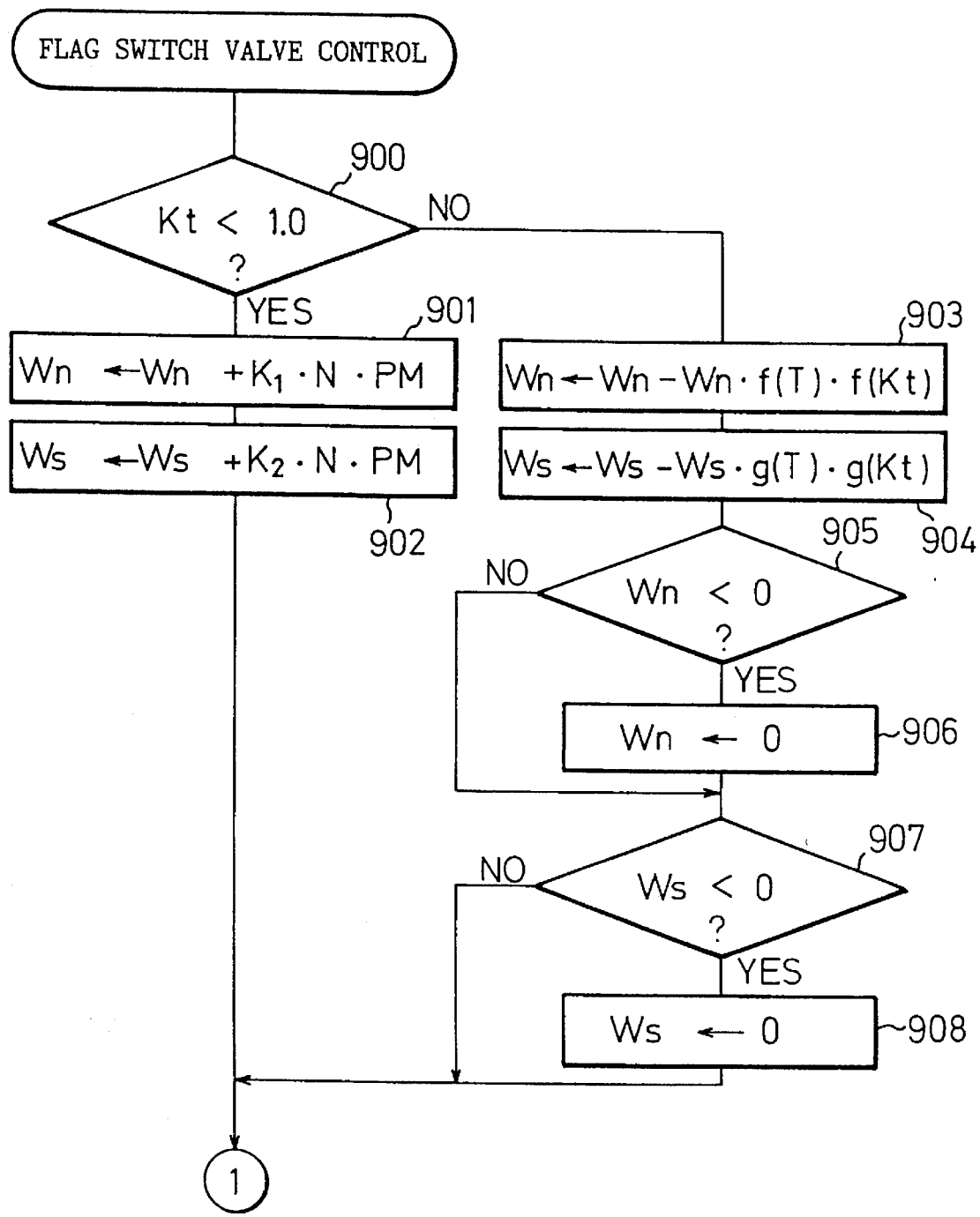
FIGS. 39A to 39E are flow charts of the flag switch valve control.
Figure 39B:
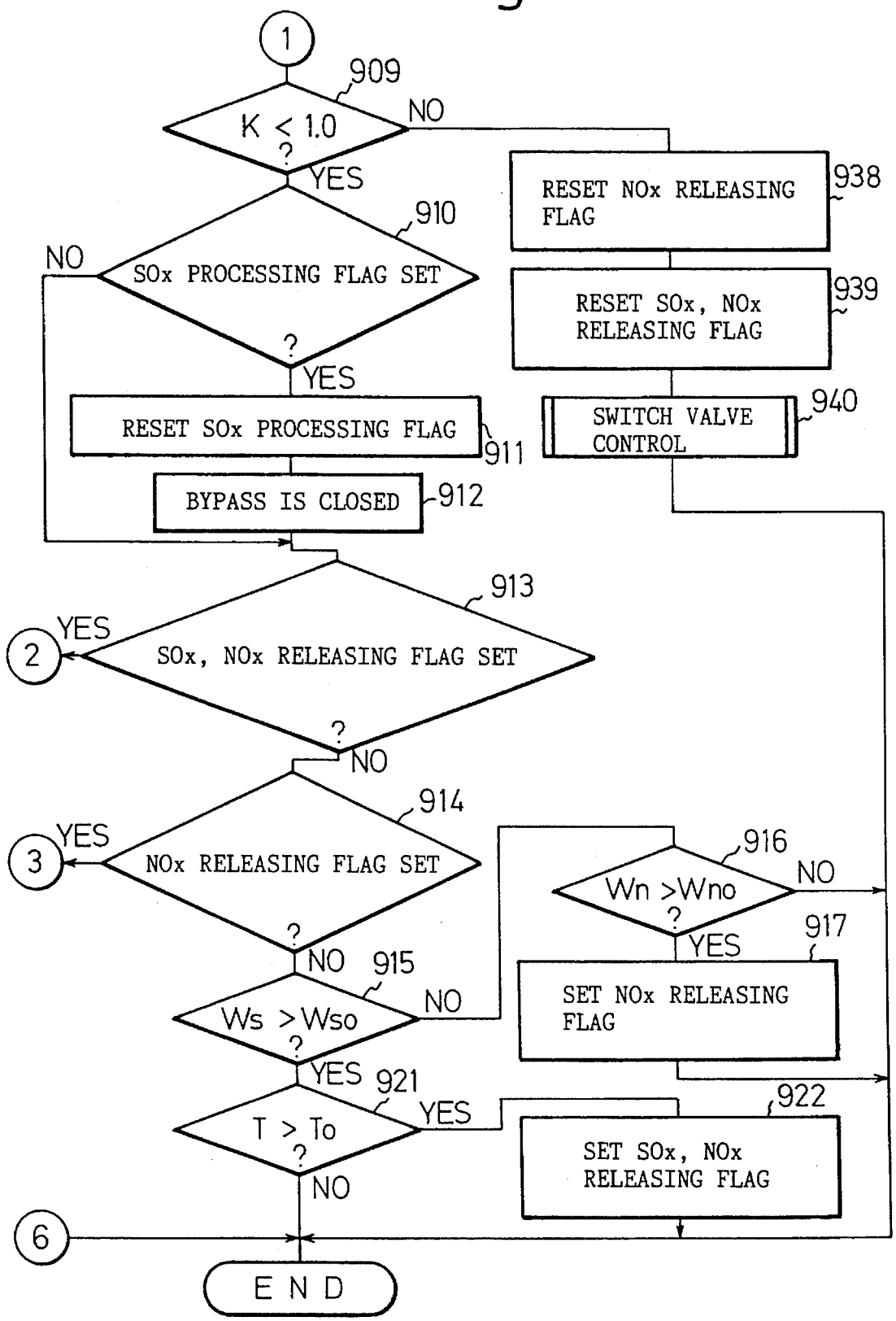
Figure 39C:
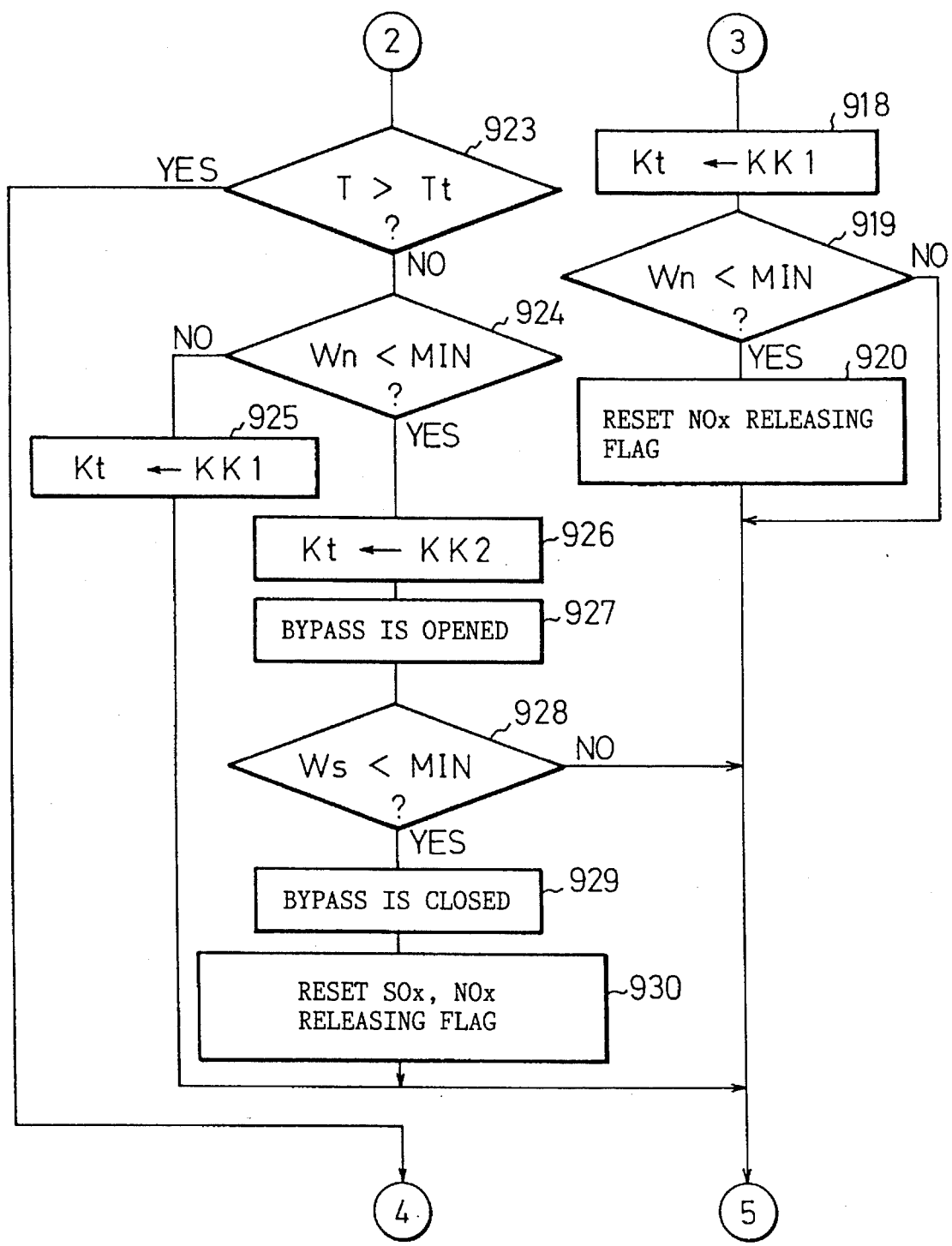
Figure 39D:
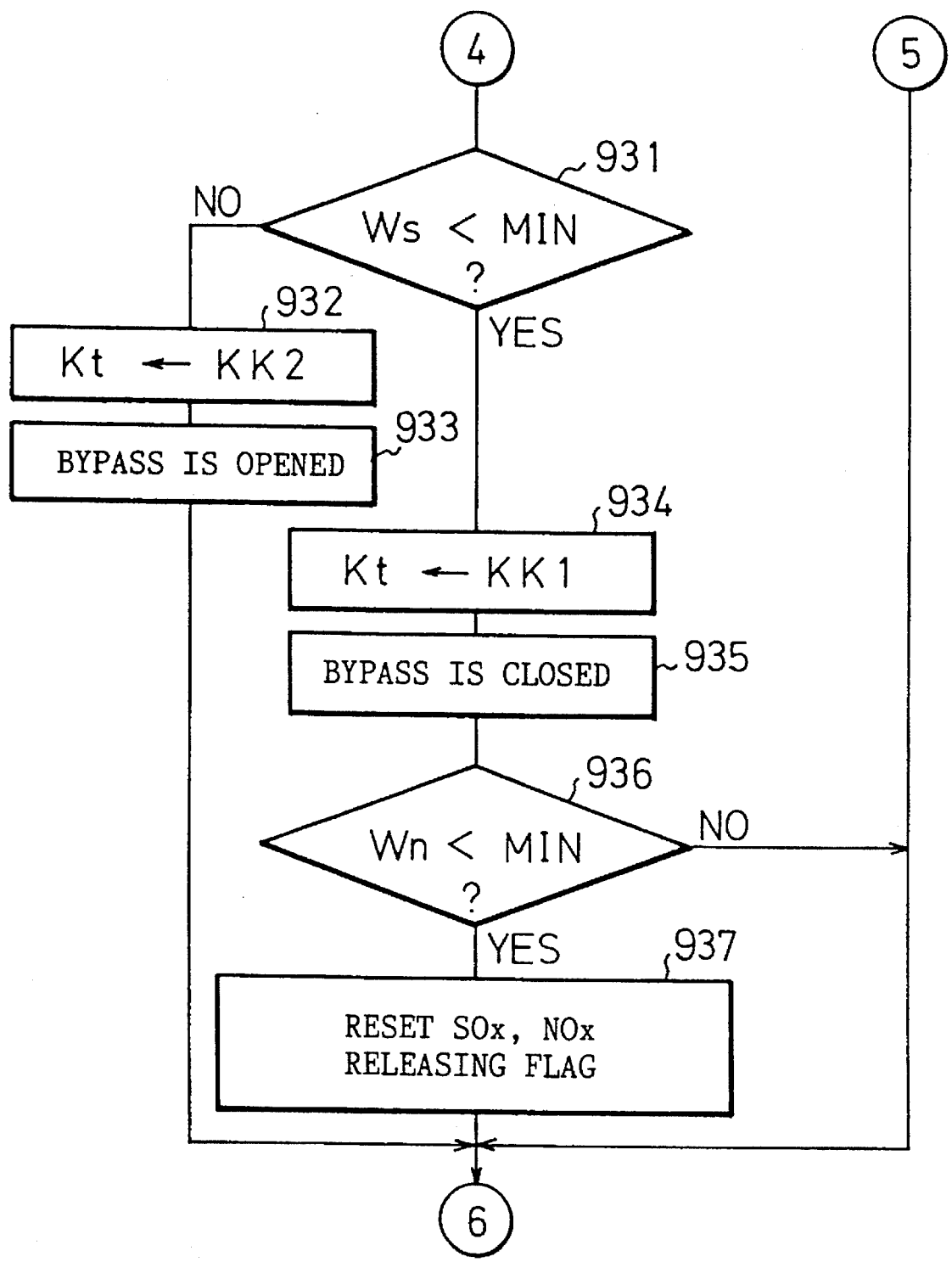
Figure 39E:
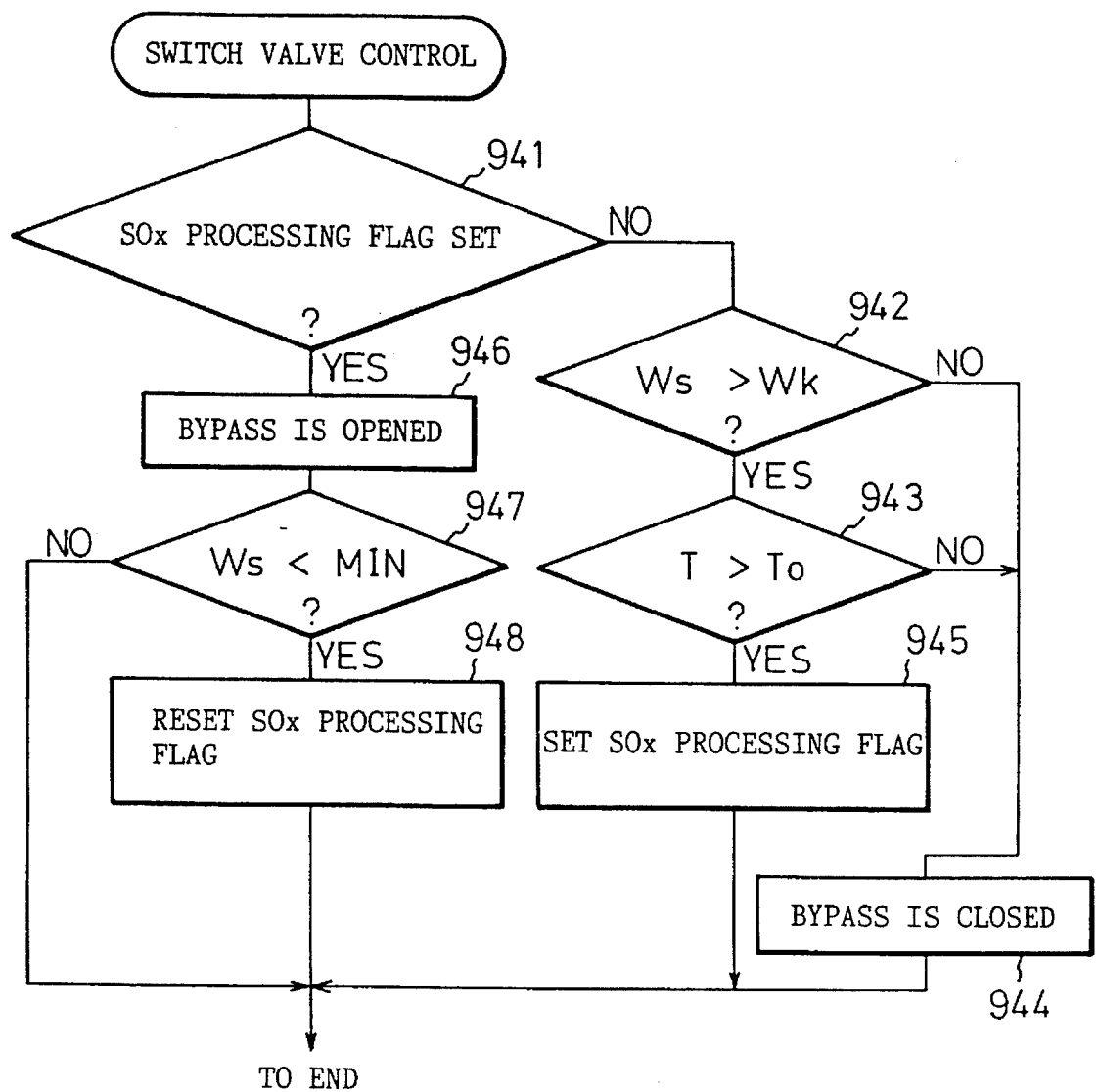

FIGS. 39A to 39E show the flag switch valve control routine for performing the $NO_x$ and $SO_x$ releasing control shown in FIG. 29 when the exhaust gas temperature T is lower than the set up temperature Tt, while performing the $NO_x$ and $SO_x$ releasing control shown in FIG. 30 when the exhaust gas temperature T becomes higher than the set temperature Tt, which routine is executed by interruption at every predetermined time interval. Note that, in this embodiment, the flow chart part shown in FIG. 39A, FIG. 39B, and FIG. 39E is substantially the same as the flow chart part shown in FIG. 32A, FIG. 32B, and FIG. 32D, and the part which is basically different from them is only a flow chart part shown in FIG. 39C and FIG. 39D.

Namely, referring to FIGS. 39A to 39E, first of all, at step 900, it is determined whether or not the correction coefficient Kt with respect to the basic fuel injection time TP is smaller than 1.0. When Kt<1.0, that is, when the lean air-fuel mixture is fed into the combustion chamber 3, the processing routine goes to step 901, at which the $NO_x$ amount Wn (=Wn+$K_1$·N·PM) is calculated, and then the processing routine goes to step 902, at which the $SO_x$ amount Ws (=Ws+K2·N·PM) is calculated. Here, N indicates the engine rotational speed, P indicates the absolute pressure in the surge tank 10, and $K_1$ and $K_2$ indicate constants ($K_1$>$K_2$). Then, the processing routine goes to step 909.

On the other hand, when it is determined at step 900 that Kt≧1.0, that is, when the air-fuel ratio of the air-fuel mixture fed into the combustion chamber 3 is the stoichiometric air-fuel ratio or rich, the processing routine goes to step 903, at which the $NO_x$ amount Wn (= Wn−Wn·f(T)·f(Kt)) is calculated, and then the processing routine goes to step 904, at which the $SO_x$ amount Ws (=Ws−Ws·g(T)·g (Kt)) is calculated. Here, f(T) and g(T) indicate the $NO_x$ releasing rate and $SO_x$ releasing rate shown in FIG. 26A, respectively, and f(Kt) and g(Kt) indicate the $NO_x$ releasing rate and $SO_x$ releasing rate shown in FIG. 26B, respectively When the $NO_x$ amount Wn is calculated at step 903, and the $SO_x$ amount Ws is calculated at step 904, the processing routine goes to step 905, at which it is determined whether or not the $NO_x$ amount Wn has become negative. When Wn<0, the processing routine goes to step 906, at which Wn is made zero, and then, the processing routine goes to step 907. At step 907, it is determined whether or not the $SO_x$ amount Ws becomes negative. When Ws<0, the processing routine goes to step 908, at which Ws is made zero, and then the processing routine goes to step 909.

At step 909, it is determined whether or not the correction coefficient K determined according to the engine operation state shown in FIG. 25 is smaller than 1.0. When K<1.0, that is, when the target air-fuel ratio determined according to the operation state of the engine is lean, the processing routine goes to step 910, at which it is determined whether or not the $SO_x$ processing has been set. When the $SO_x$ processing flag has not been set, the routine jumps to step 913, at which it is determined whether or not the $SO_x$ and $NO_x$ releasing flag has been set. When the $SO_x$ and $NO_x$ releasing flag has not been set, the processing routine goes to step 914, at which it is determined whether or not the $NO_x$ releasing flag has been set. When the $NO_x$ releasing flag has not been set, the processing routine goes to step 915.

At step 915, it is determined whether or not the $SO_x$ amount Ws has become larger than the maximum allowable value Wso (FIG. 31). When Ws≦Wso, the processing routine goes to step 916, at which it is determined whether or not the $NO_x$ amount Wn has become larger than the maximum allowable value Wno. When Wn≦Wno, the processing cycle is completed. At this time, the lean air-fuel mixture is fed into the combustion chamber 3, and the switch valve 27 is held at the bypass closed position.

On the other hand, when it is determined at step 916 that the Wn becomes larger than Wno, the processing routine goes to step 917, at which the $NO_x$ releasing flag is set, and then the processing cycle is completed. In the next processing cycle, it is determined at step 914 that the $NO_x$ releasing flag has been set, and therefore the processing routine goes to step 918, at which the correction coefficient Kt is made KK1. The value of this KK1 is a value of about 1.1 to 1.2 with which the air-fuel ratio of the air-fuel mixture fed into the combustion chamber 3 becomes about 12.0 to 13.5. When Kt is made KK1, the air-fuel ratio of the air-fuel mixture fed into the combustion chamber 3 is made rich. Subsequently, at step 919, it is determined whether or not the $NO_x$ amount Wn has become smaller than the lower limit value MIN (FIG. 31), and when Wn≧MIN, the processing cycle is completed. Contrary to this, when Wn becomes smaller than MIN, the processing routine goes to step 920, at which the $NO_x$ releasing flag is set. When the $NO_x$ releasing flag is reset, the air-fuel ratio of the air-fuel mixture fed into the combustion chamber 3 is switched from rich to lean. Accordingly, during a period from when Wn becomes larger than Wno to when Wn becomes smaller than MIN, the air-fuel ratio of the air-fuel mixture fed into the combustion chamber 3 is made rich, and during this time, the $NO_x$ is released from the $NO_x$ absorbent 19.

On the other hand, when it is decided at step 915 that the $SO_x$ amount Ws has become larger than the maximum allowable value Wso, the processing routine goes to step 921, at which it is determined whether or not the temperature T of exhaust gas flowing into the $SO_x$ absorbent 18 is higher than the set value To (FIG. 26A). When T≦To, the processing cycle is completed. Contrary to this, when T>To, the processing routine goes to step 922, at which the $SO_x$ and $NO_x$ releasing flag is set and then the processing cycle is completed.

In the next processing cycle, it is decided at step 913 that the $SO_x$ and $NO_x$ releasing flag has been set, and therefore the processing routine goes to step 923, at which it is determined whether or not the exhaust gas temperature T is higher than the set up temperature Tt (Tt>To). When T≦Tt, the processing routine goes to step 924, at which it is determined whether or not the $NO_x$ amount Wn becomes smaller than the lower limit value MIN. When Wn>MIN, the processing routine goes to step 925, at which the correction coefficient Kt is made KK1, and then the processing cycle is completed. Accordingly, when To<T≦Tt, if Ws becomes larger than Wso, the air-fuel ratio of the air-fuel mixture fed into the combustion chamber 3 is made rich (Kt=KK1) until Wn becomes smaller than MIN, and the switch valve 27 is held the bypass closed position. Accordingly, during this time, the $NO_x$ will be released from the $NO_x$ absorbent 19.

On the other hand, when it is decided at step 924 that Wn becomes smaller than MIN, the processing routine goes to step 926, at which the correction coefficient Kt is made KK2. The value of this KK2 is a value of about 1.1 to 1.2 with which the air-fuel ratio of the air-fuel mixture fed into the combustion chamber 3 becomes about 12.0 to 13.5. It is also possible to make the value of this KK2 different from the value of KK1, or make this the same value as the value of KK1. When the correction coefficient Kt is made KK2, the air-fuel ratio of the air-fuel mixture fed into the combustion chamber 3 is made rich. Subsequently, at step 927, the switch valve 27 is switched to the bypass opening position. Thus, the exhaust gas flowing out of the $SO_x$ absorbent 18 is fed into the bypass passage 24.

Subsequently, at step 928, it is determined whether or not the $SO_x$ amount Ws becomes smaller than the lower limit value MIN, and when Ws≧MIN, the processing cycle is completed. Contrary to this, when Ws becomes smaller than MIN, the processing routine goes to step 929, at which the switch valve 27 is switched to the bypass closed position, and then the processing routine goes to step 930, at which the $SO_x$ and $NO_x$ releasing flag is reset. When the $SO_x$ and $NO_x$ releasing flag is reset, the air-fuel ratio of the air-fuel mixture fed into the combustion chamber 3 is switched from rich to lean. Accordingly, if Tt≧T>To when Ws becomes larger than Wno, the air-fuel ratio of the air-fuel mixture fed into the combustion chamber 3 is made rich (K=KK2) from when Wn becomes smaller than MIN to when Ws becomes smaller than MIN and, at the same time, the switch valve 27 is made the bypass opening position. Thus, during this time, the $SO_x$ is released from the $SO_x$ absorbent 18, and the released $SO_x$ is fed into the bypass passage 24.

On the other hand, when it is determined at step 923 that T>Tt, the processing routine goes to step 931, at which it is determined whether or not the $SO_x$ amount Ws has become smaller than the lower limit value MIN. When Ws>MIN, the processing routine goes to step 932, at which the correction coefficient Kt is made KK2. When the correction coefficient Kt is made KK2, the air-fuel ratio of the air-fuel mixture fed into the combustion chamber 3 is made rich. Subsequently, at step 933, the switch valve 27 is switched to the bypass opening position. Subsequently, the processing cycle is completed. Accordingly, if T>Tt when Ws becomes larger than Wso, the air-fuel ratio of the air-fuel mixture fed into the combustion chamber 3 is made rich from when Ws becomes larger than Wso to when Ws becomes smaller than MIN and, at the same time, the switch valve 27 is held at the bypass closed position. Thus, during this term, the $SO_x$ is released from the $SO_x$ absorbent 18, and the released $SO_x$ is fed into the bypass passage 24.

On the other hand, when it is determined at step 931 that Ws becomes smaller than MIN, the processing routine goes to step 934, at which the correction coefficient Kt is made KK1, and then the processing routine goes to step 935, at which the switch valve 27 is switched to the bypass closed position. Subsequently, at step 936, it is determined whether or not the $NO_x$ amount Wn becomes smaller than the lower limit value MIN, and when Wn≧MIN, the processing cycle is completed. Contrary to this, when Wn becomes smaller than MIN, the processing routine goes to step 937, at which the $SO_x$ and $NO_x$ releasing flag is reset, and then the processing cycle is completed. Accordingly, when Ws becomes smaller than MIN, the air-fuel ratio of the air-fuel mixture fed into the combustion chamber 3 is made rich (Kt=KK1) until when Wn becomes smaller than MIN, and the switch valve 27 is held at the bypass closed position. Accordingly, this means that $NO_x$ is released from the $NO_x$ absorbent 19 during this time.

On the other hand, when it is determined at step 909 that K≧1.0, that is, when the target air-fuel ratio of the air-fuel mixture which should be fed into the combustion chamber 3 becomes the stoichiometric air-fuel ratio or rich, the processing routine goes to step 938, at which the $NO_x$ releasing flag is reset, and then the processing routine goes to step 939, at which the $SO_x$ and $NO_x$ releasing flag is reset. Subsequently, at step 940, the switch valve control shown in FIG. 39E is carried out. In this switch valve control, as shown in FIG. 39E, first of all, at step 941, it is determined whether or not the $SO_x$ processing flag has been set. When the $SO_x$ processing flag has not been set, the processing routine goes to step 942, at which it is determined whether or not the $SO_x$ amount Ws is larger than the set value Wk (MIN<Wk<Wso). When Ws≦Wk, the processing routine goes to step 944, at which the switch valve 27 is made the bypass closed position. When Ws≦Wk, even if the $SO_x$ is released from the $SO_x$ absorbent 18, the amount of the released $SO_x$ is small, and therefore the switch valve 27 is made the bypass closed position.

Contrary to this, when Ws>Wk, the processing routine goes to step 943, at which it is determined whether or not the temperature T of exhaust gas flowing into the $SO_x$ absorbent 18 is higher than the set value To (FIG. 26A). When T≦To, the processing routine goes to step 944. Namely, when T≦To, almost no $SO_x$ is released from the $SO_x$ absorbent 18, and therefore switch valve 27 is made the bypass closed position. Note that, the $NO_x$ is released from the $NO_x$ absorbent 19 when the switch valve 27 is held at the bypass closed position.

On the other hand, when it is decided at step 943 that T>To, the processing routine goes to step 945, at which the $SO_x$ processing flag is set. When the $SO_x$ processing flag is set, the processing routine goes from step 941 to step 946, at which the switch valve 27 is switched to the bypass opening position. Namely, when Ws>Wk and T>To, a certain amount of the $SO_x$ is released from the $SO_x$ absorbent 18, and therefore the switch valve 27 is made the bypass opening position so as to feed the released $SO_x$ into the bypass passage 24. Subsequently, at step 947, it is determined whether or not the amount Ws of $SO_x$ becomes smaller than the lower limit value MIN. When Ws becomes smaller than MIN, the processing routine goes to step 948, at which the $SO_x$ processing flag is reset. When the $SO_x$ processing flag is reset, in the next processing cycle, the processing routine goes from step 941 to step 942, since it is determined that Ws is equal to or smaller than Wk at this time, and therefore the processing routine goes to step 944, at which the switch valve 27 is switched to the bypass closed position.

On the other hand, where the $SO_x$ flag has been set when the operation state is changed from the state where K≦1.0 to the state where K<1.0, the processing routine goes from step 910 to step 911, at which the $SO_x$ processing flag is reset. Subsequently, at step 912, the switch valve 27 is switched to the bypass closed position.

Figure 40:
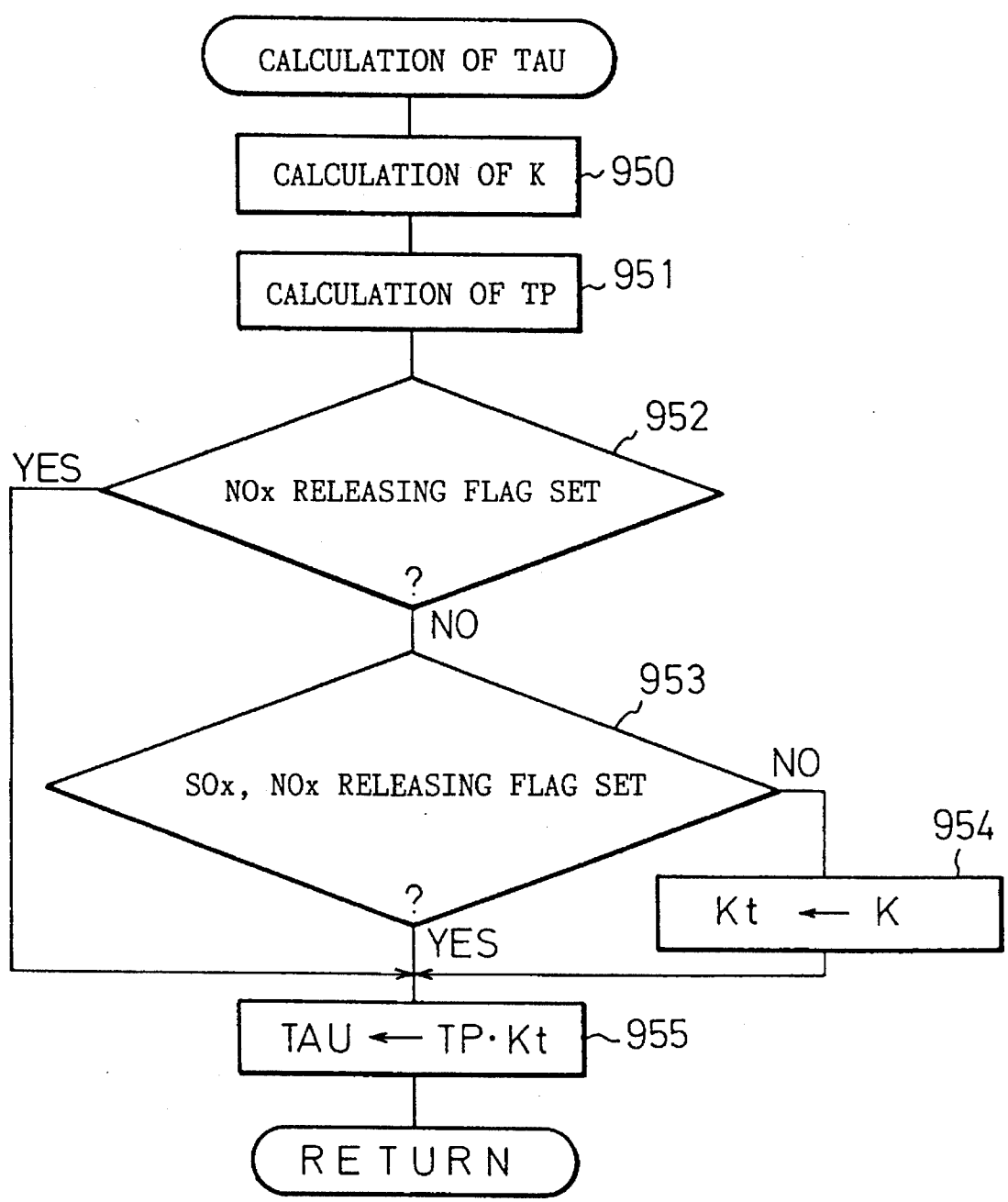
FIG. 40 is a flow chart for calculating the fuel injection time TAU.

FIG. 40 shows the calculation routine of the fuel injection time TAU, which routine is exactly the same as the routine shown in FIG. 36.

Namely, referring to FIG. 40, first of all, at step 950, the correction coefficient K determined in accordance with the engine operation state shown in FIG. 25 is calculated. Subsequently, at step 951, the basic fuel injection time TP is calculated from the map shown in FIG. 2. Subsequently, at step 952, it is determined whether or not the $NO_x$ releasing flag has been set, and when the $NO_x$ releasing flag has not been set, the processing routine goes to step 953, at which it is determined whether or not the $SO_x$ and $NO_x$ releasing flag has been set. When the $SO_x$ and $NO_x$ releasing flag has not been set, the processing routine goes to step 954, at which the correction coefficient K is made Kt, and then at step 955, the fuel injection time TAU (=TP·Kt) is calculated by multiplying the basic fuel injection time TP by Kt. Accordingly, when the $NO_x$ releasing flag and the $SO_x$ and $NO_x$ releasing flag have not been set, the air-fuel ratio of the air-fuel mixture fed into the combustion chamber 3 becomes the air-fuel ratio determined by the correction coefficient K.

Contrary to this, when the $NO_x$ releasing flag is set, the processing routine jumps to step 955, and when the $SO_x$ and $NO_x$ releasing flag is set, the processing routine goes to step 955. When the $NO_x$ releasing flag is set, in the routine shown in FIGS. 39A to 39E, Kt is made equal to KK1 (KK1>1.0), and therefore the air-fuel ratio of the air-fuel mixture fed into the combustion chamber 3 is made rich, while when the $SO_x$ and $NO_x$ releasing flag is set, in the routine shown in FIGS. 39A to 39E, Kt is made equal to KK1 (KK1>1.0) or Kt is made equal to KK2 (KK2>1.0), and therefore the air-fuel ratio of the air-fuel mixture fed into the combustion chamber 3 is made rich.

We claim:

1. An exhaust purification device of an internal combustion engine provided with:

an exhaust passage;

an $NO_x$ absorbent which is arranged in said exhaust passage, absorbs the $NO_x$ when the air-fuel ratio of an inflowing exhaust gas is lean and, at the same time, releases the absorbed $NO_x$ when an oxygen concentration in the inflowing exhaust gas is lowered;

an $SO_x$ absorbent which is arranged in said exhaust passage on the upstream side of said $NO_x$ absorbent, absorbs the $SO_x$ when the air-fuel ratio of the inflowing exhaust gas is lean and, at the same time, releases the absorbed $SO_x$ when the air-fuel ratio of the inflowing exhaust gas is made rich; and an air-fuel ratio control means which controls the air-fuel ratio of the exhaust gas flowing into said $SO_x$ absorbent, usually maintains the air-fuel ratio of the exhaust gas flowing into said $SO_x$ absorbent lean, and makes the air-fuel ratio of the exhaust gas flowing into said $SO_x$ absorbent rich when the $SO_x$ should be released from said $SO_x$ absorbent.

2. An exhaust purification device of an internal combustion engine according to claim 1, wherein the $NO_x$ absorbent contains at least one member selected from alkali metals consisting of potassium, sodium, lithium, and cesium, alkali earths consisting of barium and calcium, and rare earths consisting of lanthanum and yttrium and platinum.

3. An exhaust purification device of an internal combustion engine according to claim 1, wherein the $SO_x$ absorbent contains at least one member selected from copper, iron, manganese, nickel, sodium, tin, titanium, lithium, and titania.

4. An exhaust purification device of an internal combustion engine according to claim 1, wherein the $SO_x$ absorbent contains the platinum.

5. An exhaust purification device of an internal combustion engine according to claim 1, wherein all the exhaust gas discharged from the engine flows into the $SO_x$ absorbent and the $NO_x$ absorbent.

6. An exhaust purification device of an internal combustion engine according to claim 5, wherein the $SO_x$ absorbent and the $NO_x$ absorbent are arranged in one casing.

7. An exhaust purification device of an internal combustion engine according to claim 1, wherein said air-fuel ratio control means controls the air-fuel ratio of the exhaust gas flowing into the $SO_x$ absorbent by controlling the air-fuel ratio of the air-fuel mixture burned in the engine; the $SO_x$ contained in the exhaust gas is absorbed into the $SO_x$ absorbent when the air-fuel ratio of the exhaust gas flowing into the $SO_x$ absorbent is maintained lean by maintaining the air-fuel ratio of the air-fuel mixture burned in the engine lean, while the $NO_x$ contained in the exhaust gas is absorbed into the $NO_x$ absorbent.

8. An exhaust purification device of an internal combustion engine according to claim 7, wherein said air-fuel ratio control means releases the $SO_x$ from the $SO_x$ absorbent and, at the same time, makes the air-fuel ratio of the air-fuel mixture burned in the engine rich when the $NO_x$ should be released from the $NO_x$ absorbent.

9. An exhaust purification device of an internal combustion engine according to claim 8, wherein when said air-fuel ratio control means should release the $SO_x$ from the $SO_x$ absorbent and, at the same time, release the $NO_x$ from the $NO_x$ absorbent, it first makes the air-fuel ratio of the exhaust gas flowing into the $SO_x$ absorbent and the $NO_x$ absorbent a first degree of richness determined in advance, and then maintains the same at a rich state by a second degree of richness smaller than this first degree of richness.

10. An exhaust purification device of an internal combustion engine according to claim 9, wherein said air-fuel ratio control means controls said first degree of richness and second degree of richness in accordance with a temperature representative of the temperature of the $SO_x$ absorbent.

11. An exhaust purification device of an internal combustion engine according to claim 10, wherein the temperature representing the temperature of the $SO_x$ absorbent is the temperature of the exhaust gas flowing into the $SO_x$ absorbent.

12. An exhaust purification device of an internal combustion engine according to claim 10, wherein said air-fuel ratio control means makes said first degree of richness larger as the temperature representing the temperature of the $SO_x$ absorbent becomes higher.

13. An exhaust purification device of an internal combustion engine according to claim 12, wherein said air-fuel ratio control means makes the time for which the air-fuel ratio of the exhaust gas is maintained at said first degree of richness shorter as the temperature representing the temperature of the $SO_x$ absorbent becomes higher.

14. An exhaust purification device of an internal combustion engine according to claim 10, wherein said air-fuel ratio control means makes said second degree of richness larger as the temperature representing the temperature of the $SO_x$ absorbent becomes higher.

15. An exhaust purification device of an internal combustion engine according to claim 10, wherein said air-fuel ratio control means makes the time for which the air-fuel ratio of the exhaust gas is maintained at said second degree of richness shorter as the temperature representing the temperature of the $SO_x$ absorbent becomes higher.

16. An exhaust purification device of an internal combustion engine according to claim 8, wherein said air-fuel ratio control means makes the air-fuel ratio of the air-fuel mixture rich so as to release the $NO_x$ from the $NO_x$ absorbent with a time interval shorter than the time interval at which it makes the air-fuel ratio of the air-fuel mixture rich so as to release the $SO_x$ from the $SO_x$ absorbent and release the $NO_x$ from the $NO_x$ absorbent.

17. An exhaust purification device of an internal combustion engine according to claim 16, wherein said air-fuel ratio control means first of all makes the air-fuel ratio of the exhaust gas flowing into the $SO_x$ absorbent and the $NO_x$ absorbent the predetermined degree of richness when the $NO_x$ should be released from the $NO_x$ absorbent, and then maintains the same at the stoichiometric air-fuel ratio.

18. An exhaust purification device of an internal combustion engine according to claim 17, wherein said air-fuel ratio control means controls said degree of richness in accordance with a temperature representative of the temperature of the $NO_x$ absorbent.

19. An exhaust purification device of an internal combustion engine according to claim 18, wherein the temperature representing the temperature of the $NO_x$ absorbent is the temperature of the exhaust gas flowing into the $NO_x$ absorbent.

20. An exhaust purification device of an internal combustion engine according to claim 18, wherein said air-fuel ratio control means makes said degree of richness larger as the temperature representing the temperature of the $NO_x$ absorbent becomes higher.

21. An exhaust purification device of an internal combustion engine according to claim 20, wherein said air-fuel ratio control means makes the time for which the air-fuel ratio of the exhaust gas is maintained at said degree of richness shorter as the temperature representing the temperature of the $NO_x$ absorbent becomes higher.

22. An exhaust purification device of an internal combustion engine according to claim 17, wherein said air-fuel ratio control means makes the time for which the air-fuel ratio of the exhaust gas is maintained at the stoichiometric air-fuel ratio shorter as the temperature representing the temperature of the $SO_x$ absorbent becomes higher.

23. An exhaust purification device of an internal combustion engine according to claim 1, wherein: provision is made of a bypass passage which is branched from the exhaust passage positioned between the $SO_x$ absorbent and the $NO_x$ absorbent so as to bypass the $NO_x$ absorbent, a switch valve arranged at the branch portion of the bypass passage from the exhaust passage, and a valve control means which performs the switching control of said switch valve so as to selectively introduce the exhaust gas to either of the $NO_x$ absorbent or the bypass passage; said valve control means holds the switch valve at a position at which the exhaust gas flows into the $NO_x$ absorbent when the $NO_x$ should be released from the $NO_x$ absorbent and switches the switch valve to a position at which the exhaust gas flowing into the bypass passage when the $SO_x$ should be released from the $SO_x$ absorbent; and said air-fuel ratio control means lowers the oxygen concentration in the exhaust gas flowing into the $NO_x$ absorbent when the $NO_x$ should be released from the $NO_x$ absorbent and makes the air-fuel ratio of the exhaust gas flowing into the $SO_x$ absorbent rich when the $SO_x$ should be released from the $SO_x$ absorbent.

24. An exhaust purification device of an internal combustion engine according to claim 23, wherein said valve control means and said air-fuel ratio control means hold the switch valve at a position at which the exhaust gas flows into the $NO_x$ absorbent when the $SO_x$ should be released from the $SO_x$ absorbent and, at the same time, make the air-fuel ratio of the exhaust gas flowing into the $SO_x$ absorbent rich, and thereafter switches the switch valve to a position at which the exhaust gas flows into the bypass passage and, at the same time, continuously maintains the air-fuel ratio of the exhaust gas flowing into the $SO_x$ absorbent rich.

25. An exhaust purification device of an internal combustion engine according to claim 23, wherein said valve control means and said air-fuel ratio control means hold the switch valve at a position at which the exhaust gas flows into the bypass passage when the $SO_x$ should be released from the $SO_x$ absorbent and, at the same time, make the air-fuel ratio of the exhaust gas flowing into the $SO_x$ absorbent rich, and thereafter switches the switch valve to the position at which the exhaust gas flows into the $NO_x$ absorbent and, at the same time, continuously maintains the air-fuel ratio of the exhaust gas flowing into the $SO_x$ absorbent rich.

26. An exhaust purification device of an internal combustion engine according to claim 23, wherein said valve control means and said air-fuel ratio control means hold the switch valve at a position at which the exhaust gas flows into the $NO_x$ absorbent if the temperature representing the temperature of the $SO_x$ absorbent is lower than the predetermined set up temperature when the $SO_x$ should be released from the $SO_x$ and, at the same time, make the air-fuel ratio of the exhaust gas flowing into the $SO_x$ absorbent rich, and thereafter switch the switch valve to a position at which the exhaust gas flows into the bypass passage and, at the same time, continuously maintain the air-fuel ratio of the exhaust gas flowing into the $SO_x$ absorbent rich; said valve control means and said air-fuel ratio control means switch the switch valve to a position at which the exhaust gas flows into the bypass passage if the temperature representing the temperature of the $SO_x$ absorbent is higher than the predetermined set temperature when the $SO_x$ should be released from the $SO_x$ and, at the same time, make the air-fuel ratio of the exhaust gas flowing into the $SO_x$ absorbent rich, and thereafter hold the switch valve at a position at which the exhaust gas flows into the $NO_x$ absorbent and, at the same time, continuously maintain the air-fuel ratio of the exhaust gas flowing into the $SO_x$ absorbent rich.

27. An exhaust purification device of an internal combustion engine according to claim 1, wherein provision is made of an $NO_x$ releasing control means which lowers the oxygen concentration in the exhaust gas flowing into the $NO_x$ absorbent exactly for a second set period determined in advance so as to release the $NO_x$ from the $NO_x$ absorbent when the period for which the air-fuel ratio of the exhaust gas flowing into the $NO_x$ absorbent is made lean and the $NO_x$ is absorbed into the $NO_x$ absorbent exceeds the predetermined first set period.

28. An exhaust purification device of an internal combustion engine according to claim 27, wherein said $NO_x$ releasing control means provides an $NO_x$ amount estimation means which estimates the amount of $NO_x$ absorbed in the $NO_x$ absorbent; and said $NO_x$ releasing control means decides that said first set period has elapsed when the $NO_x$ amount estimated by said $NO_x$ amount estimation means exceeds a predetermined maximum value.

29. An exhaust purification device of an internal combustion engine according to claim 28, wherein said $NO_x$ amount estimation means decides that the amount of $NO_x$ absorbed in the $NO_x$ absorbent exceeds said maximum value when the cumulative value of the engine rotational speed exceeds a predetermined set value.

30. An exhaust purification device of an internal combustion engine according to claim 28, wherein said $NO_x$ amount estimation means estimates the amount of $NO_x$ absorbed into the $NO_x$ absorbent from the amount of $NO_x$ contained in the exhaust gas when the air-fuel ratio of the exhaust gas flowing into the $NO_x$ absorbent is lean, estimates the amount of $NO_x$ released from the $NO_x$ absorbent based on the degree of richness of said exhaust gas when the air-fuel ratio of the exhaust gas flowing into the $NO_x$ absorbent is rich and based on the temperature representing the temperature of the $NO_x$ absorbent, and estimates the amount of $NO_x$ continuously absorbed into the $NO_x$ absorbent from this estimated $NO_x$ release.

31. An exhaust purification device of an internal combustion engine according to claim 30, wherein said $NO_x$ releasing control means decides that said second set period has elapsed when the $NO_x$ amount estimated by said $NO_x$ estimation means becomes smaller than a predetermined minimum value.

32. An exhaust purification device of an internal combustion engine according to claim 1, wherein provision is made of an $SO_x$ releasing control means which makes the air-fuel ratio of the exhaust gas flowing into the $SO_x$ absorbent rich exactly for a second set period determined in advance so as to release the $SO_x$ from the $SO_x$ absorbent when the period for which the air-fuel ratio of the exhaust gas flowing into the $SO_x$ absorbent is made lean and the $SO_x$ is absorbed into the $SO_x$ absorbent exceeds the predetermined first set period.

33. An exhaust purification device of an internal combustion engine according to claim 32, wherein said $SO_x$ releasing control means provides an $SO_x$ amount estimation means which estimates the amount of $NO_x$ absorbed in the $SO_x$ absorbent; and said $SO_x$ releasing control means decides that said first set period has elapsed when the $SO_x$ amount estimated by said $SO_x$ amount estimation means exceeds a predetermined maximum value and decides that said second set period has elapsed when the $SO_x$ amount estimated by said $SO_x$ amount estimation means becomes smaller than a predetermined maximum value.

34. An exhaust purification device of an internal combustion engine according to claim 33, wherein said $SO_x$ amount estimation means estimates the amount of $SO_x$ absorbed into the $SO_x$ absorbent from the amount of $SO_x$ contained in the exhaust gas when the air-fuel ratio of the exhaust gas flowing into the $SO_x$ absorbent is lean, estimates the amount of $SO_x$ released from the $SO_x$ absorbent based on the degree of richness of said exhaust gas when the air-fuel ratio of the exhaust gas flowing into the $SO_x$ absorbent is rich and based on the temperature representing the temperature of the $SO_x$ absorbent, and estimates the amount of $SO_x$ continuously absorbed into the $SO_x$ absorbent from this released $SO_x$ amount.

35. An exhaust purification device of an internal combustion engine according to claim 1, wherein said air-fuel ratio control means controls the air-fuel ratio of the exhaust gas in the exhaust passage and makes the air-fuel ratio of the exhaust gas flowing into the $SO_x$ absorbent rich when the $SO_x$ should be released from the $SO_x$ absorbent.

36. An exhaust purification device of an internal combustion engine according to claim 35, wherein said air-fuel ratio control means feeds a reduction agent into the exhaust passage when the $SO_x$ should be released from the $SO_x$ absorbent.

37. An exhaust purification device of an internal combustion engine according to claim 36, wherein the above-described reduction agent is composed of at least one member selected from gasoline, isooctane, hexane, heptane, butane, propane, light oil, and lamp oil.

* * * * *

UNITED STATES PATENT AND TRADEMARK OFFICE
CERTIFICATE OF CORRECTION

PATENT NO. : 5,473,890
DATED : December 12, 1995
INVENTOR(S) : Shinichi TAKESHIMA et al.

It is certified that error appears in the above-indentified patent and that said Letters Patent is hereby corrected as shown below:

IN THE ABSTRACT, line 2:   Change "releases" to --releasing--.
line 7:   Change "releases" to --releasing--.

| Column | Line | |
|---|---|---|
| 4 | 37 | Change "calling" to --selecting--. |
| 4 | 42 | Change "absorbing the" to --the absorbed--. |
| 4 | 53 | Change "releases" to --releasing--. |
| 5 | 5 | Change "NO" to --$NO_x$--. |
| 7 | 33 | Change "releases" to --releasing--. |
| 8 | 2 | Change "$SO^{42-}$" to --$SO_4^{2-}$--. |

UNITED STATES PATENT AND TRADEMARK OFFICE
CERTIFICATE OF CORRECTION

PATENT NO. : 5,473,890
DATED : December 12, 1995
INVENTOR(S) : Shinichi TAKESHIMA et al.

It is certified that error appears in the above-indentified patent and that said Letters Patent is hereby corrected as shown below:

| Column | Line | |
|---|---|---|
| 13 | 29 | Change "a" to --the--. |
| 14 | 29 | Change "ends" to --stops--. |
| 14 | 42 | Change "with" to --according to--. |
| 14 | 43 | Change "with" to --according to--. |
| 15 | 33 | Change "so far as the $NO_2$ does not exist" to --in the absence of $NO_2$--. |
| 15 | 35 | Change "releasing" to --being released--. |
| 18 | 14 | Change "absorption" to --absorbent--. |
| 18 | 15 | Change "absorption" to --absorbent--. |
| 18 | 24 | Change "absorption" to --absorbent--. |

UNITED STATES PATENT AND TRADEMARK OFFICE
CERTIFICATE OF CORRECTION

PATENT NO. : 5,473,890
DATED : December 12, 1995
INVENTOR(S) : Shinichi TAKESHIMA et al.

It is certified that error appears in the above-indentified patent and that said Letters Patent is hereby corrected as shown below:

| Column | Line | |
|---|---|---|
| 22 | 48 | Change "flowing" to --flow--. |
| 37 | 48 | After "held" insert --in--. |
| 39 | 35 | Change "$\leq$" to --$\geq$--. |

Signed and Sealed this

Fourteenth Day of May, 1996

BRUCE LEHMAN

*Attest:*

*Attesting Officer*   *Commissioner of Patents and Trademarks*